United States Patent
Ko et al.

(10) Patent No.: US 12,022,532 B2
(45) Date of Patent: Jun. 25, 2024

(54) METHOD FOR TRANSMITTING AND RECEIVING SIGNAL IN WIRELESS COMMUNICATION SYSTEM, AND APPARATUS FOR SUPPORTING SAME

(71) Applicant: LG Electronics Inc., Seoul (KR)

(72) Inventors: Hyunsoo Ko, Seoul (KR); Sukhyon Yoon, Seoul (KR); Jeongsu Lee, Seoul (KR)

(73) Assignee: LG Electronics Inc., Seoul (KR)

( * ) Notice: Subject to any disclaimer, the term of this patent is extended or adjusted under 35 U.S.C. 154(b) by 372 days.

(21) Appl. No.: 17/431,021

(22) PCT Filed: Feb. 14, 2020

(86) PCT No.: PCT/KR2020/002155
§ 371 (c)(1),
(2) Date: Aug. 13, 2021

(87) PCT Pub. No.: WO2020/167060
PCT Pub. Date: Aug. 20, 2020

(65) Prior Publication Data
US 2022/0132595 A1 Apr. 28, 2022

Related U.S. Application Data

(60) Provisional application No. 62/842,612, filed on May 3, 2019, provisional application No. 62/806,624, filed
(Continued)

(51) Int. Cl.
*H04W 74/0833* (2024.01)
*H04L 5/00* (2006.01)
(Continued)

(52) U.S. Cl.
CPC ....... *H04W 74/0841* (2013.01); *H04L 5/0051* (2013.01); *H04W 72/0446* (2013.01);
(Continued)

(58) Field of Classification Search
CPC ......... H04W 74/0841; H04W 72/0446; H04W 72/0453; H04W 74/008; H04W 74/0866;
(Continued)

(56) References Cited

U.S. PATENT DOCUMENTS 11,464,053 B2 * 10/2022 Ko .................. H04L 5/0044
2009/0186613 A1 7/2009 Ahn et al.
(Continued)

OTHER PUBLICATIONS

Apple Inc., "PRACH preamble for NR-U," R1-1900739, 3GPP TSG RAN WG1 Ad-Hoc Meeting 1901, Taipei, Taiwan, Jan. 21-25, 2019, 9 pages.
(Continued)

*Primary Examiner* — Kibrom T Hailu
(74) *Attorney, Agent, or Firm* — Fish & Richardson P.C.

(57) ABSTRACT

The present disclosure relates to a wireless communication system. Specifically, provided is a method and an apparatus for supporting same, the method comprising the steps of: obtaining random access procedure-related message A, message A including a physical random access channel (PRACH) preamble and a physical uplink shared channel (PUSCH); transmitting message A; and receiving random access procedure-related message B as a response to message A, wherein the PUSCH comprises a demodulation reference signal (DM-RS), and PRACH preamble is mapped to (i) one or more DM-RS ports and (ii) one or more DM-RS sequences on the basis of indices of respective (i) one or more DM-RS ports and indices of respective (ii) one or more DM-RS sequences.

9 Claims, 38 Drawing Sheets

Related U.S. Application Data on Feb. 15, 2019, provisional application No. 62/806,622, filed on Feb. 15, 2019.

(51) Int. Cl.
*H04W 72/0446* (2023.01)
*H04W 72/0453* (2023.01)
*H04W 74/00* (2009.01)
*H04W 74/08* (2009.01)

(52) U.S. Cl.
CPC ..... *H04W 72/0453* (2013.01); *H04W 74/008* (2013.01); *H04W 74/0866* (2013.01)

(58) Field of Classification Search
CPC ......... H04W 74/0833; H04W 72/1268; H04W 74/004; H04L 5/0051; H04L 5/0007; H04L 5/0044; H04L 5/0048; H04L 5/0053; H04L 5/0094; H04L 27/26; H04L 27/2613

See application file for complete search history.

(56) References Cited

U.S. PATENT DOCUMENTS

| | | |
|---|---|---|
| 2010/0260140 A1 | 10/2010 | Zhu |
| 2014/0287750 A1 | 9/2014 | Fox |
| 2016/0143061 A1 | 5/2016 | Nishio et al. |
| 2016/0219624 A1 | 7/2016 | Lin et al. |
| 2017/0231011 A1 | 8/2017 | Park et al. |
| 2018/0139787 A1 | 5/2018 | Islam et al. |
| 2018/0198646 A1 | 7/2018 | Gau et al. |
| 2018/0367497 A1 | 12/2018 | Qian et al. |
| 2019/0075084 A1 | 3/2019 | Ding et al. |
| 2019/0174466 A1 | 6/2019 | Zhang et al. |
| 2021/0378031 A1 | 12/2021 | Chai et al. |
| 2022/0015156 A1 | 1/2022 | Xu |
| 2022/0022268 A1 | 1/2022 | Shen et al. |
| 2022/0132595 A1 | 4/2022 | Ko et al. |
| 2022/0173856 A1* | 6/2022 | Ko ................. H04L 5/0053 |
| 2022/0210844 A1 | 6/2022 | Molavianjazi et al. |

OTHER PUBLICATIONS

International Search Report and Written Opinion in International Appln. No. PCT/KR2020/002155, dated Jun. 16, 2020, 17 pages.
Nokia, Nokia Shanghai Bell, "On 2-step Random Access Procedure," R1-1901192, 3GPP TSG RAN WG1 Ad-Hoc Meeting 1901, Taipei, Taiwan, Jan. 21-25, 2019, 9 pages.
Notice of allowance in U.S. Appl. No. 17/665,206, dated Apr. 14, 2022, 11 pages.
Notice of Allowance in U.S. Appl. No. 17/975,213, dated Mar. 6, 2023, 7 pages.
Catt, "Further considerations on a 2-step RA Procedure," R1-1700186, Presented at 3GPP TSG RAN WG1 Ah_NR Meeting, Spokane, USA, Jan. 16-20, 2017, 4 pages.
Motorola Mobility, "Physical channel design for 2-step RACH," R1-1800727, Presented at 3GPP TSG RAN WG1 Meeting AH 1801, Vancouver, Canada, Jan. 22-26, 2018, 4 pages.
Vivo, "RAN2 impacts of 2-step RACH," R2-1818260 (Revision of R2-1814263), Presented at 3GPP TSG-RAN WG2 Meeting #104, Spokane, USA, Nov. 12-16, 2018, 5 pages.

* cited by examiner (a) Carrier aggregation between L-band and U-band (b) Standalone U-band(s)

(a)

(b)

(a) FDM (b) TDM (c) FDM / TDM (d) FDM / CDM

Slot level time multiplexing

Symbol level time multiplexing within a slot (a)

(b)

METHOD FOR TRANSMITTING AND RECEIVING SIGNAL IN WIRELESS COMMUNICATION SYSTEM, AND APPARATUS FOR SUPPORTING SAME

CROSS-REFERENCE TO RELATED APPLICATIONS

This application is a National Stage application under 35 U.S.C. § 371 of International Application No. PCT/KR2020/002155, filed on Feb. 14, 2020, which claims the benefit of U.S. Provisional Application No. 62/842,612, filed on May 3, 2019, 62/806,624, filed on Feb. 15, 2019, and 62/806,622, filed on Feb. 15, 2019. The disclosures of the prior applications are incorporated by reference in their entirety.

TECHNICAL FIELD

Embodiments of the present disclosure relate to a wireless communication system, and more particularly, to a method and apparatus for transmitting and receiving a signal in a wireless communication system.

BACKGROUND

Wireless access systems have been widely deployed to provide various types of communication services such as voice or data. In general, a wireless access system is a multiple access system that supports communication of multiple users by sharing available system resources (a bandwidth, transmission power, etc.) among them. For example, multiple access systems include a code division multiple access (CDMA) system, a frequency division multiple access (FDMA) system, a time division multiple access (TDMA) system, an orthogonal frequency division multiple access (OFDMA) system, and a single carrier frequency division multiple access (SC-FDMA) system.

As a number of communication devices have required higher communication capacity, the necessity of the mobile broadband communication much improved than the existing radio access technology (RAT) has increased. In addition, massive machine type communications (MTC) capable of providing various services at anytime and anywhere by connecting a number of devices or things to each other has been considered in the next generation communication system. Moreover, a communication system design capable of supporting services/UEs sensitive to reliability and latency has been discussed.

As described above, the introduction of the next generation RAT considering the enhanced mobile broadband communication, massive MTC, Ultra-reliable and low latency communication (URLLC), and the like has been discussed.

SUMMARY

Various embodiments of the present disclosure may provide a method and apparatus for transmitting and receiving a signal in a wireless communication system.

Further, various embodiments of the present disclosure may provide a method and apparatus for performing a 2-step random access channel (RACH) procedure in a wireless communication system.

Further, various embodiments of the present disclosure may provide a method and apparatus for multiplexing physical uplink shared channels (PUSCHs) and/or mapping a demodulation reference signal (DM-RS) in message A (MsgA) to support a 2-step RACH procedure.

Further, various embodiments of the present disclosure may provide a method and apparatus for multiplexing an RACH occasion and a PUSCH occasion in MsgA for a 2-step RACH procedure in a wireless communication system.

Further, various embodiments of the present disclosure may provide a method and apparatus for configuring MsgA depending on whether an RACH occasion is allowed to be shared between a 2-step RACH procedure and a 4-step RACH procedure in a wireless communication system.

It will be appreciated by persons skilled in the art that the objects that could be achieved with the various embodiments of the present disclosure are not limited to what has been particularly described hereinabove and the above and other objects that the various embodiments of the present disclosure could achieve will be more clearly understood from the following detailed description.

Various embodiments of the present disclosure may provide a method and apparatus for transmitting and receiving a signal in a wireless communication system.

According to various embodiments of the present disclosure, a method of a user equipment (UE) in a wireless communication system may be provided.

In an exemplary embodiment, the method may include obtaining a message A related to a random access procedure, the message A including a physical random access channel (PRACH) preamble and a physical uplink shared channel (PUSCH), transmitting the message A, and receiving a message B related to the random access procedure in response to the message A.

In an exemplary embodiment, the PUSCH may be transmitted in at least one PUSCH occasion among consecutive PUSCH occasions in a frequency domain and a time domain.

In an exemplary embodiment, the PRACH preamble may be obtained among at least one preconfigured PRACH preamble.

In an exemplary embodiment, the PUSCH may include a demodulation reference signal (DMRS).

In an exemplary embodiment, the DMRS may be related to (i) at least one DMRS port and (ii) at least one DMRS sequence.

In an exemplary embodiment, the at least one preconfigured PRACH preamble may be mapped to (i) the at least one DMRS port and (ii) the at least one DMRS sequence, based on (i) an index of each of the at least one DMRS port and (ii) an index of each of the at least one DMRS sequence.

In an exemplary embodiment, the at least one PRACH preamble may be mapped to (i) the at least one DMRS port and (ii) the at least one DMRS sequence, based on (i) the index of each of the at least one DMRS port being considered in ascending order and then (ii) the index of each of the at least one DMRS sequence being considered in ascending order.

In an exemplary embodiment, a maximum number of DMRS ports may be 4 based on the DMRS being configured in one orthogonal frequency division multiplexing (OFDM) symbol.

In an exemplary embodiment, the PUSCH may be transmitted based on a modulation and coding scheme (MCS) level associated with a random access preamble identifier (RAPID) of the PRACH preamble.

In an exemplary embodiment, based on a plurality of frequency resource sets being configured for the DMRS: the DMRS may be transmitted based on a frequency resource set associated with the RAPID among the plurality of frequency resource sets.

In an exemplary embodiment, the PRACH preamble may be transmitted in at least one PRACH occasion among PRACH occasions.

In an exemplary embodiment, the PRACH occasions and the PUSCH occasions may be multiplexed in time division multiplexing (TDM) based on (i) the PRACH occasions being included in a first slot for the message A and (ii) the PUSCH occasions being included in a second slot for the message A, and the first slot and the second slot may be different.

In an exemplary embodiment, a time offset may be configured between the PRACH occasions and the PUSCH occasions in the time domain.

According to various embodiments of the present disclosure, an apparatus configured to operate in a wireless communication system may be provided.

In an exemplary embodiment, the apparatus may include a memory, and at least one processor coupled to the memory.

The at least one processor may be configured to obtain a message A related to a random access procedure, the message A including a PRACH preamble and a PUSCH, transmit the message A, and receive a message B related to the random access procedure in response to the message A, In an exemplary embodiment, the PUSCH may be transmitted in at least one of consecutive PUSCH occasions in a frequency domain and a time domain.

In an exemplary embodiment, the PRACH preamble may be obtained from among at least one preconfigured PRACH preamble.

In an exemplary embodiment, the PUSCH may include a DMRS.

In an exemplary embodiment, the DMRS may be related to (i) at least one DMRS port and (ii) at least one DMRS sequence.

In an exemplary embodiment, the at least one preconfigured PRACH preamble may be mapped to (i) the at least one DMRS port and (ii) the at least one DMRS sequence, based on (i) an index of each of the at least one DMRS port and (ii) an index of each of the at least one DMRS sequence.

In an exemplary embodiment, the at least one PRACH preamble may be mapped to (i) the at least one DMRS port and (ii) the at least one DMRS sequence, based on (i) the index of each of the at least one DMRS port being considered in ascending order and then (ii) the index of each of the at least one DMRS sequence being considered in ascending order.

In an exemplary embodiment the PUSCH may be transmitted based on an MCS level associated with an RAPID of the PRACH preamble.

In an exemplary embodiment, the apparatus may communicate with at least one of a UE, a network, or an autonomous driving vehicle other than a vehicle including the apparatus.

According to various embodiments of the present disclosure, a method of a base station (BS) in a wireless communication system may be provided.

In an exemplary embodiment, the method may include receiving a message A related to a random access procedure, obtaining a PRACH preamble and a PUSCH included in the message A, and transmitting a message B related to the random access procedure in response to the message A.

In an exemplary embodiment, the PUSCH may be received in at least one PUSCH occasion among consecutive PUSCH occasions in a frequency domain and a time domain.

In an exemplary embodiment, the PRACH preamble may be obtained among at least one preconfigured PRACH preamble.

In an exemplary embodiment, the PUSCH may include a DMRS.

In an exemplary embodiment, the DMRS may be related to (i) at least one DMRS port and (ii) at least one DMRS sequence.

In an exemplary embodiment, the at least one preconfigured PRACH preamble may be mapped to (i) the at least one DMRS port and (ii) the at least one DMRS sequence, based on (i) an index of each of the at least one DMRS port and (ii) an index of each of the at least one DMRS sequence.

According to various embodiments of the present disclosure, an apparatus configured to operate in a wireless communication system may be received.

In an exemplary embodiment, the apparatus may include a memory, and at least one processor coupled to the memory.

In an exemplary embodiment, the at least one processor may be configured to receive a message A related to a random access procedure, obtain a PRACH preamble and a PUSCH included in the message A, and transmit a message B related to the random access procedure in response to the message A.

In an exemplary embodiment, the PUSCH may be received in at least one PUSCH occasion among consecutive PUSCH occasions in a frequency domain and a time domain.

In an exemplary embodiment, the PRACH preamble may be obtained among at least one preconfigured PRACH preamble.

In an exemplary embodiment, the PUSCH may include a DMRS.

In an exemplary embodiment, the DMRS may be related to (i) at least one DMRS port and (ii) at least one DMRS sequence.

In an exemplary embodiment, the at least one preconfigured PRACH preamble may be mapped to (i) the at least one DMRS port and (ii) the at least one DMRS sequence, based on (i) an index of each of the at least one DMRS port and (ii) an index of each of the at least one DMRS sequence.

According to various embodiments of the present disclosure, an apparatus configured to operate in a wireless communication system may be provided.

In an exemplary embodiment, the apparatus may include at least one processor, and at least one memory storing at least one instruction causing the at least one processor to perform a method.

In an exemplary embodiment, the method may include obtaining a message A related to a random access procedure, the message A including a PRACH preamble and a PUSCH, transmitting the message A, and receiving a message B related to the random access procedure in response to the message A.

In an exemplary embodiment, the PUSCH may be transmitted in at least one PUSCH occasion among consecutive PUSCH occasions in a frequency domain and a time domain.

In an exemplary embodiment, the PRACH preamble may be obtained among at least one preconfigured PRACH preamble.

In an exemplary embodiment, the PUSCH may include a DMRS.

In an exemplary embodiment, the DMRS may be related to (i) at least one DMRS port and (ii) at least one DMRS sequence.

In an exemplary embodiment, the at least one preconfigured PRACH preamble may be mapped to (i) the at least one DMRS port and (ii) the at least one DMRS sequence, based on (i) an index of each of the at least one DMRS port and (ii) an index of each of the at least one DMRS sequence.

According to various embodiments of the present disclosure, a processor-readable medium storing at least one instruction causing at least one processor to perform a method may be provided.

In an exemplary embodiment, the method may include obtaining a message A related to a random access procedure, the message A including a PRACH preamble and a PUSCH, transmitting the message A, and receiving a message B related to the random access procedure in response to the message A.

In an exemplary embodiment, the PUSCH may be transmitted in at least one PUSCH occasion among consecutive PUSCH occasions in a frequency domain and a time domain.

In an exemplary embodiment, the PRACH preamble may be obtained among at least one preconfigured PRACH preamble.

In an exemplary embodiment, the PUSCH may include a DMRS.

In an exemplary embodiment, the DMRS may be related to (i) at least one DMRS port and (ii) at least one DMRS sequence.

In an exemplary embodiment, the at least one preconfigured PRACH preamble may be mapped to (i) the at least one DMRS port and (ii) the at least one DMRS sequence, based on (i) an index of each of the at least one DMRS port and (ii) an index of each of the at least one DMRS sequence.

It will be appreciated by persons skilled in the art that the objects that could be achieved with the present disclosure are not limited to what has been particularly described hereinabove and the above and other objects that the present disclosure could achieve will be more clearly understood from the following detailed description.

Various embodiments of the present disclosure have the following effects.

Various embodiments of the present disclosure may provide a method and apparatus for transmitting and receiving a signal in a wireless communication system.

Further, various embodiments of the present disclosure may provide a method and apparatus for performing a 2-step random access channel (RACH) procedure in a wireless communication system.

Further, various embodiments of the present disclosure may provide a method and apparatus for multiplexing physical uplink shared channels (PUSCHs) and/or mapping a demodulation reference signal (DM-RS) in in message A (MsgA) to support a 2-step RACH procedure.

Further, various embodiments of the present disclosure may provide a method and apparatus for multiplexing an RACH occasion and a PUSCH occasion in MsgA for a 2-step RACH procedure in a wireless communication system.

Further, various embodiments of the present disclosure may provide a method and apparatus for configuring MsgA depending on whether an RACH occasion is allowed to be shared between a 2-step RACH procedure and a 4-step RACH procedure in a wireless communication system.

It will be appreciated by persons skilled in the art that that the effects that can be achieved through the various embodiments of the present disclosure are not limited to those described above and other advantageous effects of the various embodiments of the present disclosure will be more clearly understood from the following detailed description. That is, unintended effects according to implementation of the present disclosure may be derived by those skilled in the art from the various embodiments of the present disclosure.

BRIEF DESCRIPTION OF THE DRAWINGS

The accompanying drawings, which are included to provide a further understanding of the various embodiments of the present disclosure, provide the various embodiments of the present disclosure together with detail explanation. Yet, a technical characteristic the various embodiments of the present disclosure is not limited to a specific drawing. Characteristics disclosed in each of the drawings are combined with each other to configure a new embodiment. Reference numerals in each drawing correspond to structural elements.

DETAILED DESCRIPTION

Figure 1:
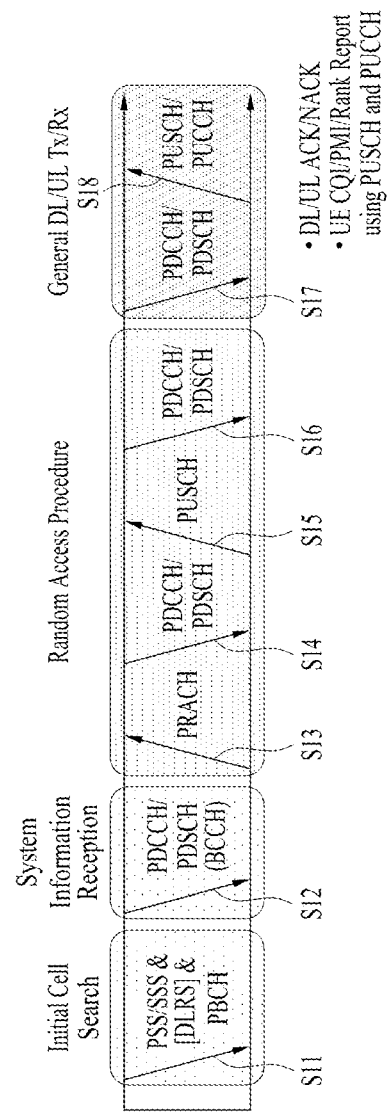
FIG. 1 is a diagram illustrating physical channels and a signal transmission method using the physical channels, which may be used in various embodiments of the present disclosure.

The various embodiments of the present disclosure described below are combinations of elements and features of the various embodiments of the present disclosure in specific forms. The elements or features may be considered selective unless otherwise mentioned. Each element or feature may be practiced without being combined with other elements or features. Further, various embodiments of the present disclosure may be constructed by combining parts of the elements and/or features. Operation orders described in various embodiments of the present disclosure may be rearranged. Some constructions or elements of any one embodiment may be included in another embodiment and may be replaced with corresponding constructions or features of another embodiment.

In the description of the attached drawings, a detailed description of known procedures or steps of the various embodiments of the present disclosure will be avoided lest it should obscure the subject matter of the various embodiments of the present disclosure. In addition, procedures or steps that could be understood to those skilled in the art will not be described either.

Throughout the specification, when a certain portion "includes" or "comprises" a certain component, this indicates that other components are not excluded and may be further included unless otherwise noted. The terms "unit", "-or/er" and "module" described in the specification indicate a unit for processing at least one function or operation, which may be implemented by hardware, software or a combination thereof. In addition, the terms "a or an", "one", "the" etc. may include a singular representation and a plural representation in the context of the various embodiments of the present disclosure (more particularly, in the context of the following claims) unless indicated otherwise in the specification or unless context clearly indicates otherwise.

In the various embodiments of the present disclosure, a description is mainly made of a data transmission and reception relationship between a base station (BS) and a user equipment (UE). A BS refers to a terminal node of a network, which directly communicates with a UE. A specific operation described as being performed by the BS may be performed by an upper node of the BS.

Namely, it is apparent that, in a network comprised of a plurality of network nodes including a BS, various operations performed for communication with a UE may be performed by the BS, or network nodes other than the BS. The term 'BS' may be replaced with a fixed station, a Node B, an evolved Node B (eNode B or eNB), gNode B (gNB), an advanced base station (ABS), an access point, etc.

In the various embodiments of the present disclosure, the term terminal may be replaced with a UE, a mobile station (MS), a subscriber station (SS), a mobile subscriber station (MSS), a mobile terminal, an advanced mobile station (AMS), etc.

A transmission end is a fixed and/or mobile node that provides a data service or a voice service and a reception end is a fixed and/or mobile node that receives a data service or a voice service. Therefore, a UE may serve as a transmission end and a BS may serve as a reception end, on an uplink (UL). Likewise, the UE may serve as a reception end and the BS may serve as a transmission end, on a downlink (DL).

Various embodiments of the present disclosure may be supported by standard specifications disclosed for at least one of wireless access systems including an institute of electrical and electronics engineers (IEEE) 802.xx system, a 3rd generation partnership project (3GPP) system, a 3GPP long term evolution (LTE) system, a 3GPP 5th generation (5G) new RAT (NR) system, and a 3GPP2 system. In particular, the various embodiments of the present disclosure may be supported by the standard specifications, 3GPP TS 36.211, 3GPP TS 36.212, 3GPP TS 36.213, 3GPP TS 36.321, 3GPP TS 36.331, 3GPP TS 37.213, 3GPP TS 38.211, 3GPP TS 38.212, 3GPP TS 38.213, 3GPP TS 38.214, 3GPP TS 38.321, and 3GPP TS 38.331. That is, the steps or parts which are not described in the various embodiments of the present disclosure may be described with reference to the above standard specifications. Further, all terms used herein may be described by the standard specifications.

Reference will now be made in detail to the various embodiments of the present disclosure with reference to the accompanying drawings. The detailed description, which will be given below with reference to the accompanying drawings, is intended to explain exemplary embodiments of the present disclosure, rather than to show the only embodiments that can be implemented according to the disclosure.

The following detailed description includes specific terms in order to provide a thorough understanding of the various embodiments of the present disclosure. However, it will be apparent to those skilled in the art that the specific terms may be replaced with other terms without departing the technical spirit and scope of the various embodiments of the present disclosure.

Hereinafter, 3GPP LTE/LTE-A systems and 3GPP NR system are explained, which are examples of wireless access systems.

The various embodiments of the present disclosure can be applied to various wireless access systems such as code division multiple access (CDMA), frequency division multiple access (FDMA), time division multiple access (TDMA), orthogonal frequency division multiple access (OFDMA), Single carrier frequency division multiple access (SC-FDMA), and so on.

CDMA may be implemented as a radio technology such as universal terrestrial radio access (UTRA) or CDMA2000. TDMA may be implemented as a radio technology such as global system for mobile communications (GSM)/general packet radio service (GPRS)/enhanced data rates for GSM evolution (EDGE). OFDMA may be implemented as a radio technology such as IEEE 802.11 (Wi-Fi), IEEE 802.16 (WiMAX), IEEE 802.20, evolved UTRA (E-UTRA), etc.

UTRA is a part of Universal Mobile Telecommunications System (UMTS). 3GPP LTE is a part of evolved UMTS (E-UMTS) using E-UTRA, adopting OFDMA for DL and SC-FDMA for UL. LTE-advanced (LTE-A) is an evolution of 3GPP LTE.

While the various embodiments of the present disclosure are described in the context of 3GPP LTE/LTE-A systems and 3GPP NR system in order to clarify the technical features of the various embodiments of the present disclosure, the various embodiments of the present disclosure is also applicable to an IEEE 802.16e/m system, etc.

1. Overview of 3GPP System 1.1. Physical Channels and General Signal Transmission In a wireless access system, a UE receives information from a BS on a DL and transmits information to the BS on a UL. The information transmitted and received between the UE and the BS includes general data information and various types of control information. There are many physical channels according to the types/usages of information transmitted and received between the BS and the UE.

FIG. 1 is a diagram illustrating physical channels and a signal transmission method using the physical channels, which may be used in various embodiments of the present disclosure.

When a UE is powered on or enters a new cell, the UE performs initial cell search (S11). The initial cell search involves acquisition of synchronization to a BS. Specifically, the UE synchronizes its timing to the BS and acquires information such as a cell identifier (ID) by receiving a primary synchronization channel (P-SCH) and a secondary synchronization channel (S-SCH) from the BS.

Then the UE may acquire information broadcast in the cell by receiving a physical broadcast channel (PBCH) from the BS.

During the initial cell search, the UE may monitor a DL channel state by receiving a downlink reference signal (DL RS).

After the initial cell search, the UE may acquire more detailed system information by receiving a physical downlink control channel (PDCCH) and receiving on a physical downlink shared channel (PDSCH) based on information of the PDCCH (S12).

Subsequently, to complete connection to the BS, the UE may perform a random access procedure with the BS (S13 to S16). In the random access procedure, the UE may transmit a preamble on a physical random access channel (PRACH) (S13) and may receive a PDCCH and a random access response (RAR) for the preamble on a PDSCH associated with the PDCCH (S14). The UE may transmit a PUSCH by using scheduling information in the RAR (S15), and perform a contention resolution procedure including reception of a PDCCH signal and a PDSCH signal corresponding to the PDCCH signal (S16).

When the random access procedure is performed in two steps, steps S13 and S15 may be performed in one operation for a UE transmission, and steps S14 and S16 may be performed in one operation for a BS transmission.

After the above procedure, the UE may receive a PDCCH and/or a PDSCH from the BS (S17) and transmit a physical uplink shared channel (PUSCH) and/or a physical uplink control channel (PUCCH) to the BS (S18), in a general UL/DL signal transmission procedure.

Control information that the UE transmits to the BS is generically called UCI. The UCI includes a hybrid automatic repeat and request acknowledgement/negative acknowledgement (HARQ-ACK/NACK), a scheduling request (SR), a channel quality indicator (CQI), a precoding matrix index (PMI), a rank indicator (RI), etc.

In general, UCI is transmitted periodically on a PUCCH. However, if control information and traffic data should be transmitted simultaneously, the control information and traffic data may be transmitted on a PUSCH. In addition, the UCI may be transmitted aperiodically on the PUSCH, upon receipt of a request/command from a network.

1.2. Radio Frame Structures

Figure 2:
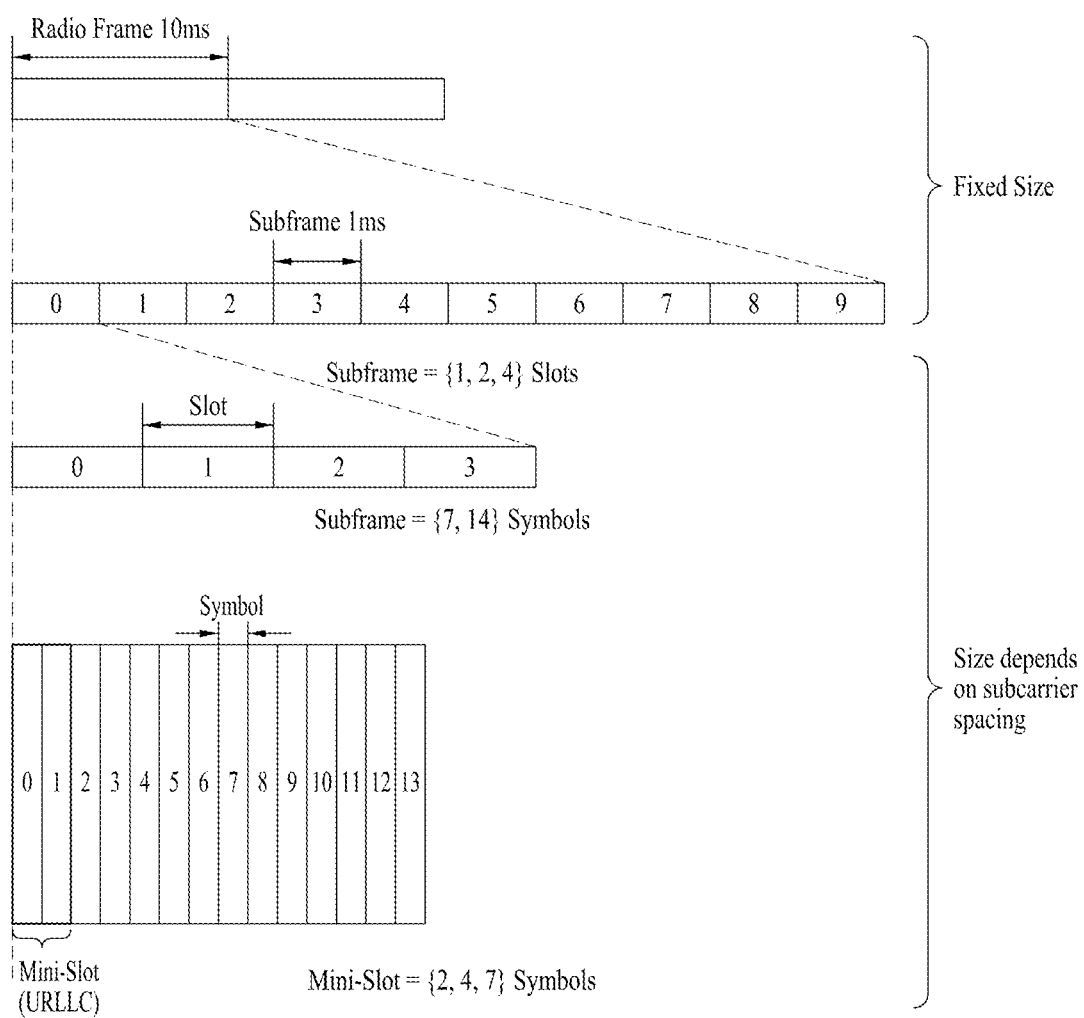
FIG. 2 is a diagram illustrating a radio frame structure in a new radio access technology (NR) system to which various embodiments of the present disclosure are applicable.

FIG. 2 is a diagram illustrating a radio frame structure in an NR system to which various embodiments of the present disclosure are applicable.

The NR system may support multiple numerologies. A numerology may be defined by a subcarrier spacing (SCS) and a cyclic prefix (CP) overhead. Multiple SCSs may be derived by scaling a default SCS by an integer N (or μ). Further, even though it is assumed that a very small SCS is not used in a very high carrier frequency, a numerology to be used may be selected independently of the frequency band of a cell. Further, the NR system may support various frame structures according to multiple numerologies.

Now, a description will be given of OFDM numerologies and frame structures which may be considered for the NR system. Multiple OFDM numerologies supported by the NR system may be defined as listed in Table 1. For a bandwidth part (BWP), μ and a CP are obtained from RRC parameters provided by the BS.

TABLE 1

| μ | $\Delta f = 2^{\mu} \cdot 15$ [kHz] | Cyclic prefix |
| --- | --- | --- |
| 0 | 15 | Normal |
| 1 | 30 | Normal |
| 2 | 60 | Normal, Extended |
| 3 | 120 | Normal |
| 4 | 240 | Normal |

In NR, multiple numerologies (e.g., SCSs) are supported to support a variety of 5G services. For example, a wide area in cellular bands is supported for an SCS of 15 kHz, a dense-urban area, a lower latency, and a wider carrier bandwidth are supported for an SCS of 30 kHz/60 kHz, and a larger bandwidth than 24.25 GHz is supported for an SCS of 60 kHz or more, to overcome phase noise.

An NR frequency band is defined by two types of frequency ranges, FR1 and FR2. FR1 may be a sub-6 GHz range, and FR2 may be an above-6 GHz range, that is, a millimeter wave (mmWave) band.

Table 2 below defines the NR frequency band, by way of example.

TABLE 2

| Frequency range designation | Corresponding frequency range | Subcarrier Spacing |
| --- | --- | --- |
| FR1 | 410 MHz-7125 MHz | 15, 30, 60 kHz |
| FR2 | 24250 MHz-52600 MHz | 60, 120, 240 kHz |

Regarding a frame structure in the NR system, the time-domain sizes of various fields are represented as multiples of a basic time unit for NR, $T_c=1/(\Delta f_{max}*N_f)$ where $\Delta f_{max}=480*10^3$ Hz and a value $N_f$ related to a fast Fourier transform (FFT) size or an inverse fast Fourier transform (IFFT) size is given as $N_f=4096$. $T_c$ and $T_s$ which is an LTE-based time unit and sampling time, given as $T_s=1/((15 \text{ kHz})*2048)$ are placed in the following relationship: $T_s/T_c=64$. DL and UL transmissions are organized into (radio) frames each having a duration of $T_f=(\Delta f_{max}*N_f/100)*T_c=10$ ms. Each radio frame includes 10 subframes each having a duration of $T_{sf}=(\Delta f_{max}*N_f/1000)*T_c=1$ ms. There may exist one set of frames for UL and one set of frames for DL. For a numerology μ, slots are numbered with $n^{\mu}_s \in \{0, \ldots, N^{slot,\mu}_{subframe}-1\}$ in an increasing order in a subframe, and with $n^{\mu}_{s,f} \in \{0, \ldots, N^{slot,\mu}_{frame}-1\}$ in an increasing order in a radio frame. One slot includes $N^{\mu}_{symb}$ consecutive OFDM symbols, and $N^{\mu}_{symb}$ depends on a CP. The start of a slot $n^{\mu}_s$ in a subframe is aligned in time with the start of an OFDM symbol $n^{\mu}_s*N^{\mu}_{symb}$ in the same subframe.

Table 3 lists the number of symbols per slot, the number of slots per frame, and the number of slots per subframe, for each SCS in a normal CP case, and Table 4 lists the number of symbols per slot, the number of slots per frame, and the number of slots per subframe, for each SCS in an extended CP case.

TABLE 3

| μ | $N^{slot}_{symb}$ | $N^{frame,\mu}_{slot}$ | $N^{subframe,\mu}_{slot}$ |
| --- | --- | --- | --- |
| 0 | 14 | 10 | 1 |
| 1 | 14 | 20 | 2 |
| 2 | 14 | 40 | 4 |
| 3 | 14 | 80 | 8 |
| 4 | 14 | 160 | 16 |

TABLE 4

| μ | $N^{slot}_{symb}$ | $N^{frame,\mu}_{slot}$ | $N^{subframe,\mu}_{slot}$ |
| --- | --- | --- | --- |
| 2 | 12 | 40 | 4 |

In the above tables, $N^{slot}_{symb}$ represents the number of symbols in a slot, $N^{frame,\mu}_{slot}$ represents the number of slots in a frame, and $N^{subframe,\mu}_{slot}$ represents the number of slots in a subframe.

In the NR system to which various embodiments of the present disclosure are applicable, different OFDM(A) numerologies (e.g., SCSs, CP lengths, and so on) may be configured for a plurality of cells which are aggregated for one UE. Accordingly, the (absolute time) period of a time resource including the same number of symbols (e.g., a subframe (SF), a slot, or a TTI) (generically referred to as a time unit (TU), for convenience) may be configured differently for the aggregated cells.

FIG. 2 illustrates an example with μ=2 (i.e., an SCS of 60 kHz), in which referring to Table 6, one subframe may include four slots. One subframe={1, 2, 4} slots in FIG. 7, which is exemplary, and the number of slot(s) which may be included in one subframe is defined as listed in Table 3 or Table 4.

Further, a mini-slot may include 2, 4 or 7 symbols, fewer symbols than 2, or more symbols than 7.

Figure 3:
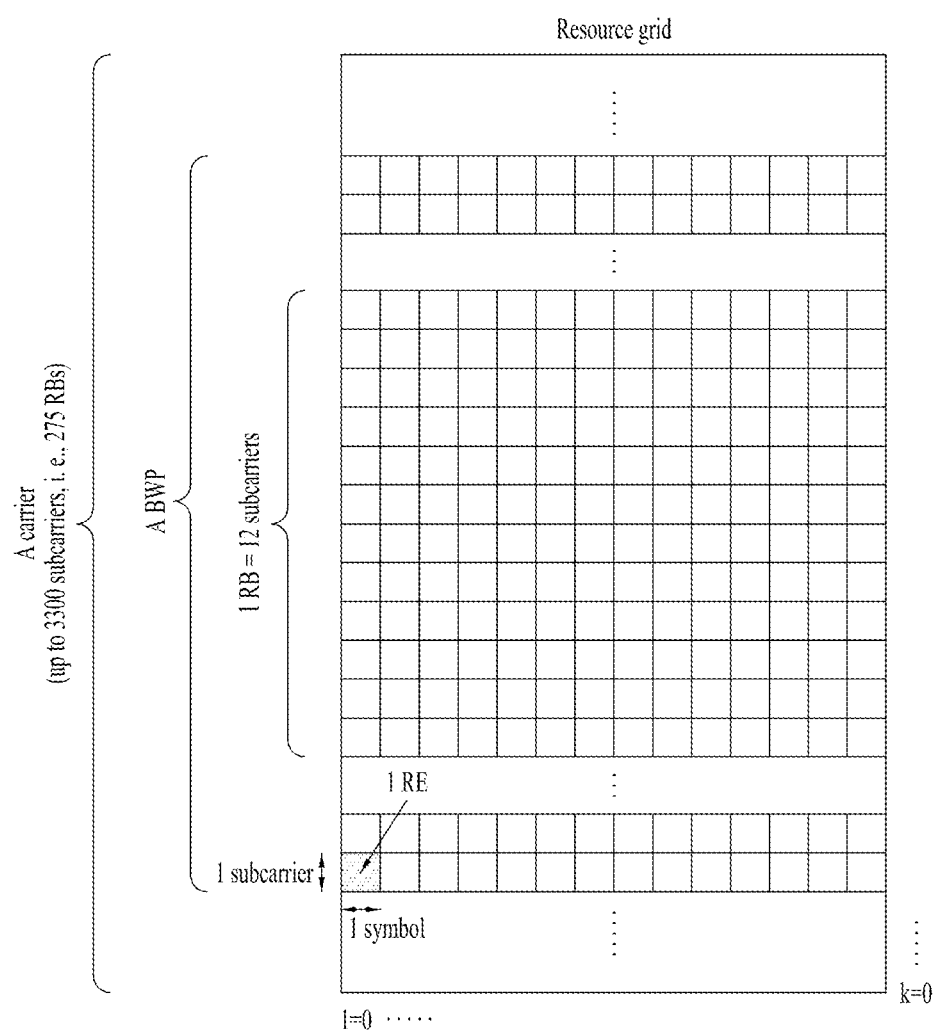
FIG. 3 is a diagram illustrating a slot structure in an NR system to which various embodiments of the present disclosure are applicable.

FIG. 3 is a diagram illustrating a slot structure in an NR system to which various embodiments of the present disclosure are applicable.

Referring FIG. 3, one slot includes a plurality of symbols in the time domain. For example, one slot includes 7 symbols in a normal CP case and 6 symbols in an extended CP case.

A carrier includes a plurality of subcarriers in the frequency domain. An RB is defined by a plurality of (e.g., 12) consecutive subcarriers in the frequency domain.

A BWP, which is defined by a plurality of consecutive (P)RBs in the frequency domain, may correspond to one numerology (e.g., SCS, CP length, and so on).

A carrier may include up to N (e.g., 5) BWPs. Data communication may be conducted in an activated BWP, and only one BWP may be activated for one UE. In a resource grid, each element is referred to as an RE, to which one complex symbol may be mapped.

Figure 4:
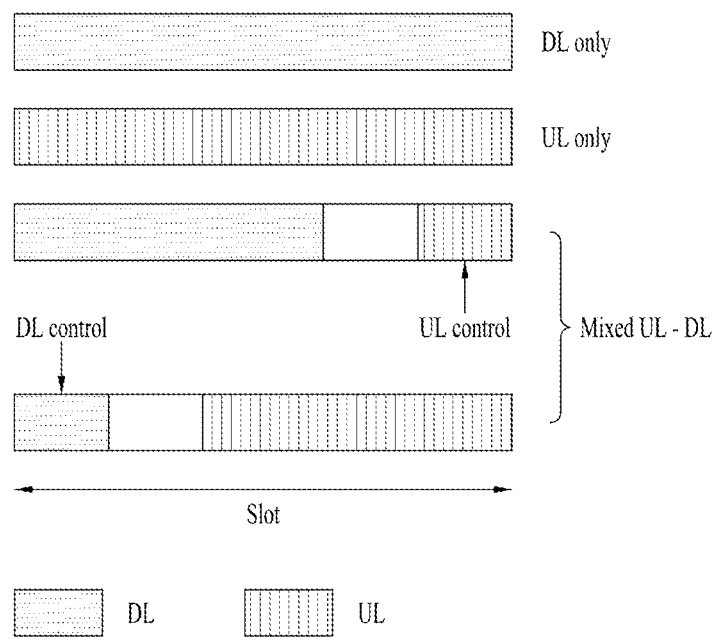
FIG. 4 is a diagram illustrating a self-contained slot structure to which various embodiments of the present disclosure are applicable.

FIG. 4 is a diagram illustrating a self-contained slot structure to which various embodiments of the present disclosure are applicable.

The self-contained slot structure may refer to a slot structure in which all of a DL control channel, DL/UL data, and a UL control channel may be included in one slot.

In FIG. 4, the hatched area (e.g., symbol index=0) indicates a DL control region, and the black area (e.g., symbol index=13) indicates a UL control region. The remaining area (e.g., symbol index=1 to 12) may be used for DL or UL data transmission.

Based on this structure, a BS and a UE may sequentially perform DL transmission and UL transmission in one slot. That is, the BS and UE may transmit and receive not only DL data but also a UL ACK/NACK for the DL data in one slot. Consequently, this structure may reduce a time required until data retransmission when a data transmission error occurs, thereby minimizing the latency of a final data transmission.

In this self-contained slot structure, a predetermined length of time gap is required to allow the BS and the UE to switch from transmission mode to reception mode and vice versa. To this end, in the self-contained slot structure, some OFDM symbols at the time of switching from DL to UL may be configured as a guard period (GP).

While the self-contained slot structure has been described above as including both of a DL control region and a UL control region, the control regions may selectively be included in the self-contained slot structure. In other words, the self-contained slot structure according to various embodiments of the present disclosure may cover a case of including only the DL control region or the UL control region as well as a case of including both of the DL control region and the UL control region, as illustrated in FIG. 4.

Further, the sequence of the regions included in one slot may vary according to embodiments. For example, one slot may include the DL control region, the DL data region, the UL control region, and the UL data region in this order, or the UL control region, the UL data region, the DL control region, and the DL data region in this order.

A PDCCH may be transmitted in the DL control region, and a PDSCH may be transmitted in the DL data region. A PUCCH may be transmitted in the UL control region, and a PUSCH may be transmitted in the UL data region.

1.3. Channel Structures
1.3.1. DL Channel Structures

The BS transmits related signals to the UE on DL channels as described below, and the UE receives the related signals from the BS on the DL channels.

1.3.1.1. Physical Downlink Shared Channel (PDSCH)

The PDSCH conveys DL data (e.g., DL-shared channel transport block (DL-SCH TB)) and uses a modulation scheme such as quadrature phase shift keying (QPSK), 16-ary quadrature amplitude modulation (16QAM), 64QAM, or 256QAM. A TB is encoded into a codeword. The PDSCH may deliver up to two codewords. Scrambling and modulation mapping are performed on a codeword basis, and modulation symbols generated from each codeword are mapped to one or more layers (layer mapping). Each layer together with a demodulation reference signal (DMRS) is mapped to resources, generated as an OFDM symbol signal, and transmitted through a corresponding antenna port.

1.3.1.2. Physical Downlink Control Channel (PDCCH)

The PDCCH may deliver downlink control information (DCI), for example, DL data scheduling information, UL data scheduling information, and so on. The PUCCH may deliver uplink control information (UCI), for example, an ACK/NACK information for DL data, channel state information (CSI), a scheduling request (SR), and so on.

The PDCCH carries DCI and is modulated in QPSK. One PDCCH includes 1, 2, 4, 8, or 16 control channel elements (CCEs) according to an aggregation level (AL). One CCE includes 6 resource element groups (REGs). One REG is defined by one OFDM symbol by one (P)RB.

Figure 5:
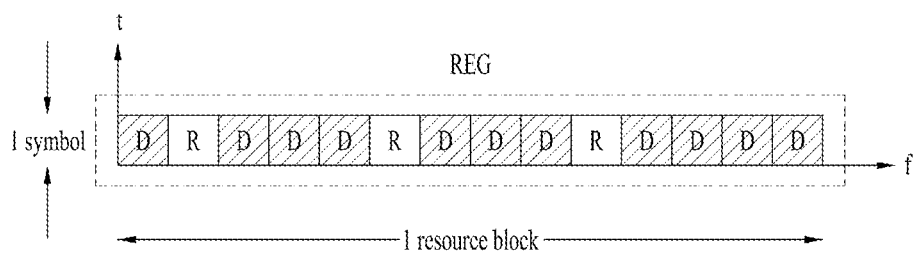
FIG. 5 is a diagram illustrating the structure of one resource element group (REG) in an NR system to which various embodiments of the present disclosure are applicable.

FIG. 5 is a diagram illustrating the structure of one REG to which various embodiments of the present disclosure are applicable.

In FIG. 5, D represents an RE to which DCI is mapped, and R represents an RE to which a DMRS is mapped. The DMRS is mapped to REs #1, #5, and #9 along the frequency axis in one symbol.

The PDCCH is transmitted in a control resource set (CORESET). A CORESET is defined as a set of REGs having a given numerology (e.g., SCS, CP length, and so on). A plurality of CORESETs for one UE may overlap with each other in the time/frequency domain. A CORESET may be configured by system information (e.g., a master information block (MIB)) or by UE-specific higher layer (RRC) signaling. Specifically, the number of RBs and the number of symbols (up to 3 symbols) included in a CORESET may be configured by higher-layer signaling.

For each CORESET, a precoder granularity in the frequency domain is set to one of the followings by higher-layer signaling:
sameAsREG-bundle: It equals to an REG bundle size in the frequency domain.
allContiguousRBs: It equals to the number of contiguous RBs in the frequency domain within the CORESET.

The REGs of the CORESET are numbered in a time-first mapping manner. That is, the REGs are sequentially numbered in an increasing order, starting with 0 for the first OFDM symbol of the lowest-numbered RB in the CORESET.

CCE-to-REG mapping for the CORESET may be an interleaved type or a non-interleaved type.

Figure 6:
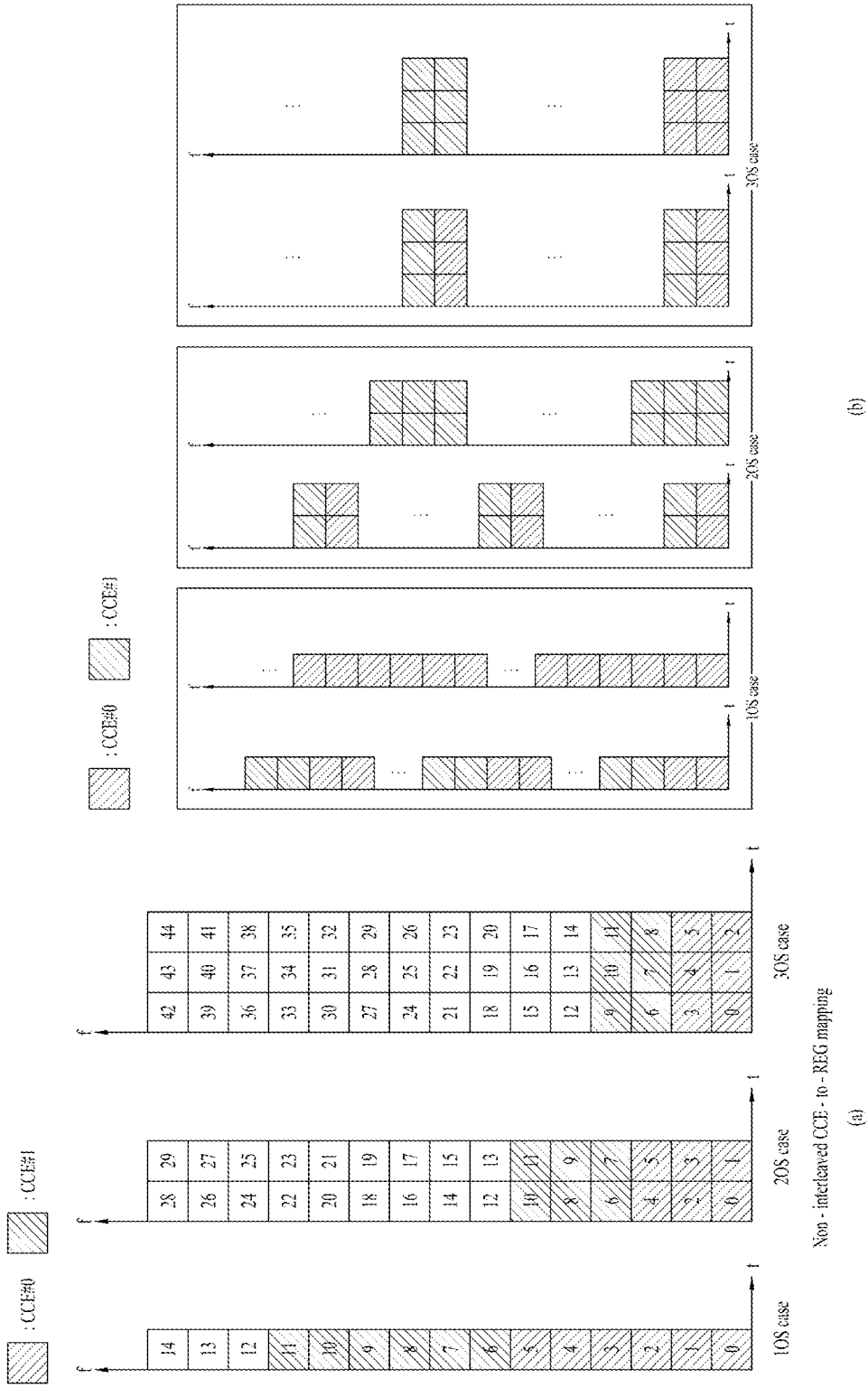
FIG. 6 is a diagram illustrating exemplary control channel element (CCE)-to-resource element group (REG) mapping types according to various embodiments of the present disclosure.

FIG. 6 is a diagram illustrating exemplary CCE-to-REG mapping types according to various embodiments of the present disclosure.

FIG. 6(a) is a diagram illustrating exemplary non-interleaved CCE-to-REG mapping according to various embodiments of the present disclosure.
Non-interleaved CCE-to-REG mapping (or localized CCE-to-REG mapping): 6 REGs for a given CCE are grouped into one REG bundle, and all of the REGs for the given CCE are contiguous. One REG bundle corresponds to one CCE.

FIG. 6(b) is a diagram illustrating exemplary interleaved CCE-to-REG mapping.
Interleaved CCE-to-REG mapping (or distributed CCE-to-REG mapping): 2, 3 or 6 REGs for a given CCE are grouped into one REG bundle, and the REG bundle is interleaved in the CORESET. In a CORESET including one or two OFDM symbols, an REG bundle includes 2 or 6 REGs, and in a CORESET including three OFDM symbols, an REG bundle includes 3 or 6 REGs. An REG bundle size is configured on a CORESET basis.

Figure 7:
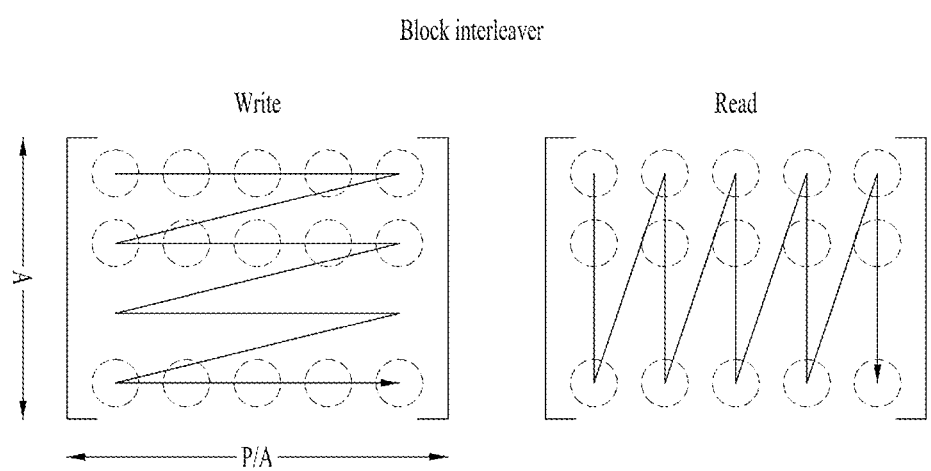
FIG. 7 is a diagram illustrating an exemplary block interleaver according to various embodiments of the present disclosure.

FIG. 7 illustrates an exemplary block interleaver according to various embodiments of the present disclosure.

For the above interleaving operation, the number A of rows in a (block) interleaver is set to one of 2, 3, and 6. If the number of interleaving units for a given CORESET is P, the number of columns in the block interleaver is P/A. In the block interleaver, a write operation is performed in a row-first direction, and a read operation is performed in a column-first direction, as illustrated in FIG. C4. Cyclic shift (CS) of an interleaving unit is applied based on an ID which is configurable independently of a configurable ID for the DMRS.

The UE acquires DCI delivered on a PDCCH by decoding (so-called blind decoding) a set of PDCCH candidates. A set of PDCCH candidates decoded by a UE are defined as a PDCCH search space set. A search space set may be a common search space (CSS) or a UE-specific search space (USS). The UE may acquire DCI by monitoring PDCCH candidates in one or more search space sets configured by an MIB or higher-layer signaling. Each CORESET configuration is associated with one or more search space sets, and each search space set is associated with one CORESET configuration. One search space set is determined based on the following parameters.

controlResourceSetId: A set of control resources related to the search space set.

monitoringSlotPeriodicityAndOffset: A PDCCH monitoring periodicity (in slots) and a PDCCH monitoring offset (in slots).

monitoringSymbolsWithinSlot: A PDCCH monitoring pattern (e.g., the first symbol(s) in the CORESET) in a PDCCH monitoring slot.

nrofCandidates: The number of PDCCH candidates for each AL={1, 2, 4, 8, 16} (one of 0, 1, 2, 3, 4, 5, 6, and 8).

Table 5 lists exemplary features of the respective search space types.

group (CBG)-based (or CBG-level) PUSCH. DCI format 1_0 may be used to schedule a TB-based (or TB-level) PDSCH, and DCI format 1_1 may be used to schedule a TB-based (or TB-level) PDSCH or a CBG-based (or CBG-level) PDSCH. DCI format 2_0 is used to deliver dynamic slot format information (e.g., a dynamic slot format indicator (SFI)) to the UE, and DCI format 2_1 is used to deliver DL preemption information to the UE. DCI format 2_0 and/or DCI format 2_1 may be delivered to the UEs of a group on a group common PDCCH (GC-PDCCH) which is a PDCCH directed to a group of UEs.

1.3.2. UL Channel Structures

The UE transmits related signals on later-described UL channels to the BS, and the BS receives the related signals on the UL channels from the UE.

1.3.2.1. Physical Uplink Shared Channel (PUSCH)

The PUSCH delivers UL data (e.g., a UL-shared channel transport block (UL-SCH TB)) and/or UCI, in cyclic prefix-orthogonal frequency division multiplexing (CP-OFDM) waveforms or discrete Fourier transform-spread-orthogonal division multiplexing (DFT-s-OFDM) waveforms. If the

TABLE 5

| Type | Search Space | RNTI | Use Case |
|---|---|---|---|
| Type0-PDCCH | Common | SI-RNTI on a primary cell | SIB Decoding |
| Type0A-PDCCH | Common | SI-RNTI on a primary cell | SIB Decoding |
| Type1-PDCCH | Common | RA-RNTI or TC-RNTI on a primary cell | Msg2, Msg4 decoding in RACH |
| Type2-PDCCH | Common | P-RNTI on a primary cell | Paging Decoding |
| Type3-PDCCH | Common | INT-RNTI, SFI-RNTI, TPC-PUSCH-RNTI, TPC-PUCCH-RNTI, TPC-SRS-RNTI, C-RNTI, MCS-C-RNTI, or CS-RNTI(s) | |
| | UE Specific | C-RNTI, or MCS-C-RNTI, or CS-RNTI(s) | User specific PDSCH decoding |

Table 6 lists exemplary DCI formats transmitted on the PDCCH.

TABLE 6

| DCI format | Usage |
|---|---|
| 0_0 | Scheduling of PUSCH in one cell |
| 0_1 | Scheduling of PUSCH in one cell |
| 1_0 | Scheduling of PDSCH in one cell |
| 1_1 | Scheduling of PDSCH in one cell |
| 2_0 | Notifying a group of UEs of the slot format |
| 2_1 | Notifying a group of UEs of the PRB(s) and OFDM symbol(s) where UE may assume no transmission is intended for the UE |
| 2_2 | Transmission of TPC commands for PUCCH and PUSCH |
| 2_3 | Transmission of a group of TPC commands for SRS transmissions by one or more UEs |

DCI format 0_0 may be used to schedule a TB-based (or TB-level) PUSCH, and DCI format 0_1 may be used to schedule a TB-based (or TB-level) PUSCH or a code block PUSCH is transmitted in DFT-s-OFDM waveforms, the UE transmits the PUSCH by applying transform precoding. For example, if transform precoding is impossible (e.g., transform precoding is disabled), the UE may transmit the PUSCH in CP-OFDM waveforms, and if transform precoding is possible (e.g., transform precoding is enabled), the UE may transmit the PUSCH in CP-OFDM waveforms or DFT-s-OFDM waveforms. The PUSCH transmission may be scheduled dynamically by a UL grant in DCI or semi-statically by higher-layer signaling (e.g., RRC signaling) (and/or layer 1 (L1) signaling (e.g., a PDCCH)) (a configured grant). The PUSCH transmission may be performed in a codebook-based or non-codebook-based manner.

1.3.2.2. Physical Uplink Control Channel (PUCCH)

The PUCCH delivers UCI, an HARQ-ACK, and/or an SR and is classified as a short PUCCH or a long PUCCH according to the transmission duration of the PUCCH. Table 7 lists exemplary PUCCH formats.

TABLE 7

| PUCCH format | Length in OFDM symbols $N_{symb}^{PUCCH}$ | Number of bits | Usage | Etc |
|---|---|---|---|---|
| 0 | 1-2 | ≤2 | HARQ, SR | Sequence selection |
| 1 | 4-14 | ≤2 | HARQ, [SR] | Sequence modulation |
| 2 | 1-2 | >2 | HARQ, CSI, [SR] | CP-OFDM |

TABLE 7-continued

| PUCCH format | Length in OFDM symbols $N_{symb}^{PUCCH}$ | Number of bits | Usage | Etc |
|---|---|---|---|---|
| 2 | 4-14 | >2 | HARQ, CSI, [SR] | DFT-s-OFDM (no UE multiplexing) |
| 4 | 4-14 | >2 | HARQ, CSI, [SR] | DFT-s-OFDM (Pre DFT OCC) |

PUCCH format 0 conveys UCI of up to 2 bits and is mapped in a sequence-based manner, for transmission. Specifically, the UE transmits specific UCI to the BS by transmitting one of a plurality of sequences on a PUCCH of PUCCH format 0. Only when the UE transmits a positive SR, the UE transmits the PUCCH of PUCCH format 0 in a PUCCH resource for a corresponding SR configuration.

PUCCH format 1 conveys UCI of up to 2 bits and modulation symbols of the UCI are spread with an OCC (which is configured differently whether frequency hopping is performed) in the time domain. The DMRS is transmitted in a symbol in which a modulation symbol is not transmitted (i.e., transmitted in time division multiplexing (TDM)).

PUCCH format 2 conveys UCI of more than 2 bits and modulation symbols of the DCI are transmitted in frequency division multiplexing (FDM) with the DMRS. The DMRS is located in symbols #1, #4, #7, and #10 of a given RB with a density of ⅓. A pseudo noise (PN) sequence is used for a DMRS sequence. For 1-symbol PUCCH format 2, frequency hopping may be activated.

PUCCH format 3 does not support UE multiplexing in the same PRBS, and conveys UCI of more than 2 bits. In other words, PUCCH resources of PUCCH format 3 do not include an OCC. Modulation symbols are transmitted in TDM with the DMRS.

PUCCH format 4 supports multiplexing of up to 4 UEs in the same PRBS, and conveys UCI of more than 2 bits. In other words, PUCCH resources of PUCCH format 3 includes an OCC. Modulation symbols are transmitted in TDM with the DMRS.

1.4. Analog Beamforming

In a millimeter wave (mmW) system, since a wavelength is short, a plurality of antenna elements can be installed in the same area. That is, considering that the wavelength at 30 GHz band is 1 cm, a total of 100 antenna elements can be installed in a 5*5 cm panel at intervals of 0.5 lambda (wavelength) in the case of a 2-dimensional array. Therefore, in the mmW system, it is possible to improve the coverage or throughput by increasing the beamforming (BF) gain using multiple antenna elements.

In this case, each antenna element can include a transceiver unit (TXRU) to enable adjustment of transmit power and phase per antenna element. By doing so, each antenna element can perform independent beamforming per frequency resource.

However, installing TXRUs in all of the about 100 antenna elements is less feasible in terms of cost. Therefore, a method of mapping a plurality of antenna elements to one TXRU and adjusting the direction of a beam using an analog phase shifter has been considered. However, this method is disadvantageous in that frequency selective beamforming is impossible because only one beam direction is generated over the full band.

To solve this problem, as an intermediate form of digital BF and analog BF, hybrid BF with B TXRUs that are fewer than Q antenna elements can be considered. In the case of the hybrid BF, the number of beam directions that can be transmitted at the same time is limited to B or less, which depends on how B TXRUs and Q antenna elements are connected.

Figure 8:
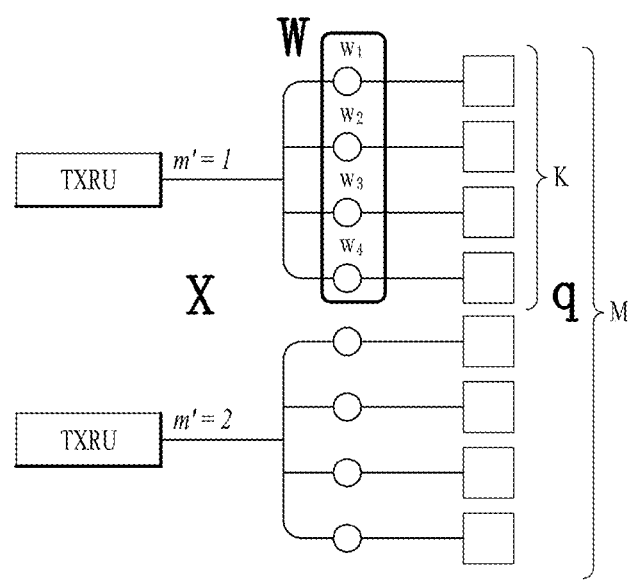
FIG. 8 is a diagram illustrating a representative method of connecting transceiver units (TXRUs) to antenna elements according to various embodiments of the present disclosure.
Figure 9:
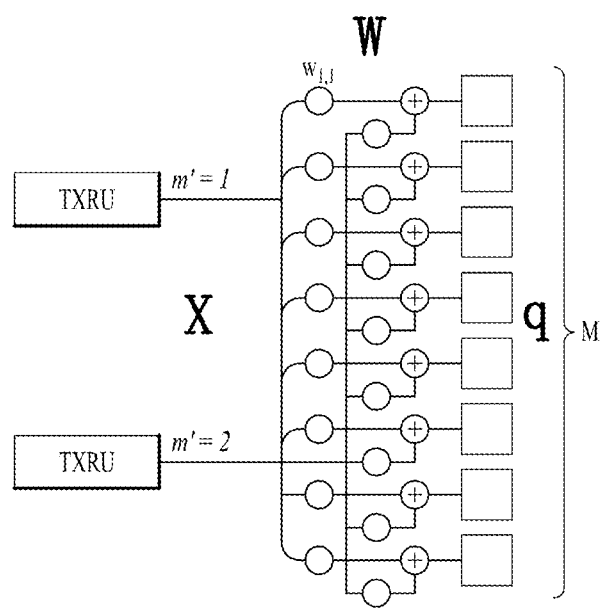
FIG. 9 is a diagram illustrating a representative method of connecting TXRUs to antenna elements according to various embodiments of the present disclosure.

FIGS. 8 and 9 are diagrams illustrating representative methods for connecting TXRUs to antenna elements. Here, the TXRU virtualization model represents the relationship between TXRU output signals and antenna element output signals.

FIG. 8 shows a method for connecting TXRUs to subarrays. In FIG. 8, one antenna element is connected to one TXRU.

Meanwhile, FIG. 9 shows a method for connecting all TXRUs to all antenna elements. In FIG. 9, all antenna elements are connected to all TXRUs. In this case, separate addition units are required to connect all antenna elements to all TXRUs as shown in FIG. 9.

In FIGS. 8 and 9, W indicates a phase vector weighted by an analog phase shifter. That is, W is a major parameter determining the direction of the analog beamforming. In this case, the mapping relationship between channel state information-reference signal (CSI-RS) antenna ports and TXRUs may be 1:1 or 1-to-many.

The configuration shown in FIG. 8 has a disadvantage in that it is difficult to achieve beamforming focusing but has an advantage in that all antennas can be configured at low cost.

On the contrary, the configuration shown in FIG. 9 is advantageous in that beamforming focusing can be easily achieved. However, since all antenna elements are connected to the TXRU, it has a disadvantage of high cost.

When a plurality of antennas is used in the NR system to which the present disclosure is applicable, a hybrid beamforming (BF) scheme in which digital BF and analog BF are combined may be applied. In this case, analog BF (or radio frequency (RF) BF) means an operation of performing precoding (or combining) at an RF stage. In hybrid BF, each of a baseband stage and the RF stage perform precoding (or combining) and, therefore, performance approximating to digital BF can be achieved while reducing the number of RF chains and the number of a digital-to-analog (D/A) (or analog-to-digital (A/D) converters.

For convenience of description, a hybrid BF structure may be represented by N TXRUs and M physical antennas. In this case, digital BF for L data layers to be transmitted by a transmission end may be represented by an N-by-L matrix. N converted digital signals obtained thereafter are converted into analog signals via the TXRUs and then subjected to analog BF, which is represented by an M-by-N matrix.

Figure 10:
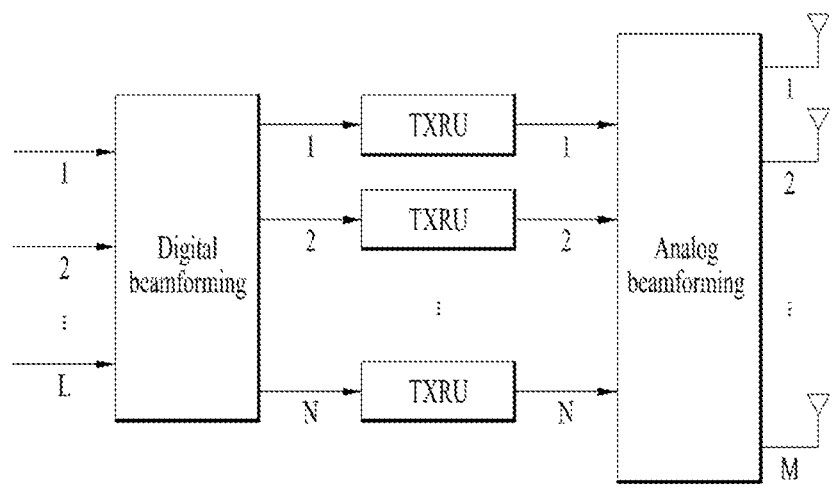
FIG. 10 is a simplified diagram illustrating a hybrid beamforming structure from the perspective of TXRUs and physical antennas according to various embodiments of the present disclosure.

FIG. 10 is a diagram schematically illustrating an exemplary hybrid BF structure from the perspective of TXRUs and physical antennas according to the present disclosure. In FIG. 10, the number of digital beams is L and the number analog beams is N.

Additionally, in the NR system to which the present disclosure is applicable, an BS designs analog BF to be changed in units of symbols to provide more efficient BF support to a UE located in a specific area. Furthermore, as illustrated in FIG. 7, when N specific TXRUs and M RF antennas are defined as one antenna panel, the NR system according to the present disclosure considers introducing a plurality of antenna panels to which independent hybrid BF is applicable.

In the case in which the BS utilizes a plurality of analog beams as described above, the analog beams advantageous for signal reception may differ according to a UE. Therefore, in the NR system to which the present disclosure is applicable, a beam sweeping operation is being considered in which the BS transmits signals (at least synchronization signals, system information, paging, and the like) by applying different analog beams in a specific subframe or slot on a symbol-by-symbol basis so that all UEs may have reception opportunities.

Figure 11:
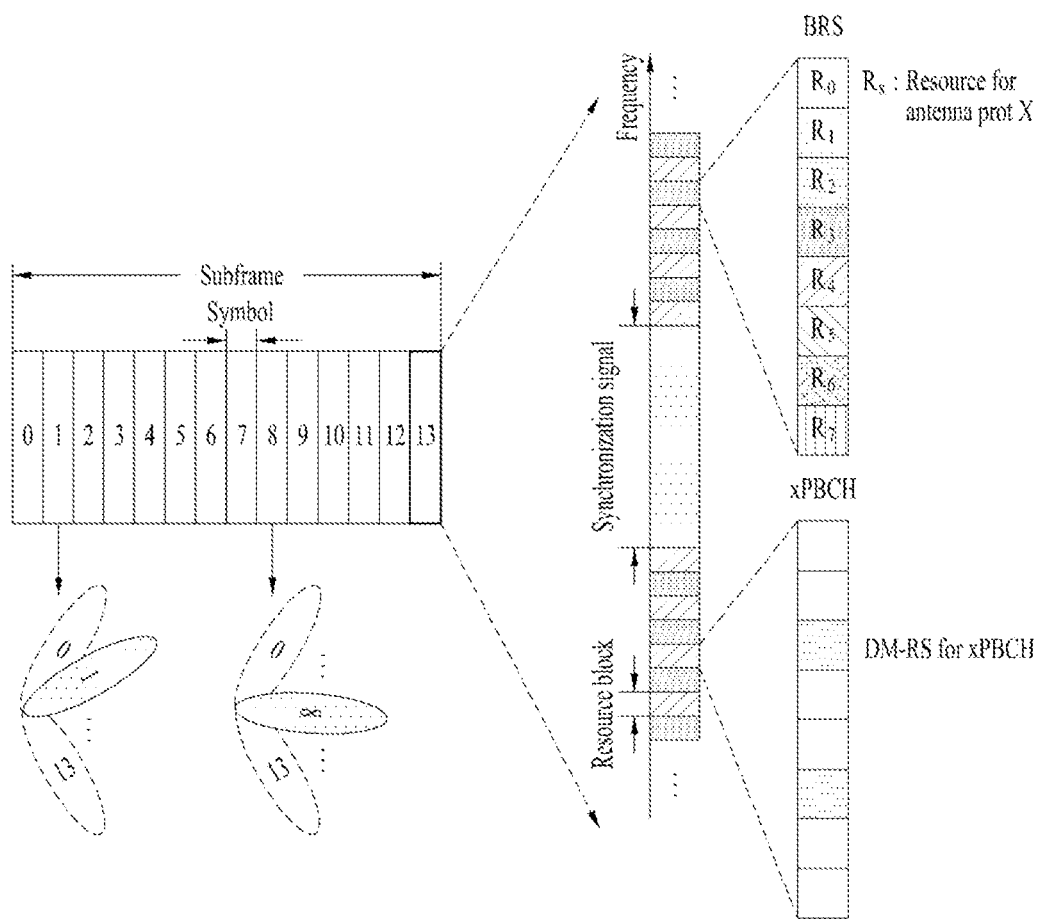
FIG. 11 is a simplified diagram illustrating a beam sweeping operation for a synchronization signal and system information in a downlink (DL) transmission procedure according to various embodiments of the present disclosure.

FIG. 11 is a simplified diagram illustrating a beam sweeping operation for a synchronization signal and system information in a DL transmission procedure according to various embodiments of the present disclosure.

In FIG. 11, a physical resource (or physical channel) in which the system information of the NR system to which various embodiments of the present disclosure are applicable is transmitted in a broadcasting manner is referred to as an xPBCH. Analog beams belonging to different antenna panels may be transmitted simultaneously in one symbol.

As illustrated in FIG. 11, in order to measure a channel for each analog beam in the NR system to which various embodiments of the present disclosure are applicable, a beam RS (BRS), which is a reference signal (RS) transmitted by applying a single analog beam (corresponding to a specific antenna panel), may be introduced. The BRS may be defined for a plurality of antenna ports, and each antenna port of the BRS may correspond to a single analog beam. Unlike the BRS, a synchronization signal or the xPBCH may be transmitted by applying all analog beams of an analog beam group such that any UE may receive the signal successfully.

1.5. Cell Search

Figure 12:
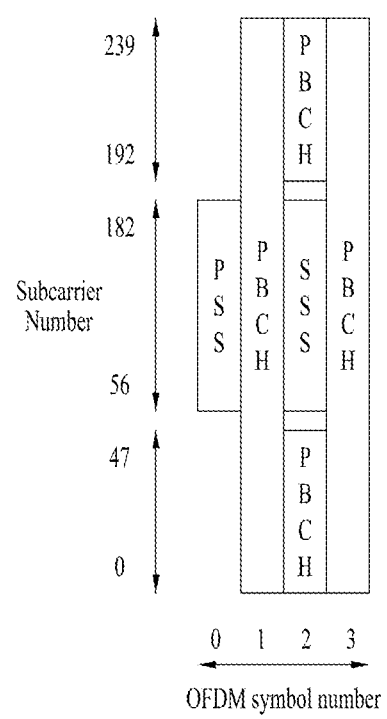
FIG. 12 is a diagram illustrating the structure of a synchronization signal block (SSB) to which various embodiments of the present disclosure are applicable.

FIG. 12 is a diagram illustrating the structure of a synchronization signal block (SSB) to which various embodiments of the present disclosure are applicable.

A UE may perform cell search, system information acquisition, beam alignment for initial access, DL measurement, and so on based on an SSB. The term SSB is interchangeably used with synchronization signal/physical broadcast channel (SS/PBCH) block.

Referring to FIG. 12, the SSB to which various embodiments of the present disclosure are applicable may include 20 RBs in four consecutive OFDM symbols. Further, the SSB may include a PSS, an SSS, and a PBCH, and the UE may perform cell search, system information acquisition, beam alignment for initial access, DL measurement, and so on based on the SSB.

Each of the PSS and the SSS includes one OFDM symbol by 127 subcarriers, and the PBCH includes three OFDM symbols by 576 subcarriers. Polar coding and QPSK are applied to the PBCH. The PBCH includes data REs and DMRS REs in every OFDM symbol. There are three DMRS REs per RB, with three data REs between every two adjacent DMRS REs.

Further, the SSB may be transmitted in a frequency band other than the center of the frequency band used by the network.

For this purpose, a synchronization raster being candidate frequency positions at which the UE should detect the SSB is defined in the NR system to which various embodiments of the present disclosure are applicable. The synchronization raster may be distinguished from a channel raster.

In the absence of explicit signaling of the position of the SSB, the synchronization raster may indicate available frequency positions for the SSB, at which the UE may acquire system information.

The synchronization raster may be determined based on a global synchronization channel number (GSCN). The GSCN may be transmitted by RRC signaling (e.g., an MIB, a system information block (SIB), remaining minimum system information (RMSI), other system information (OSI), or the like).

The synchronization raster is defined to be longer along the frequency axis than the channel raster and characterized by a smaller number of blind detections than the channel raster, in consideration of the complexity of initial synchronization and a detection speed.

Cell search refers to a procedure in which the UE acquires time/frequency synchronization of a cell and detects a cell ID (e.g., physical layer cell ID (PCID)) of the cell. The PSS may be used to detect a cell ID within a cell ID group, and the SSS may be used to detect the cell ID group. The PBCH may be used in detecting an SSB (time) index and a half-frame.

The cell search procedure of the UE may be summarized as described in Table 8 below.

TABLE 8

| | Type of Signals | Operations |
|---|---|---|
| 1$^{st}$ step | PSS | SS/PBCH block (SSB) symbol timing acquisition<br>Cell ID detection within a cell ID group (3 hypothesis) |
| 2$^{nd}$ Step | SSS | Cell ID group detection (336 hypothesis) |
| 3$^{rd}$ Step | PBCH DMRS | SSB index and Half frame (HF) index (Slot and frame boundary detection) |
| 4$^{th}$ Step | PBCH | Time information (80 ms, System Frame Number (SFN), SSB index, HF)<br>Remaining Minimum System Information (RMSI) Control resource set (CORESET)/Search space configuration |
| 5$^{th}$ Step | PDCCH and PDSCH | Cell access information<br>RACH configuration |

There are 336 cell ID groups each including three cell IDs. There are 1008 cell IDs in total. Information about a cell ID group to which the cell ID of a cell belongs may be provided/obtained through the SSS of the cell, and information about the cell ID among 336 cells in the cell ID may be provided/obtained through the PSS.

Figure 13:
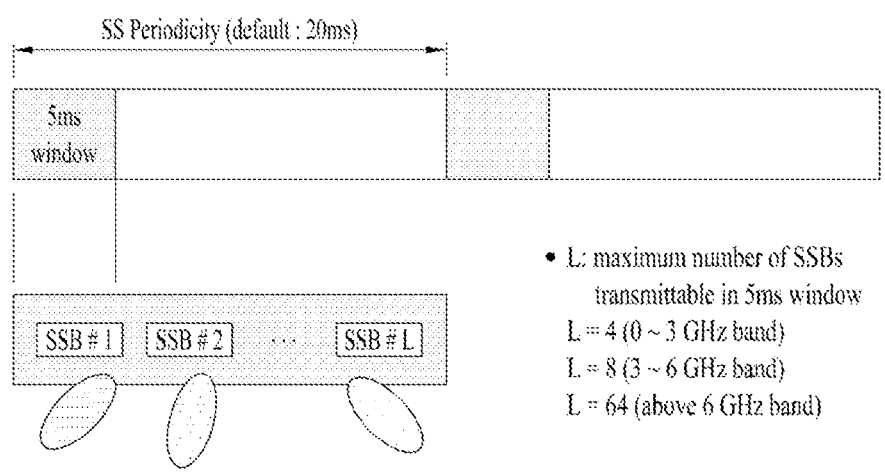
FIG. 13 is a diagram illustrating an exemplary SSSB transmission method to which various embodiments of the present disclosure are applicable.

FIG. 13 is a diagram illustrating an exemplary SSB transmission method to which various embodiments of the present disclosure are applicable.

Referring to FIG. 13, the SSB is periodically transmitted according to an SSB periodicity. A default SSB periodicity assumed by the UE during initial cell search is defined as 20 ms. After the cell access, the SSB periodicity may be set to one of {5 ms, 10 ms, 20 ms, 40 ms, 80 ms, 160 ms} by the network (e.g., the BS). An SSB burst set is configured at the beginning of an SSB period. The SSB burst set may be configured with a 5-ms time window (i.e., half-frame), and an SSB may be repeatedly transmitted up to L times within the SS burst set. The maximum number of transmissions of the SSB, L may be given according to the frequency band of a carrier as follows. One slot includes up to two SSBs.

For frequency range up to 3 GHz, L=4
For frequency range from 3 GHz to 6 GHz, L=8
For frequency range from 6 GHz to 52.6 GHz, L=64

The time position of an SSB candidate in the SS burst set may be defined according to an SCS as follows. The time positions of SSB candidates are indexed as (SSB indexes) 0 to L−1 in time order within the SSB burst set (i.e., half-frame).

Case A: 15-kHz SCS: The indexes of the first symbols of candidate SSBs are given as $\{2, 8\}+14*n$ where n=0, 1 for a carrier frequency equal to or lower than 3 GHz, and n=0, 1, 2, 3 for a carrier frequency of 3 GHz to 6 GHz.

Case B: 30-kHz SCS: The indexes of the first symbols of candidate SSBs are given as $\{4, 8, 16, 20\}+28*n$ where n=0 for a carrier frequency equal to or lower than 3 GHz, and n=0, 1 for a carrier frequency of 3 GHz to 6 GHz.

Case C: 30-kHz SCS: The indexes of the first symbols of candidate SSBs are given as $\{2, 8\}+14*n$ where n=0, 1 for a carrier frequency equal to or lower than 3 GHz, and n=0, 1, 2, 3 for a carrier frequency of 3 GHz to 6 GHz.

Case D: 120-kHz SCS: The indexes of the first symbols of candidate SSBs are given as $\{4, 8, 16, 20\}+28*n$ where n=0, 1, 2, 3, 5, 6, 7, 8, 10, 11, 12, 13, 15, 16, 17, 18 for a carrier frequency above 6 GHz.

Case E: 240-kHz SCS: The indexes of the first symbols of candidate SSBs are given as $\{8, 12, 16, 20, 32, 36, 40, 44\}+56*n$ where n=0, 1, 2, 3, 5, 6, 7, 8 for a carrier frequency above 6 GHz.

1.6. Synchronization Procedure

The UE may acquire synchronization by receiving the above-described SSB from the BS. The synchronization procedure largely includes cell ID detection and timing detection. The cell ID detection may include PSS-based cell ID detection and SSS-based cell ID detection. The timing detection may include PBCH DMRS-based timing detection and PBCH content-based (e.g., MIB-based) timing detection.

First, the UE may acquire timing synchronization and the physical cell ID of a detected cell by detecting a PSS and an SSS. More specifically, the UE may acquire the symbol timing of the SS block and detect a cell ID within a cell ID group, by PSS detection. Subsequently, the UE detects the cell ID group by SSS detection.

Further, the UE may detect the time index (e.g., slot boundary) of the SS block by the DMRS of the PBCH. The UE may then acquire half-frame boundary information and system frame number (SFN) information from an MIB included in the PBCH.

The PBCH may indicate that a related (or corresponding) RMSI PDCCH/PDSCH is transmitted in the same band as or a different band from that of the SS/PBCH block. Accordingly, the UE may then receive RMSI (e.g., system information other than the MIB) in a frequency band indicated by the PBCH or a frequency band carrying the PBCH, after decoding the PBCH.

In relation to the operation, the UE may acquire system information.

The MIB includes information/parameters required for monitoring a PDCCH that schedules a PDSCH carrying SystemInformationBlock1 (SIB1), and is transmitted to the UE on the PBCH in the SS/PBCH block by the BS.

The UE may check whether there is a CORESET for a Type0-PDCCH common search space, based on the MIB. The Type0-PDCCH common search space is a kind of PDCCH search space and used to transmit a PDCCH that schedules a system information (SI) message.

In the presence of a Type0-PDCCH common search space, the UE may determine (i) a plurality of contiguous RBs included in the CORESET and one or more consecutive symbols and (ii) a PDCCH occasion (e.g., a time-domain position for PDCCH reception), based on information (e.g., pdcch-ConfigSIB1) included in the MIB.

In the absence of a Type0-PDCCH common search space, pdcch-ConfigSIB1 provides information about a frequency position at which the SSB/SIB1 exists and a frequency range in which the SSB/SIB1 does not exist.

SIB1 includes information about the availability and scheduling of the other SIBs (hereinafter, referred to as SIBx where x is an integer equal to or larger than 2). For example, SIB1 may indicate whether SIBx is periodically broadcast or provided in an on-demand manner (or upon request of the UE). When SIBx is provided in the on-demand manner, SIB1 may include information required for an SI request of the UE. SIB1 is transmitted on a PDSCH. A PDCCH that schedules SIB1 is transmitted in a Type0-PDCCH common search space, and SIB1 is transmitted on a PDSCH indicated by the PDCCH.

1.7. Quasi Co-Located or Quasi Co-Location (QCL)

The UE may receive a list of up to M candidate transmission configuration indication (TCI)-State configurations to decode a PDSCH according to a detected PDCCH carrying DCI intended for the UE and a given cell. M depends on a UE capability.

Each TCI-State includes a parameter for establishing a QCL relationship between one or two DL RSs and a PDSCH DMRS port. The QCL relationship is established with an RRC parameter qcl-Type1 for a first DL RS and an RRC parameter qcl-Type2 for a second DL RS (if configured).

The QCL type of each DL RS is given by a parameter 'qcl-Type' included in QCL-Info, and may have one of the following values.

'QCL-TypeA': {Doppler shift, Doppler spread, average delay, delay spread}
'QCL-TypeB': {Doppler shift, Doppler spread}
'QCL-TypeC': {Doppler shift, average delay}
'QCL-TypeD': {Spatial Rx parameter}

For example, when a target antenna port is for a specific non-zero power (NZP) CSI-RS, corresponding NZP CSI-RS antenna ports may be indicated/configured as QCLed with a specific TRS from the perspective of QCL-Type A and with a specific SSB from the perspective of QCL-Type D. Upon receipt of this indication/configuration, the UE may receive the NZP CSI-RS using a Doppler value and a delay value which are measured in a QCL-TypeA TRS, and apply a reception (Rx) beam used to receive a QCL-Type D SSB for reception of the NZP CSI-RS.

1.8. Unlicensed Band/Shared Spectrum System

Figure 14:
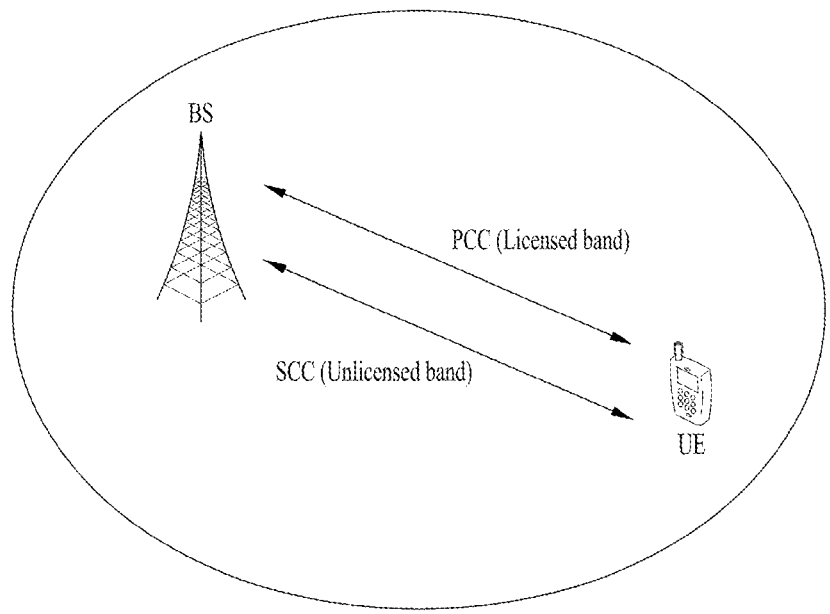
FIG. 14 is a diagram illustrating an exemplary wireless communication system supporting an unlicensed band, to which various embodiments of the present disclosure are applicable.
Figure 14:
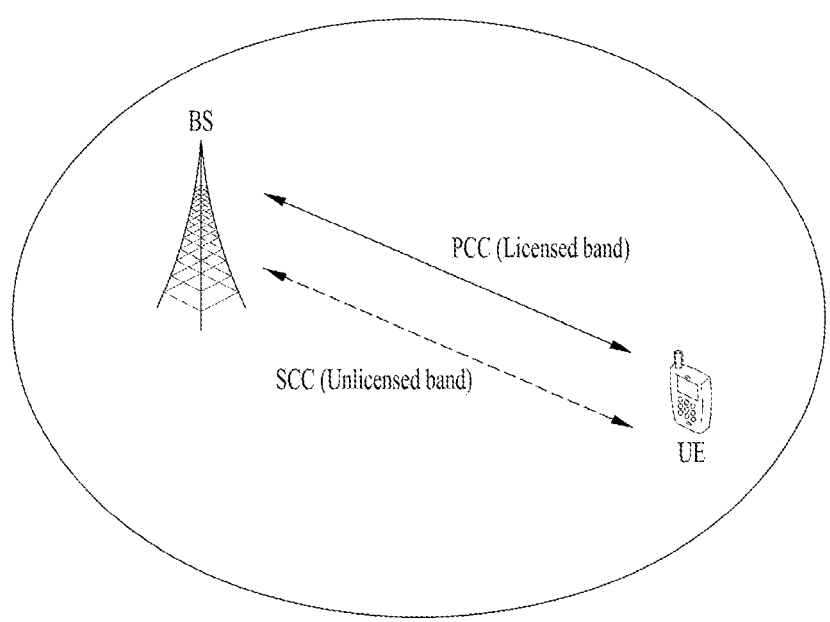

FIG. 14 is a diagram illustrating an exemplary wireless communication system supporting an unlicensed band to which various embodiments of the present disclosure are applicable.

In the following description, a cell operating in a licensed band (hereinafter, referred to as L-band) is defined as an L-cell, and a carrier of the L-cell is defined as a (DL/UL) LCC. In addition, a cell operating in an unlicensed band (hereinafter, referred to as a U-band) is defined as a U-cell, and a carrier of the U-cell is defined as a (DL/UL) UCC. The carrier/carrier-frequency of a cell may refer to the operating frequency (e.g., center frequency) of the cell. A cell/carrier (e.g., component carrier (CC)) is collectively referred to as a cell.

As illustrated in FIG. 14(a), when the UE and the BS transmit and receive signals in carrier-aggregated LCC and UCC, the LCC may be configured as a primary CC (PCC) and the UCC may be configured as a secondary CC (SCC).

As illustrated in FIG. 14(b), the UE and the BS may transmit and receive signals in one UCC or a plurality of carrier-aggregated LCC and UCC. That is, the UE and the BS may transmit and receive signals only in the UCC(s) without the LCC. An operation of transmitting and receiving a signal in an unlicensed band as described in various embodiments of the present disclosure may be performed based on all the deployment scenarios described above (unless otherwise stated).

1.8.1. Radio Frame Structure for Unlicensed Band

LTE frame structure type 3 or an NR frame structure may be used for operation in an unlicensed band. The configuration of OFDM symbols occupied for a UL/DL signal transmission in the frame structure for the unlicensed band may be configured by the BS. Herein, an OFDM symbol may be replaced with an SC-FDM(A) symbol.

For a DL signal transmission in the unlicensed band, the BS may indicate the configuration of OFDM symbols used in subframe #n to the UE by signaling. In the following description, a subframe may be replaced with a slot or a TU.

Specifically, in the wireless communication system supporting the unlicensed band, the UE may assume (or identify) the configuration of OFDM symbols occupied in subframe #n by a specific field (e.g., a Subframe configuration for LAA field) in DCI received in subframe #n−1 or subframe #n from the BS.

Table 9 illustrates an exemplary method of indicating the configuration of OFDM symbols used for transmission of a DL physical channel and/or physical signal in a current and/or next subframe by the Subframe configuration for LAA field in the wireless communication system.

TABLE 9

| Value of 'Subframe configuration for LAA' field in current subframe | Configuration of occupied OFDM symbols (current subframe, next subframe) |
| --- | --- |
| 0000 | (—, 4) |
| 0001 | (—, 12) |
| 0010 | (—, 11) |
| 0011 | (—, 10) |
| 0100 | (—, 9) |
| 0101 | (—, 6) |
| 0110 | (—, 3) |
| 0111 | (14, *) |
| 1000 | (12, —) |
| 1001 | (11, —) |
| 1010 | (10, —) |
| 1011 | (9, —) |
| 1100 | (6, —) |
| 1101 | (3, —) |
| 1110 | reserved |
| 1111 | reserved |

NOTE:
(—, Y) means UE may assume the first Y symbols are occupied in next subframe and other symbols in the next subframe are not occupied.
(X, —) means UE may assume the first X symbols are occupied in current subframe and other symbols in the current subframe are not occupied.
(X, *) means UE may assume the first X symbols are occupied in current subframe, and at least the first OFDM symbol of the next subframe is not occupied.

For a UL signal transmission in the unlicensed band, the BS may transmit information about a UL transmission period to the UE by signaling.

Specifically, in an LTE system supporting an unlicensed band, the UE may acquire 'UL duration' and 'UL offset' information for subframe #n from a 'UL duration and offset' field in detected DCI.

Table 10 illustrates an exemplary method of indicating a UL offset and UL duration configuration by the UL duration and offset field in the wireless communication system.

TABLE 10

| Value of 'UL duration and offset' field | UL offset, l (in subframes) | UL duration, d (in subframes) |
| --- | --- | --- |
| 00000 | Not configured | Not configured |
| 00001 | 1 | 1 |
| 00010 | 1 | 2 |
| 00011 | 1 | 3 |
| 00100 | 1 | 4 |
| 00101 | 1 | 5 |
| 00110 | 1 | 6 |
| 00111 | 2 | 1 |
| 01000 | 2 | 2 |
| 01001 | 2 | 3 |
| 01010 | 2 | 4 |
| 01011 | 2 | 5 |
| 01100 | 2 | 6 |
| 01101 | 3 | 1 |
| 01110 | 3 | 2 |
| 01111 | 3 | 3 |
| 10000 | 3 | 4 |
| 10001 | 3 | 5 |
| 10010 | 3 | 6 |
| 10011 | 4 | 1 |
| 10100 | 4 | 2 |
| 10101 | 4 | 3 |
| 10110 | 4 | 4 |
| 10111 | 4 | 5 |
| 11000 | 4 | 6 |
| 11001 | 6 | 1 |
| 11010 | 6 | 2 |
| 11011 | 6 | 3 |
| 11100 | 6 | 4 |
| 11101 | 6 | 5 |
| 11110 | 6 | 6 |
| 11111 | reserved | reserved |

1.8.2. Overview of Channel Access Procedures

Unless otherwise noted, the definitions below are applicable to terminologies used in the following description of various embodiments of the present disclosure.

A channel refers to a carrier or a part of a carrier including a set of consecutive RBs in which a channel access procedure is performed in a shared spectrum.

A channel access procedure may be a procedure based on sensing that evaluates the availability of a channel for performing a transmission. A basic unit for sensing is a sensing slot with a duration of Tsl=9 us. The sensing slot duration may be considered to be idle if the BS or the UE senses the channel during the sensing slot duration, and determines that detected power for at least 4 us within the sensing slot duration is less than an energy detection threshold XThresh. Otherwise, the sensing slot duration Tsl may be considered to be busy.

Channel occupancy refers to transmission(s) on channel(s) from the BS/UE after performing a corresponding channel access procedure in this subclause.

A channel occupancy time refers to the total time during which the BS/UE and any BS/UE sharing channel occupancy performs transmission(s) on a channel after the BS/UE performs the corresponding channel access procedure described in this subclause. For determining a channel occupancy time, if a transmission gap is less than or equal to 25 us, the gap duration may be counted in the channel occupancy time. The channel occupancy time may be shared for transmission between the BS and corresponding UE(s).

1.8.3. Downlink Channel Access Procedure

For a DL signal transmission in an unlicensed band, the BS may perform a DL channel access procedure (CAP) for the unlicensed band as follows.

1.8.3.1. Type 1 DL Channel Access Procedures

This subclause describes CAPs to be performed by the BS, in which a time duration spanned by sensing slots sensed to be idle before DL transmission(s) is random. This subclause is applicable to the following transmissions:

Transmission(s) initiated by a BS including a PDSCH/PDCCH/EPDCCH, or

Transmission(s) initiated by a BS including a unicast PDSCH with user plane data, or a unicast PDSCH with user plane data and a unicast PDCCH scheduling user plane data, or Transmission(s) initiated by a BS with only a discovery burst or with a discovery burst multiplexed with non-unicast information, where the duration of the transmission(s) is larger than 1 ms or the transmission causes the discovery burst duty cycle to exceed 1/20.

Figure 15:
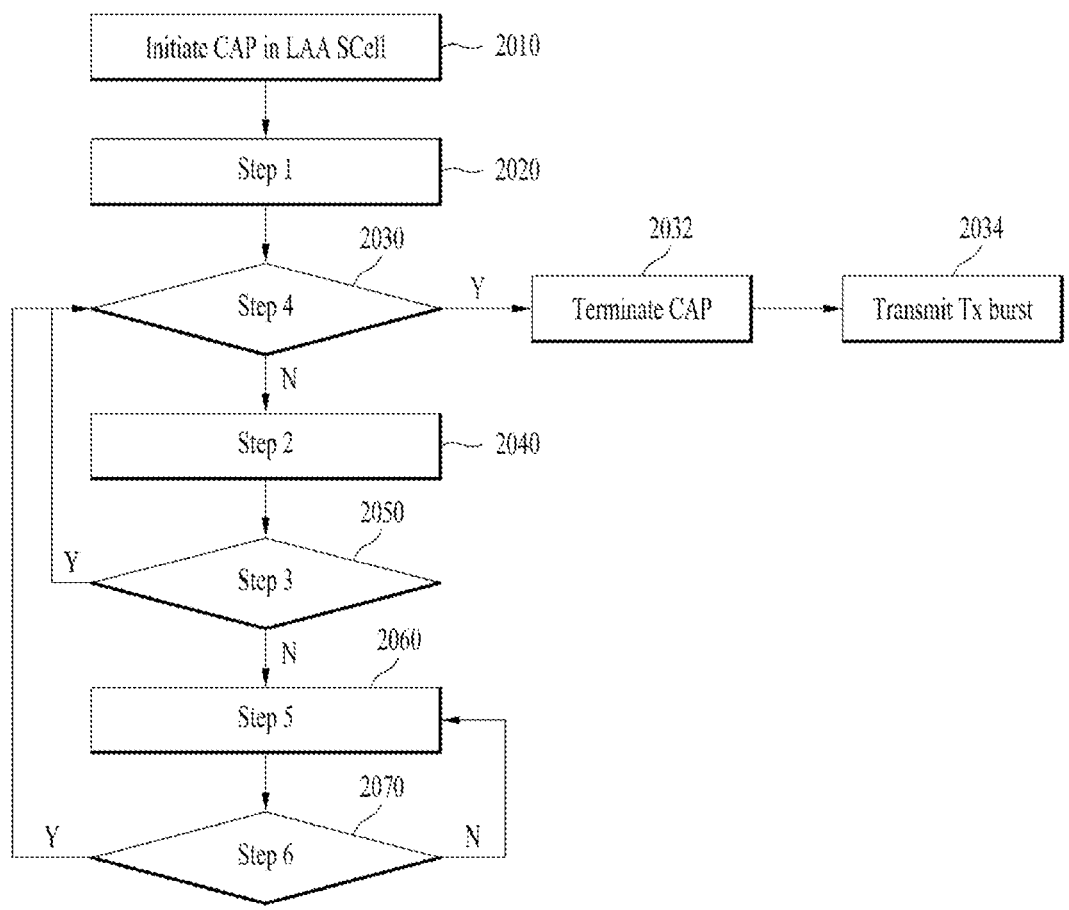
FIG. 15 is a diagram illustrating a DL channel access procedure (CAP) for a transmission in an unlicensed band, to which various embodiments of the present disclosure are applicable.

FIG. 15 is a diagram illustrating a DL CAP for transmission in an unlicensed band, to which various embodiments of the present disclosure are applicable.

A Type 1 DL CAP for transmission in an unlicensed band, to which various embodiments of the present disclosure are applicable may be summarized as follows.

For a DL transmission, a transmission node (e.g., a BS) may initiate a CAP (2010).

The BS may randomly select a backoff counter N within a contention window (CW) according to step 1. N is set to an initial value $N_{init}$ (2020). $N_{init}$ is a random value selected between 0 and $CW_p$.

Subsequently, when the backoff counter value N is 0 according to step 4 (2030; Y), the BS terminates the CAP (2032). The BS may then perform a transmission (Tx) burst transmission (2034). On the contrary, when the backoff counter value N is not 0 (2030; N), the BS decrements the backoff counter value by 1 according to step 2 (2040).

Subsequently, the BS checks whether the channel is idle (2050). If the channel is idle (2050; Y), the BS determines whether the backoff counter value is 0 (2030).

On the contrary, when the channel is not idle, that is, the channel is busy in operation 2050 (2050; N), the BS determines whether the channel is idle during a longer defer duration Td (25 usec or longer) than a sensing slot duration (e.g., 9 usec) (2060). If the channel is idle during the defer duration (2070; Y), the BS may resume the CAP.

For example, when the backoff counter value $N_{init}$ is 10 and the channel is determined to be idle after the backoff counter value is decremented to 5, the BS senses the channel during the defer duration and determines whether the channel is idle. If the channel is idle during the defer duration, the BS may resume the CAP from the backoff counter value 5 (or from the backoff counter value 4 obtained by decrementing the backoff counter value 5 by 1), instead of setting the backoff counter value $N_{init}$.

On the other hand, when the channel is busy during the defer duration (2070; N), the BS determines again whether the channel is idle during a new defer duration by performing step 2060 again.

If the BS has not performed a transmission after step 4 in the above procedure, the BS may perform the transmission on the channel, if the following condition is satisfied:

If the BS is ready to transmit and the channel is sensed to be idle during at least a sensing slot duration $T_{sl}$, and if the channel has been sensed to be idle during all the sensing slot durations of a defer duration $T_d$ immediately before this transmission.

On the contrary, if the channel has not been sensed to be idle during the sensing slot duration $T_{sl}$ when the BS first senses the channel after it is ready to transmit or if the channel has not been sensed to be idle during any of the sensing slot durations of the defer duration $T_d$ immediately before this intended transmission, the BS proceeds to step 1 after sensing the channel to be idle during the sensing slot durations of the defer duration $T_{sl}$.

The defer duration $T_d$ includes a duration $T_f$ (=16 us) immediately followed by mp consecutive sensing slot durations. Each sensing slot duration $T_{sl}$ is 9 us and the duration $T_f$ includes an idle sensing slot duration $T_{sl}$ at the start of the duration $T_f$.

Table 11 illustrates that mp, a minimum CW, a maximum CW, a maximum channel occupancy time (MCOT), and an allowed CW size applied to a CAP vary according to a channel access priority class.

TABLE 11

| Channel Access Priority Class (p) | $m_p$ | $CW_{min,p}$ | $CW_{max,p}$ | $T_{mcot,p}$ | allowed $CW_p$ sizes |
|---|---|---|---|---|---|
| 1 | 1 | 3 | 7 | 2 ms | {3, 7} |
| 2 | 1 | 7 | 15 | 3 ms | {7, 15} |
| 3 | 3 | 15 | 63 | 8 or 10 ms | {15, 31, 63} |
| 4 | 7 | 15 | 1023 | 8 or 10 ms | {15, 31, 63, 127, 255, 511, 1023} |

1.8.3.2. Type 2A DL Channel Access Procedure

The BS may perform a DL transmission immediately after sensing a corresponding channel to be idle during at least a sensing duration $T_{short\ dl}$ (=25 us). $T_{short\ dl}$ includes a duration $T_f$ (=16 us) following one sensing slot duration. $T_f$ includes a sensing slot at the start of $T_f$. If two sensing slots within $T_{short\ dl}$ are sensed to be idle, the channel is considered to be idle for $T_{short\ dl}$.

1.8.4. Channel Access Procedure for Transmission(s) on Multiple Channels

The BS may access multiple channels on which a transmission is performed in one of the following Type A and Type B procedures.

1.8.4.1. Type A Multi-Carrier Access Procedures

According to the procedure described in this subclause, the BS performs channel access on each channel $c_i \in C$ where C is a set of channels that the BS intends to transmit, =0, 1, ... q−1, and q is the number of channels to be transmitted by the BS.

A counter N considered in a CAP is determined for each channel $c_i$, and in this case, the counter for each channel is represented as $N_{c_i}$.

1.8.4.1.1. Type A1 Multi-Carrier Access Procedure

The counter N considered in the CAP is determined independently for each channel $c_i$, and the counter for each channel is represented as $N_{c_i}$.

In the case where the BS ceases a transmission on one channel $c_j \in C$, if the absence of any other technology sharing the channel may be guaranteed on a long term basis (e.g., by level of regulation), the BS may resume $N_{c_i}$ reduction, when an idle slot is detected after waiting for a duration of $4 \cdot T_{sl}$ or reinitializing $N_{c_i}$ for each channel $c_i$ (where $c_i$ is different from $c_j$ ($c_i \neq c_j$)).

1.8.4.1.1.2. Type A2 Multi-Carrier Access Procedure

The counter N for each channel $c_j \in C$ may be determined according to the afore-described subclause 1.8.3., and is denoted by $N_{c_j}$. Here, $c_j$ may mean a channel having the largest $CW_p$ value. For each channel $c_j$, $N_{c_i} = N_{c_j}$.

When the BS ceases a transmission on any one channel for which $N_{c_i}$ has been determined, the BS reinitializes $N_{c_i}$ for all channels.

1.8.4.2. Type B Multi-Channel Access Procedure

The BS may select a channel $c_j \in C$ as follows.

The BS selects $c_j$ uniformly randomly from C before each transmission on multiple channels $c_i \in C$.

Or the BS does not select $c_j$ more than once every one second.

Herein, C is a set of channels that the BS intends to transmit, i=0, 1, ... q−1, and q is the number of channels to be transmitted by the BS.

For a transmission on a channel $c_j$, the BS performs channel access on the channel $c_j$ according to the procedure described in subclause 1.8.3.1 along with the modification described in subclause 1.8.4.2.1. or subclause 1.8.4.2.2.

For a transmission on the channel $c_i \neq c_j$ among the channels $c_i \in C$, For each channel $c_i$, the BS senses the channel $c_i$ for at least a sensing interval $T_{mc} = 25$ us immediately before the transmission on the channel $c_i$. The BS may perform a transmission on the channel $c_i$ immediately after sensing that the channel $c_i$ is idle during at least the sensing interval $T_{mc}$. When the channel is sensed as idle during all time periods during which idle sensing is performed on the channel $c_j$ within the given interval $T_{mc}$, the channel $c_i$ may be considered to be idle for $T_{mc}$.

The BS does not continuously perform transmissions on the channel $c_i \neq c_j$ ($c_i \in C$) for a period exceeding $T_{mcot,p}$ as given in Table 15. $T_{mcot,p}$ is determined using a channel access parameter used for the channel $c_j$.

In the procedure of this subclause, the channel frequency of the channel set C selected by the gNB is one subset of a predefined channel frequency set.

1.8.4.2.1. Type B1 Multi-Channel Access Procedure

A single $CW_p$ value is maintained for a channel set C.

To determine $CW_p$ for channel access on a channel $c_j$, step 2 in the procedure described in subclause 1.8.3.1 is modified as follows.

If at least 80% (Z=80%) of HARQ-ACK values corresponding to PDSCH transmission(s) in reference subframe k of all channels $c_i \in C$ are determined to be NACK, then $CW_p$ for all priority classes $p \in \{1, 2, 3, 4\}$ is incremented to the next higher allowed value. Otherwise, the procedure goes to step 1.

1.8.4.2.2. Type B2 Multi-Channel Access Procedure

A $CW_p$ value is maintained independently for each channel $c_i \in C$. To determine $N_{init}$ for a channel $c_j$, the $CW_p$ value of the channel $c_{j1} \in C$ is used. Herein, $c_{j1}$ is a channel having the largest $CW_p$ among all channels of the set C.

1.8.5. Uplink Channel Access Procedures

The UE and the BS that schedules a UL transmission for the UE perform the following procedure for access to a channel (on which LAA SCell transmission(s) is performed). On the assumption that the UE and the BS are basically configured with a PCell that is a licensed band and one or more SCells which are unlicensed bands, UL CAP operations applicable to the present disclosure will be described below in detail, with the unlicensed bands represented as LAA SCells. The UL CAP operations may be applied in the same manner even when only an unlicensed band is configured for the UE and the BS.

The UE may access a channel on which UL transmission(s) is performed according to a Type 1 or Type 2 UL CAP.

Table 12 illustrates that mp, a minimum CW, a maximum CW, an MCOT, and an allowed CW size applied to a CAP vary according to a channel access priority class.

TABLE 12

| Channel Access Priority Class (p) | $m_p$ | $CW_{min,p}$ | $CW_{max,p}$ | $T_{ulm\ cot,p}$ | allowed $CW_p$ sizes |
|---|---|---|---|---|---|
| 1 | 2 | 3 | 7 | 2 ms | {3, 7} |
| 2 | 2 | 7 | 15 | 4 ms | {7, 15} |
| 3 | 3 | 15 | 1023 | 6 ms or 10 ms | {15, 31, 63, 127, 255, 511, 1023} |
| 4 | 7 | 15 | 1023 | 6 ms or 10 ms | {15, 31, 63, 127, 255, 511, 1023} |

NOTE1:
For p = 3, 4, $T_{ulm\ cot,p}$ = 10 ms if the higher layer parameter absenceOfAnyOtherTechnology-r14 or absenceOfAnyOtherTechnology-r16 is provided, otherwise, $T_{ulm\ cot,p}$ = 6 ms.

NOTE 2:
When $T_{ulm\ cot,p}$ = 6 ms it may be increased to 8 ms by inserting one or more gaps. The minimum duration of a gap shall be 100 us. The maximum duration before including any such gap shall be 6 ms.

1.8.5.1. Type 1 UL Channel Access Procedure)

This subclause describes a CAP performed by a UE, in which a time duration spanned by sensing slots sensed to be idle before a UL transmission(s) is random. This subclause is applicable to the following transmissions:

- PUSCH/SRS transmission(s) scheduled and/or configured by the BS
- PUCCH transmission(s) scheduled and/or configured by the BS
- Transmission(s) related to a random access procedure (RAP)

Figure 16:
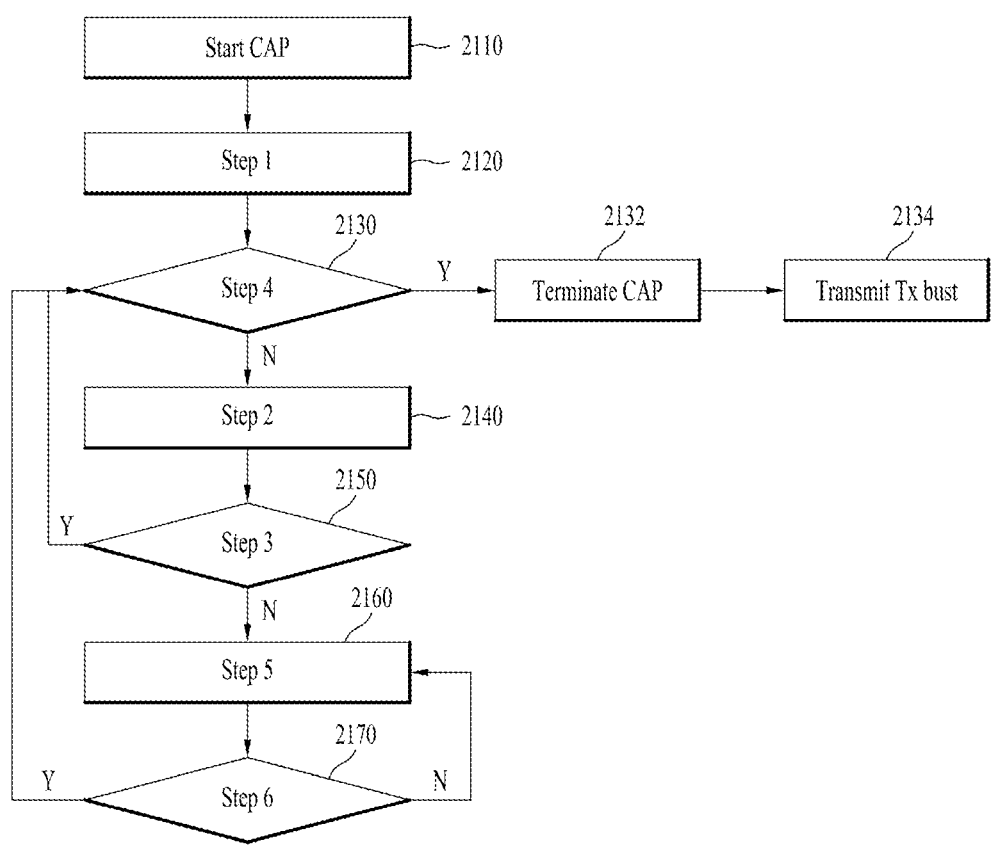
FIG. 16 is a diagram illustrating an uplink (UL) CAP for a transmission in an unlicensed band, to which various embodiments of the present disclosure are applicable.

FIG. 16 is a diagram illustrating a UL CAP for transmission in an unlicensed band to which various embodiments of the present disclosure are applicable.

The Type 1 UL CAP of the UE for transmission in the unlicensed band to which various embodiments of the present disclosure are applicable may be summarized as follows.

For a UL transmission, a transmission node (e.g., a UE) may initiate a CAP to operate in an unlicensed band (2110).

The UE may select a backoff counter N randomly within a CW according to step 1. N is set to an initial value $N_{init}$ (2120). $N_{init}$ is a value randomly selected between 0 and $CW_p$.

Subsequently, when the backoff counter value N is 0 according to step 4 (2130; Y), the UE ends the CAP (2132). The UE may then transmit a Tx burst (2134). On the other hand, if the backoff counter value is not 0 (2130; N), the UE decrements the backoff counter value by 1 according to step 2 (2140).

Subsequently, the UE checks whether a channel is idle (2150). If the channel is idle (2150; Y), the UE checks whether the backoff counter value is 0 (2130).

On the contrary, if the channel is not idle, that is, the channel is busy (2150; N), the UE checks whether the channel is idle during a defer duration $T_d$ (of 25 usec or more) longer than a slot duration (e.g., 9 usec) according to step 5 (2160). If the channel is idle for the defer duration (2170; Y), the UE may resume the CAP.

For example, if the backoff counter value $N_{init}$ is 10 and the channel is determined to be idle after the backoff counter value is decremented to 5, the UE senses the channel during the defer duration and determines whether the channel is idle. If the channel is idle during the defer duration, the UE may perform the CAP again from the backoff counter value 5 (or the backoff counter value 4 after decrementing the backoff counter value by 1), instead of setting the backoff counter value $N_{init}$.

On the other hand, if the channel is busy during the defer duration (2170; N), the UE checks again whether the channel is idle during a new defer duration by performing operation 2160 again.

If the UE has not performed a UL transmission on the channel on which UL transmission(s) are performed after step 4 in the above procedure, the UE may perform the UL transmission on the channel, if the following conditions are satisfied.

- If the UE is ready to perform the transmission and the channel is sensed to be idle during at least a sensing slot duration $T_{sl}$, and
- If the channel has been sensed to be idle during all the slot durations of a defer duration $T_d$ immediately before the transmission.

On the contrary, if the channel has not been sensed to be idle during the sensing slot duration $T_{sl}$ when the UE first senses the channel after it is ready to transmit, or if the channel has not been sensed to be idle during any of the sensing slot durations of a defer duration $T_d$ immediately before the intended transmission, the UE proceeds to step 1 after sensing the channel to be idle during the slot durations of the defer duration $T_d$.

The defer duration $T_d$ includes a duration $T_f$ (=16 us) immediately followed by mp consecutive slot durations where each slot duration $T_{sl}$ is 9 us, and $T_f$ includes an idle slot duration $T_{sl}$ at the start of $T_f$.

1.8.5.2. Type 2 UL Channel Access Procedure

If the UE is indicated to perform the Type 2A UL CAP, the UE uses the Type 2A UL CAP for a UL transmission. The UE may perform the transmission immediately after sensing the channel to be idle during at least a sensing duration $T_{short\_ul}$=25 us. $T_{short\_ul}$ includes a duration $T_f$=16 us immediately followed by one slot sensing slot duration $T_{sl}$=9 us, and $T_f$ includes a sensing slot at the start of $T_f$. The channel is considered to be idle for $T_{short\_ul}$, if two sensing slots within $T_{short\_ul}$ are sensed to be idle.

1.8.6. Channel Access Procedure for UL Multi-Channel Transmission(s)

If the UE

- is scheduled to transmit on a channel set C, a UL scheduling grant for the UL transmission on the channel set C indicates the Type 1 CAP, and UL transmissions are scheduled to start at the same time for all channels of the channel set C, and/or
- if the UE intends to perform the UL transmission in resources configured on the channel set C by the Type 1 CAP, and the channel frequencies of the channel set C is one subset of a preconfigured channel frequency set:

The UE may perform the transmission on a channel $c_i \in C$ by the Type 2 CAP.

If the Type 2 CAP has been performed on the channel $c_i$ immediately before the UE transmission on a channel $c_j \in C$ (herein, $i \neq j$), and If the UE has accessed the channel $c_j$ by using the Type 1 CAP, Before performing the Type 1 CAP on any channel in the channel set C, the UE uniformly randomly selects the channel $c_j$ from the channel set C.

If the UE fails to access any channel, the UE may not perform the transmission on the channel $c_i \in C$ within the bandwidth of a carrier with a carrier bandwidth which has been scheduled or configured by UL resources.

2 Random Access (RACH) Procedure

When a UE initially accesses a BS or has no radio resources for a signal transmission, the UE may perform a random access procedure with the BS.

The random access procedure is used for various purposes. For example, the random access procedure may be used for initial network access in an RRC_IDLE state, an RRC connection reestablishment procedure, handover, UE-triggered UL data transmission, transition in an RRC_INACTIVE state, time alignment establishment in SCell addition, OSI request, and beam failure recovery. The UE may acquire UL synchronization and UL transmission resources in the random access procedure.

Random access procedures may be classified into a contention-based random access procedure and a contention-free random access procedure. The contention-based random access procedure is further branched into a 4-step random access (4-step RACH) procedure and a 2-step random access (2-step RACH) procedure.

2.1. 4-Step RACH: Type-1 Random Access Procedure

Figure 17:
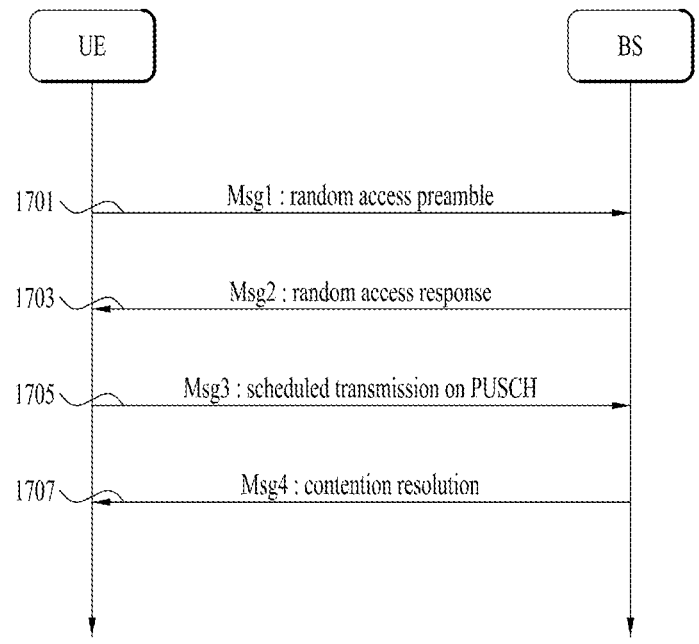
FIG. 17 is a diagram illustrating an exemplary 4-step random access channel (RACH) procedure to which various embodiments of the present disclosure are applicable.
Figure 17:
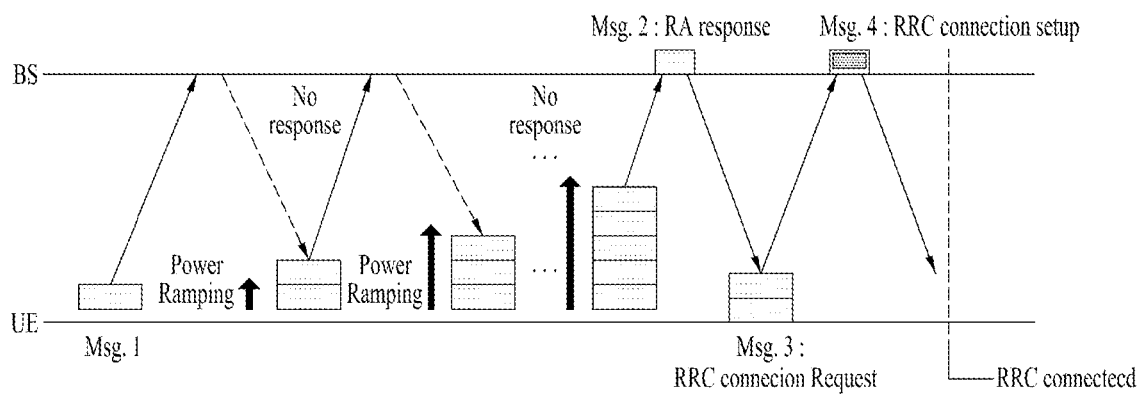

FIG. 17 is a diagram illustrating an exemplary 4-step RACH procedure to which various embodiments of the present disclosure are applicable.

When the (contention-based) random access procedure is performed in four steps (4-step RACH procedure), the UE may transmit a message (Message 1 (Msg1)) including a preamble related to a specific sequence on a PRACH (1701) and receive a PDCCH and a response message (RAR message) (Message 2 (Msg2)) for the preamble on a PDSCH corresponding to the PDCCH (1703). The UE transmits a message (Message 3 (Msg3)) including a PUSCH based on scheduling information included in the RAR (1705) and perform a contention resolution procedure involving reception of a PDCCH signal and a PDSCH signal corresponding to the PDCCH signal. The UE may receive a message (Message 4 (Msg4)) including contention resolution information for the contention resolution procedure from the BS (1707).

The 4-step RACH procedure of the UE may be summarized in Table 13 below.

TABLE 13

| | Type of Signals | Operations/Information obtained |
| --- | --- | --- |
| 1st step | PRACH preamble in UL | Initial beam acquisition Random election of RA-preamble ID |
| 2nd Step | Random Access Response on DL-SCH | Timing alignment information RA-preamble ID Initial UL grant, Temporary C-RNTI |
| 3rd Step | UL transmission on UL-SCH | RRC connection request UE identifier |
| 4th Step | Contention Resolution on DL | Temporary C-RNTI on PDCCH for initial access C-RNTI on PDCCH for UE in RRC_CONNECTED |

In the random access procedure, the UE may first transmit an RACH preamble as Msg1 on a PRACH.

Random access preamble sequences of two different lengths are supported. The longer sequence length 839 is applied to the SCSs of 1.25 kHz and 5 kHz, whereas the shorter sequence length 139 is applied to the SCSs of 15 kHz, 30 kHz, 60 kHz, and 120 kHz.

Multiple preamble formats are defined by one or more RACH OFDM symbols and different CPs (and/or guard times). An RACH configuration for a cell is provided in system information of the cell to the UE. The RACH configuration includes information about a PRACH SCS, available preambles, and a preamble format. The RACH configuration includes information about associations between SSBs and RACH (time-frequency) resources. The UE transmits a RACH preamble in RACH time-frequency resources associated with a detected or selected SSB.

An SSB threshold for RACH resource association may be configured by the network, and an RACH preamble is transmitted or retransmitted based on an SSB having a reference signal received power (RSRP) measurement satisfying the threshold. For example, the UE may select one of SSBs satisfying the threshold, and transmit or retransmit the RACH preamble in an RACH resource associated with the selected SSB. For example, when retransmitting the RACH preamble, the UE may reselect one of the SSBs and retransmit the RACH preamble in an RACH resource associated with the reselected SSB. That is, the RACH resource for the retransmission of the RACH preamble may be identical to and/or different from the RACH resource for the transmission of the RACH preamble.

Upon receipt of the RACH preamble from the UE, the BS transmits an RAR message (Msg2) to the UE. A PDCCH that schedules a PDSCH carrying the RAR is cyclic redundancy check (CRC)-masked by a random access radio network temporary identifier (RA-RNTI) and transmitted. Upon detection of the PDCCH masked by the RA-RNTI, the UE may receive the RAR on the PDSCH scheduled by DCI carried on the PDCCH. The UE determines whether the RAR includes RAR information for its transmitted preamble, that is, Msg1. The UE may make the determination by checking the presence or absence of the RACH preamble ID of its transmitted preamble in the RAR. In the absence of the response to Msg1, the UE may retransmit the RACH preamble a predetermined number of or fewer times, while performing power ramping. The UE calculates PRACH transmission power for the preamble retransmission based on the latest pathloss and a power ramping counter.

The RAR information may include a preamble sequence transmitted by the UE, a temporary cell RNTI (TC-RNTI) that the BS has allocated to the UE attempting random access, UL transmit time alignment information, UL transmission power adjustment information, and UL radio resource allocation information. Upon receipt of its RAR information on a PDSCH, the UE may acquire time advance information for UL synchronization, an initial UL grant, and a TC-RNTI. The timing advance information is used to control a UL signal transmission timing. For better alignment between a PUSCH/PUCCH transmission of the UE and a subframe timing of a network end, the network (e.g., the BS) may measure the time difference between a PUSCH/PUCCH/SRS reception and a subframe and transmit the timing advance information based on the time difference. The UE may transmit a UL signal as Msg3 of the random access procedure on a UL-SCH based on the RAR information. Msg3 may include an RRC connection request and a UE ID. The network may transmit Msg4 in response to Msg3. Msg4 may be treated as a contention resolution message on DL. As the UE receives Msg4, the UE may enter an RRC_CONNECTED state.

As described before, the UL grant included in the RAR schedules a PUSCH transmission to the BS. A PUSCH carrying an initial UL transmission based on the UL grant of the RAR is referred to as an Msg3 PUSCH. The content of the RAR UL grant starts from the most significant bit (MSB) and ends in the least significant bit (LSB), given as Table 14.

TABLE 14

| RAR UL grant field | Number of bits |
|---|---|
| Frequency hopping flag | 1 |
| Msg3 PUSCH frequency resource allocation | 12 |
| Msg3 PUSCH time resource allocation | 4 |
| Modulation and coding scheme (MCS) | 4 |
| Transmit power control (TPC) for Msg3 PUSCH | 3 |
| CSI request | 1 |

A transmit power control (TPC) command is used to determine the transmission power of the Msg3 PUSCH. For example, the TPC command is interpreted according to Table 15.

TABLE 15

| TPC command | value [dB] |
|---|---|
| 0 | −6 |
| 1 | −4 |
| 2 | −2 |
| 3 | 0 |
| 4 | 2 |
| 5 | 4 |
| 6 | 6 |
| 7 | 8 |

2.2. 2-Step RACH: Type-2 Random Access Procedure

Figure 18:
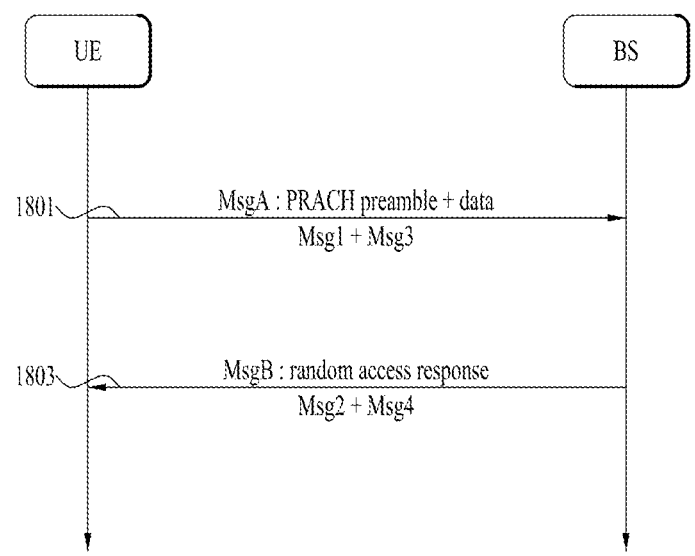
FIG. 18 is a diagram illustrating an exemplary 2-step RACH procedure to which various embodiments of the present disclosure are applicable.

FIG. 18 is a diagram illustrating an exemplary 2-step RACH procedure to which various embodiments of the present disclosure are applicable.

The (contention-based) RACH procedure performed in two steps, that is, the 2-step RACH procedure has been proposed to simplify the RACH procedure and thus achieve low signaling overhead and low latency.

In the 2-step RACH procedure, the operation of transmitting Msg1 and the operation of transmitting Msg3 in the 4-step RACH procedure may be incorporated into an operation of transmitting one message, Message A (MsgA) including a PRACH and a PUSCH by the UE. The operation of transmitting Msg2 by the BS and the operation of transmitting Msg4 by the BS in the 4-step RACH procedure may be incorporated into an operation of transmitting one message, Message B (MsgB) including an RAR and contention resolution information.

That is, in the 2-step RACH procedure, the UE may combine Msg1 and Msg3 of the 4-step RACH procedure into one message (e.g., MsgA) and transmit the message to the BS (1801).

Further, in the 2-step RACH procedure, the BS may combine Msg2 and Msg4 of the 4-step RACH procedure into one message (e.g., MsgB) and transmit the message to the UE (1803).

The 2-step RACH procedure may become a low-latency RACH procedure based on the combinations of these messages.

More specifically, MsgA may carry a PRACH preamble included in Msg1 and data included in Msg3 in the 2-step RACH procedure. In the 2-step RACH procedure, MsgB may carry an RAR included in Msg2 and contention resolution information included in Msg4.

2.3. Contention-Free RACH

Figure 19:
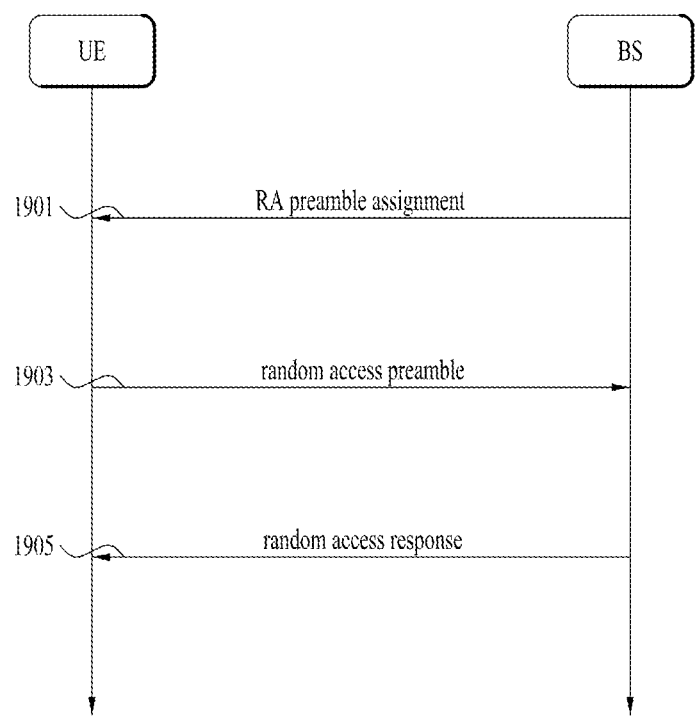
FIG. 19 is a diagram illustrating a contention-free RACH procedure to which various embodiments of the present disclosure are applicable.

FIG. 19 is a diagram illustrating an exemplary contention-free RACH procedure to which various embodiments of the present disclosure are applicable.

The contention-free RACH procedure may be used for handover of the UE to another cell or BS or may be performed when requested by a BS command. The contention-free RACH procedure is basically similar to the contention-based RACH procedure. However, compared to the contention-based RACH procedure in which a preamble to be used is randomly selected from among a plurality of RACH preambles, a preamble to be used by the UE (referred to as a dedicated RACH preamble) is assigned to the UE by the BS in the contention-free RACH procedure (1901). Information about the dedicated RACH preamble may be included in an RRC message (e.g., a handover command) or provided to the UE by a PDCCH order. When the RACH procedure starts, the UE transmits the dedicated RACH preamble to the BS (1903). When the UE receives an RAR from the BS, the RACH procedure is completed (1905).

In the contention-free RACH procedure, a CSI request field in an RAR UL grant indicates whether the UE is to include an aperiodic CSI report in a corresponding PUSCH transmission. An SCS for the Msg3 PUSCH transmission is provided by an RRC parameter. The UE may transmit the PRACH and the Msg3 PUSCH in the same UL carrier of the same serving cell. A UL BWP for the Msg3 PUSCH transmission is indicated by SIB1.

3. Various Embodiments of the Present Disclosure

A detailed description will be given of various embodiments of the present disclosure based on the above technical ideas. The afore-described contents of clause 1 and clause 2 are applicable to various embodiments of the present disclosure described below. For example, operations, functions, terminologies, and so on which are not defined in various embodiments of the present disclosure may be performed and described based on clause 1 and clause 2.

Symbols/abbreviations/terms used in the description of various embodiments of the present disclosure may be defined as follows.

CBRA: contention-based random access
CDM: code division multiplexing (code domain sharing)
comb: mapping of a signal at predetermined intervals in the frequency domain. For example, comb 2 (comb-2 or 2-comb) may mean that the same specific DMRS port is mapped to each of REs apart from each other by two subcarriers. For example, comb 4 (comb-4 or 4-comb) may mean that the same specific DMRS port is mapped to each of REs apart from each other by four subcarriers.
CP-OFDM: cyclic prefix based orthogonal frequency division multiplex
DFT-s-OFDM: discrete Fourier transform spread orthogonal frequency division multiplex
DL: downlink
DM-RS (DMRS): demodulation reference signal
FDM: frequency division multiplexing (frequency domain sharing)
MCS: modulation and coding scheme
OCC: orthogonal cover code
OFDM: orthogonal frequency division multiplexing
PAPR: peak to average power ratio
PRACH: physical random access channel
PRB: physical resource block
PUSCH: physical uplink shared channel
RA: random access
RACH: random access channel
RAPID: random access preamble identifier
RAR: random access response
RB: resource block
RE: resource element
RNTI: radio network temporary identifier
RO: RACH occasion or PRACH occasion
TDM: time division multiplexing (time domain sharing)
UL: uplink As more and more communication devices have required larger traffic along the trend of the times, a wireless wideband communication system advanced from the LTE system, that is, the next-generation 5G system is required. This next-generation 5G system is called new RAT (NR), for convenience.

The NR system may support the 2-step RACH procedure in addition to the 4-step RACH procedure.

In the 2-step RACH procedure, MsgA may include a PRACH preamble included in Msg1 and data (a PUSCH) included in Msg3. In the 2-step RACH procedure, MsgB may include an RAR included in Msg2 and contention resolution information included in Msg4.

In the 2-step RACH procedure, for example, the UE may transmit the PRACH preamble and the PUSCH without performing timing advance (TA) during a UL transmission. For example, since TA is not performed, the reception timings of signals received from the BS may be different. For example, when the reception timings between the received signals do not match, the receiver attempts to restore the signals by detecting the starting points of the signals, and interference (e.g., inter-symbol interference and/or inter-carrier interference) may occur between the signals, thereby degrading signal quality. For example, interference signals generated between the signals with mismatched reception timings may degrade the detection performance of MsgA (PRACH preamble+PUSCH) in the 2-step RACH procedure.

In this regard, various embodiments of the present disclosure may provide a method and apparatus for multiplexing PUSCHs and mapping a DMRS in MsgA (PRACH preamble+PUSCH) to support a 2-step RACH procedure.

Figure 20:
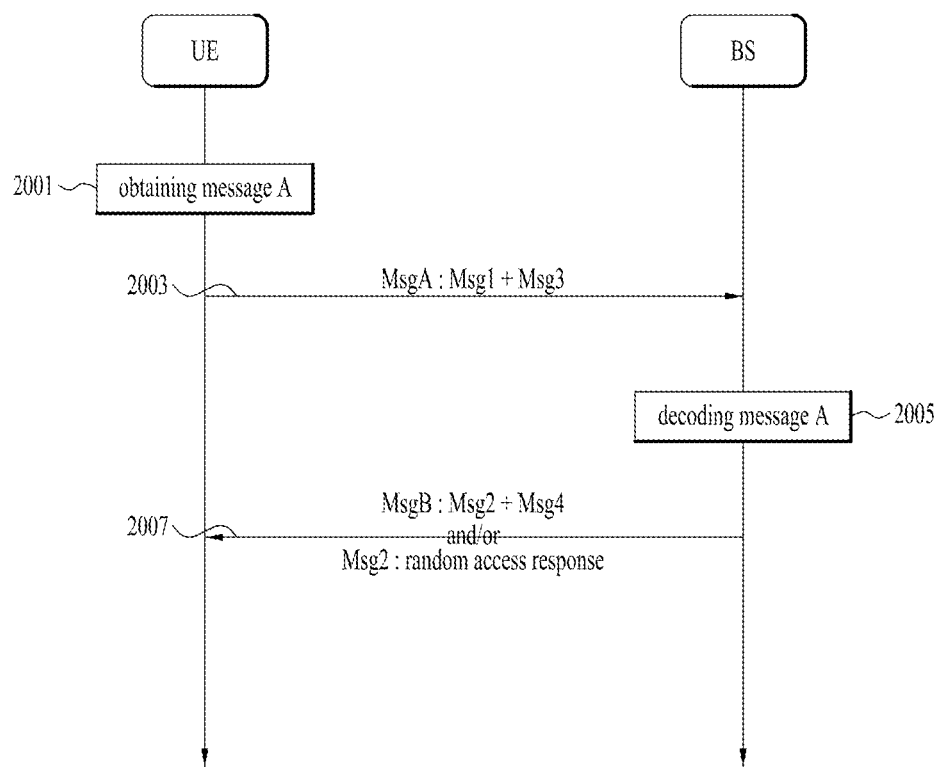
FIG. 20 is a simplified diagram illustrating a method of operating a user equipment (UE) and a base station (BS) according to various embodiments of the present disclosure.

FIG. 20 is a simplified diagram illustrating a method of operating a UE and a BS according to various embodiments of the present disclosure.

Figure 21:
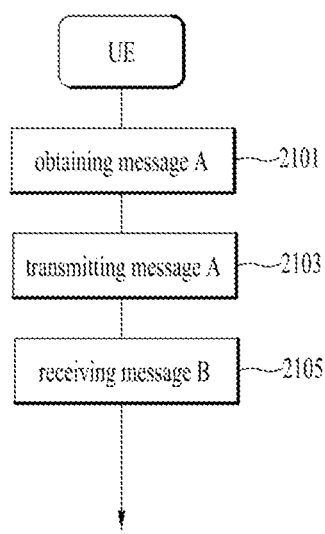
FIG. 21 is a simplified diagram illustrating a method of operating a UE according to various embodiments of the present disclosure.

FIG. 21 is a simplified diagram illustrating a method of operating a UE according to various embodiments of the present disclosure.

Figure 22:
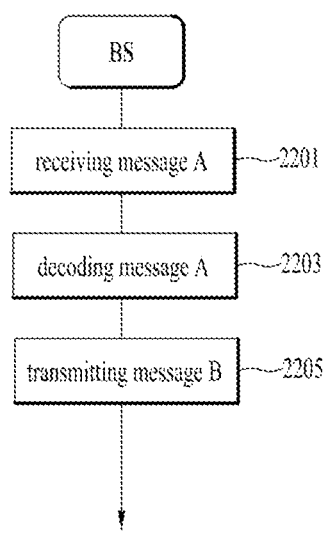
FIG. 22 is a simplified diagram illustrating a method of operating a BS according to various embodiments of the present disclosure.

FIG. 22 is a simplified diagram illustrating a method of operating a BS according to various embodiments of the present disclosure.

Referring to FIGS. 20 to 22, the UE may obtain/generate MsgA in operations 2001 and 2101 according to an exemplary embodiment. For example, the UE may obtain/generate MsgA based on mapping of a PRACH preamble to an RACH occasion (RO) and/or mapping of a PUSCH to a PUSCH occasion and/or mapping of a DMRS.

The UE may transmit MsgA and the BS may receive MsgA in operations 2003, 2103, and 2201 according to an exemplary embodiment.

The BS may decode (detect) MsgA in operations 2005 and 2203 according to an exemplary embodiment. For example, the BS may obtain the PRACH preamble and/or the PUSCH and/or the DMRS included in MsgA by decoding MsgA.

The BS may transmit MsgB and/or Msg2 in response to MsgA and the UE may receive MsgB and/or Msg2 in operations 2007, 2105, and 2205 according to an exemplary embodiment.

More specific operations, functions, terms, and so on in the operations of each exemplary embodiment may be performed and described based on the following various embodiments of the present disclosure.

A detailed description will be given below of various embodiments of the present disclosure. Unless contradicting each other, the various embodiments of the present disclosure described below may be combined fully or partially to form other various embodiments of the present disclosure, which may be clearly understood by those skilled in the art.

3.1. Multiplexing Schemes for PUSCH 3.1.1. Multiplexing

Various embodiments of the present disclosure may provide multiplexing schemes (e.g., frequency division multiplexing (FDM), time division multiplexing (TDM), code division multiplexing (CDM), or a combination of two or more of them) for MsgA.

For example, UL coverage and/or channel estimation and/or inter-symbol interference and/or inter-carrier interference and/or resource utilization may be considered.

For example, in the case of CDM (e.g., PUSCHs included in MsgA are multiplexed in CDM), particularly inter-layer interference caused by time misalignment may be considered.

For example, in the 4-step RACH procedure, a PUSCH for Msg3 may be allocated by a UL grant in an RAR message (Msg2).

For example, corresponding resources may be allocated in an FDM and/or TDM manner.

Further, for example, for the PUSCH of Msg3, since a single symbol front-loaded DMRS of configuration type 1 on DMRS port 0 is used and the remaining REs of the symbols are not used for any PUSCH transmission, the PUSCH may be allowed for a single UE.

For example, in the 2-step RACH procedure, a PRACH preamble and/or a PUSCH may be included in MsgA.

Similarly, for example, FDM/TDM resource allocation may be allowed for PUSCHs for MsgA.

Figure 23:
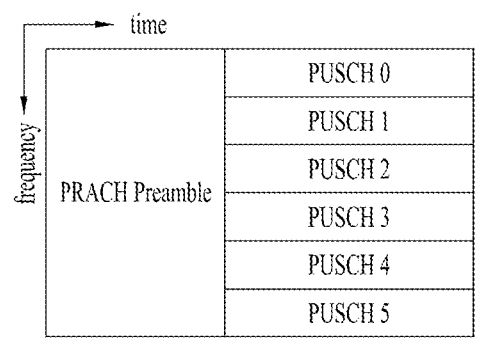
FIG. 23 is a diagram illustrating an exemplary configuration of message A (MsgA) according to various embodiments of the present disclosure.
Figure 23:
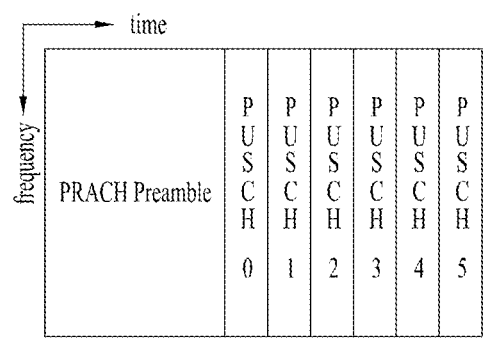
Figure 23:
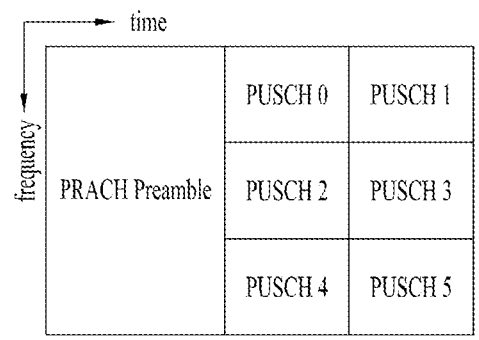
Figure 23:
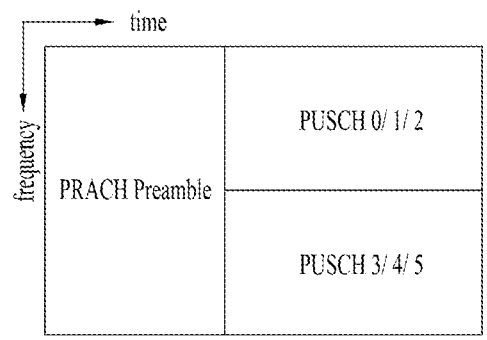

FIG. 23 is a diagram illustrating an exemplary configuration of MsgA according to various embodiments of the present disclosure.

In FIG. 23, the horizontal axis may correspond to the time domain or the time axis, and the vertical axis may correspond to the frequency domain or the frequency axis. For example, the time domain may correspond to one or more slots and/or one or more OFDM symbols, and the frequency axis may correspond to one or more RBs and/or one or more REs.

For example, PUSCHs and/or PUSCH occasions for MsgA may be multiplexed in various manners.

For example, FIG. 20(*a*) illustrates an example in which PUSCHs and/or PUSCH occasions for MsgA are multiplexed in FDM.

For example, FIG. 23(*b*) illustrates an example in which PUSCHs and/or PUSCH occasions for MsgA are multiplexed in TDM.

For example, FIG. 23(*c*) illustrates an example in which PUSCHs and/or PUSCH occasions for MsgA are multiplexed in FDM and TDM.

For example, FIG. 23(*d*) illustrates an example in which PUSCHs and/or PUSCH occasions for MsgA are multiplexed in FDM and CDM.

For example, in an FDM case (e.g., when PUSCHs and/or PUSCH occasions are multiplexed in FDM), a narrow bandwidth and (relatively) many OFDM symbols (e.g., a threshold number of or more OFDM symbols/more OFDM symbols than the threshold number) may be allocated as a PUSCH and/or PUSCH occasion resource.

In this case, for example, use of multiple OFDM symbols may lead to UL coverage enhancement. However, for example, a PUSCH resource including DMRS REs and data REs may suffer from inter-carrier interference from an adjacent PUSCH resource.

For example, in a TDM case (e.g., when PUSCHs and/or PUSCH occasions are multiplexed in TDM), a wide bandwidth and a (relatively) small number of OFDM symbols (e.g., a threshold number of or fewer OFDM symbols/fewer OFDM symbols than the threshold number) may be allocated as a PUSCH and/or PUSCH occasion resource.

In this case, for example, a frequency diversity gain may be obtained from the wide bandwidth. However, for example, UE coverage may be limited in view of the small number of OFDM symbols, and a PUSCH resource may suffer from inter-symbol interference from an adjacent PUSCH symbol.

Further, for example, since PUSCH resources are orthogonally designated in both the FDM case and the TDM case, when the UE does not select preserved/reserved PUSCH resources, the unselected resources may be wasted.

For example, in a CDM case (e.g., when PUSCHs and/or PUSCH occasions are multiplexed in CDM), a wide bandwidth and (relatively) many OFDM symbols (e.g., a threshold number of or more OFDM symbols/more OFDM symbols than the threshold number) may be allocated as a PUSCH and/or PUSCH occasion resource.

In this case, for example, UL coverage may be enhanced. Further, for example, inter-carrier interference and inter-symbol interference may be reduced. Further, for example, resource utilization efficiency may be increased. However, for example, inter-layer interference may need to be considered, particularly in the case of time misalignment.

3.1.2. Resource Indication

According to various embodiments of the present disclosure, a PUSCH resource group associated with a specific RO may be indicated.

For example, as many PUSCH resources as the number of (P)RACH preambles used for contention-based random access (CBRA) may be configured in an RO.

For example, let the number of (P)RACH preambles for CBRA per RO be denoted by M and the maximum number of multiplexible RAPIDs per PUSCH resource be denoted by N. Then, at least M/N PUSCH resources may be required. For example, a group of the PUSCH resources may be indicated. For example, the configuration of the PUSCH resources and the RO may be indicated by a mapping indicator.

That is, according to various embodiments of the present disclosure, the BS may transmit configuration information about PUSCH occasions for transmission of PUSCHs included in MsgA to the UE, and the UE may map and transmit a PUSCH for MsgA based on the configuration information.

For example, the configuration information may include a time-domain indicator and/or a frequency-domain indicator.

For example, the time-domain indicator may be an indicator indicating time resources of the PUSCH occasions for transmission of the PUSCHs included in MsgA.

For example, the frequency-domain indicator may be an indicator indicating frequency resources of the PUSCH occasions for transmission of the PUSCHs included in MsgA.

For example, the time-domain indicator may include one or more pieces of the following information.

Number of OFDM symbols per PUSCH resource (and/or Occasion): {1, . . . 14}
That is, the number of OFDM symbols per PUSCH resource (and/or PUSCH occasion) may be indicated by the configuration information. The number of OFDM symbols may be 1 to 14.

The positions of PUSCH resources (and/or occasions) in a slot
Bitmap, and/or
Starting OFDM symbols/, and/or
That is, the starting OFDM symbols of the PUSCH resources (and/or PUSCH occasions) in the time domain may be indicated by the configuration information.
The number of consecutive PUSCH occasions in the time domain in the slot.

Indicator indicating whether a null OFDM symbol is included in a PUSCH occasion.
A null OFDM symbol may refer to an OFDM symbol to which no PUSCH is mapped. A null OFDM symbol may be configured between PUSCH occasions in the time domain. In the presence of a null OFDM symbol between PUSCH occasions, the consecutive PUSCH occasions in the time domain may be understood as separated by the null OFDM symbol. That is, the null OFDM symbol may be understood as a time gap in the time domain.

Slot indexes to which a PUSCH resource group is mapped
Bitmap, and/or
Individual slot indexes, and/or
Starting slot index, and/or
The number of consecutive slots For example, the frequency-domain indicator may include one or more pieces of the following information.
The number of PRBs
The number of PRBs for the PUSCH resources (and/or PUSCH occasions) may be indicated by the configuration information.

Indicator indicating continuous mapping or non-continuous mapping
That is, the configuration information may indicate whether the PUSCH resources (and/or PUSCH occasions) are continuously or non-continuously mapped in the frequency domain. For example, for non-continuous mapping, an interlace structure in a shared spectrum or an unlicensed band may be considered.

The positions of the PUSCH resources (and/or occasions) in the frequency domain
Starting PRBs, and/or
The number of consecutive PUSCH resources (and/or PUSCH occasions) and/or
Bitmap or the like Indicator indicating whether a null PRB is included in a PUSCH occasion
A null PRB may refer to a PRB to which no PUSCH is mapped. A null PRB may be configured between PUSCH occasions in the frequency domain. In the presence of a null PRB between PUSCH occasions, the consecutive PUSCH occasions in the frequency domain may be understood as separated by the null PRB. That is, the null PRB may be understood as a frequency gap in the frequency domain.

Further, for example, an indicator indicating mapping between an RO group and a PUSCH resource (and/or PUSCH occasion) group may indicate a configuration relationship.

3.2. Multiple Preamble to Single PUSCH Resource 3.2.1. Association Between DMRS and RAPID According to various embodiments of the present disclosure, when CDM is allowed for PUSCHs included in MsgA, a plurality of RAPIDs may correspond to one PUSCH resource.

For example, a plurality of DMRS resources and/or sequences and/or a plurality of scrambling sequences may be used.

For example, a certain DMRS resource and/or sequence and/or scrambling sequence may be associated with an RAPID.

For example, in the 4-step RACH procedure, a PUSCH included in Msg3 may be allocated by a UL grant associated with an RAPID.

Similarly, for example, in the 2-step RACH procedure, a PUSCH included in MsgA may be designated for each RAPID for the FDM and TDM cases. Further, for example, when CDM is allowed, there is a need for allowing correspondence between one PUSCH resource and a plurality of RAPIDs. In this case, for example, a plurality of DMRS resources and/or sequences and/or scrambling sequences may be required to decouple a plurality of data mixed in the PUSCH resource.

Further, for example, a certain DMRS resource and/or sequence and/or scrambling sequence may be associated with an RAPID.

3.2.2. Parameters for MsgA PUSCH

In this subclause and the description of various embodiments of the present disclosure, DMRS port and DMRS sequence may be collectively referred to as DMRS resource. For example, one or more DMRS sequences may be mapped to one DMRS port. For example, one or more DMRS ports may be mapped to one DMRS sequence. For example, DMRS ports may be mapped to DMRS sequences in a 1:1, M:1, or 1:M correspondence (M is a natural number).

According to various embodiments of the present disclosure, when resources are configured for PUSCHs included in MsgA (MsgA PUSCHs) in the 2-step RACH procedure, the maximum number of RAPIDs and/or the maximum number of UEs, which may be multiplexed in each MsgA PUSCH may be designated/configured.

Further, for example, the number of DMRS resources (ports) and/or DMRS sequences may be determined according to the maximum number of RAPIDs which may be multiplexed in any MsgA PUSCH.

For example, the number may be designated/configured by each parameter. For example, the maximum number of antenna ports and the maximum number of sequences may be designated/configured.

For example, the BS may provide the following parameters to the UE.

Parameters for MsgA PUSCH:
Maximum number of RAPIDs: for example, 1, 2, 4, 8
Maximum number of antenna ports for DMRS: for example, 1, 2, 4
Maximum number of sequences: for example, 1, 2

For example, the maximum number of RAPIDs multiplexed (in a MsgA PUSCH) may be configured for the UE in consideration of coverage and/or geometry by the network.

For example, in a small cell (e.g., when the 2-step RACH procedure is performed in a small cell), the maximum number of multiplexed RAPIDs may be relatively large. For example, because the probability of misalignment between reception synchronizations is relatively small in a small cell, signals are highly likely to be received within a fast Fourier transform (FFT) boundary, and the geometry also has a good value, relatively many users may be multiplexed. For example, when random access does not occur often, the efficiency of PUSCH resources may be increased by increasing the number of RAPIDs that may be mapped to each PUSCH resource.

On the contrary, for example, in the case of wide coverage (e.g., when the 2-step RACH procedure is performed in wide coverage), the maximum number of multiplexed RAPIDs may be relatively small. For example, particularly when users within so wide coverage as to require DFT-s-OFDM are accommodated, reception sensitivity may be significantly lowered and the probability of misalignment between reception synchronizations is relatively increased. Accordingly, the number of users and/or RAPIDs multiplexed in a PUSCH resource is preferably reduced relatively.

3.2.2.1. PUSCH Data Scrambling Sequence

According to various embodiments of the present disclosure, a different PUSCH data scrambling sequence may be obtained for/applied to each UE. For example, when an MsgA PUSCH resource is used for a plurality of UEs, a different sequence may be generated and applied (to each UE (user)) to reduce interference between UEs (users).

For example, for a UE which has not initially accessed or a UE which does not have a UE-specific RNTI, an RA-RNTI or an RNTI used to monitor a response (of the BS) for an MsgA PUSCH may be used as a seed value used to generate/obtain a scrambling sequence. Further, for example, information (e.g., an RAPID) associated with a PRACH preamble selected by a UE (or user) may be used as the seed of a scrambling sequence, so that the UE (user) may be identified.

For example, when an RNTI (e.g., TC-RNTI or C-RNTI) is allocated to a UE after initial access, the UE may use its RNTI. For example, the UE may use the allocated RNTI as the seed value of a scrambling sequence.

According to the above-described various embodiments of the present disclosure, the user or UE may be identified (particularly in a data channel region) based on the seed value (e.g., RAPID) of the corresponding scrambling sequence.

For example, a mapping relationship between PRACH preambles and PUSCHs (PUSCH occasions) (and/or DMRS resources in the PUSCHs (PUSCH occasions)) may be preconfigured.

For example, one or more PRACH preambles may be mapped to one PUSCH (occasion) (and/or a DMRS resource in the PUSCH (occasion)).

For example, one PRACH preamble may be mapped to one or more PUSCHs (PUSCH occasions) (and/or DMRS resources in the PUSCHs (PUSCH occasions)). For example, PRACH preambles may be mapped to PUSCHs (PUSCH occasions) in a 1:1, M:1, or 1:M correspondence (M is a natural number).

Accordingly, for example, particularly when PRACH preambles are mapped M:1 to PUSCHs (PUSCH occasions) (and/or DMRS resources in the PUSCHs (PUSCH occasions)), identification of users/UEs which have transmitted (PUSCHs in) MsgA may be problematic.

According to the above-described various embodiments of the present disclosure, UEs which have selected different PRACH preambles obtain/generate PUSCHs based on different RAPIDs. Therefore, upon receipt of MsgA, the BS may decode/demodulate the PUSCHs based on the RAPIDs corresponding to the PRACH preambles and identify the UEs according to success or failure of the decoding/modulation.

For example, a scrambling sequence generator used to generate a PUSCH (or for a PUSCH) may be initialized by the following Equation 1. One or more of parameters used in Equation 1 may be generated/obtained/determined based on various embodiments of the present disclosure.

$$c_{init} = \begin{cases} n_{RNTI} \cdot 2^{16} + n_{RAPID} \cdot 2^{10} + n_{ID} & \text{for msgA on PUSCH} \\ n_{RNTI} \cdot 2^{15} + n_{ID} & \text{otherwise} \end{cases} \quad [\text{Equation 1}]$$

In Equation 1, Cinit may represent an initial value for the scrambling sequence generator.

The value of each parameter may be determined as follows.

When the RNTI is a C-RNTI, a modulation and coding scheme C-RNTI (MCS-C-RNTI), a semi-persistent channel state information RNTI (SP-CSI-RNTI), or a configured scheduling RNTI (CS-RNTI), the (PUSCH) transmission is not scheduled by DCI format 1_0 in a common search space, and a higher layer parameter dataScramblingIdentityPUSCH is set, $n_{ID} \in \{0, 1, \ldots, 1023\}$ may have a value indicated by the higher layer parameter dataScramblingIdentityPUSCH.

When the (PUSCH) transmission is triggered by the 2-step RACH procedure and a higher-layer parameter msgA-dataScramblingIdentity is set, $n_{ID} \in \{0, 1, \ldots, 1023\}$ may have a value indicated by the higher layer parameter msgA-dataScramblingIdentity.

Otherwise, $n_{ID} = N_{ID}^{cell}$. That is, $n_{ID}$ may have the same value as a physical cell identifier (PCI). For example, the value may range from 0 to 1007.

$n_{RAPID}$ may be the index of a PRACH preamble transmitted for MsgA. For example, $n_{RAPID}$, which is the seed value of a scrambling sequence, may correspond to information associated with the PRACH preamble selected by the UE (or user). The user may be identified by $n_{RAPID}$.

$n_{RNTI}$ may have the same value as the RA-RNTI for MsgA (when for the PUSCH included in MsgA). For example, as the seed value of the scrambling sequence, $n_{RNTI}$ may correspond to the above RNTI or the RNTI used to monitor a response (of the BS) to the PUSCH of MsgA. In another example, it may have the same value as an RA-RNTI for the 4-step RACH procedure.

For example, inter-cell interference may be randomized by $n_{ID}$.

For example, there may be an RA-RNTI and an msgB-RNTI corresponding to a specific RO in the 2-step RACH procedure.

According to various embodiments of the present disclosure, the RA-RNTI may be used to generate/obtain a PUSCH data scrambling sequence, and the msgB-RNTI may be used to monitor a PDCCH for MsgB.

That is, according to various embodiments of the present disclosure, the RA-RNTI and the msgB-RNTI corresponding to the specific RO may be used for different purposes.

In addition, according to various embodiments of the present disclosure, the RA-RNTI and the RAPID may be distinguished and used as a seed value for generating/obtaining a PUSCH data scrambling sequence.

3.2.2.2. DM-RS Sequence/DM-RS Resource

For example, a scrambling sequence described above in subclause 3.2.2.1 may be related to scrambling of data of a PUSCH included in MsgA, whereas a DMRS sequence described below in subclause 3.2.2.2 may be related to generation of an RS for demodulation of a PUSCH included in MsgA.

For example, a REL.15 NR UL DMRS sequence may be designed by using a base sequence (e.g., a gold sequence for CP-OFDM, a low-peak to average power ratio (PAPR) sequence for transform precoding, or the like) and an orthogonal cover code (OCC).

For example, a base sequence and an OCC may be applied to (a DMRS sequence of) a PUSCH included in MsgA. However, for example, in the case of time mismatch, it may be necessary to discuss whether the OCC may be applied to the DMRS sequence of the PUSCH included in MsgA. Further, for example, a method of selecting an initialization seed value for a base sequence may need to be discussed.

For example, two types of physical layer resources (e.g., dmrs-TypeA-Position (comb-2) and dmrs-TypeB-Position) may be defined for the REL.15 NR UL DMRS sequence.

For example, dmrs-TypeA-Position may be a parameter related to DMRS mapping type A. For example, in DMRS mapping type A, the first DMRS may be located in symbol 2 or 3 in a slot and mapped relative to the start of a slot boundary regardless of the starting position of an actual data transmission in the slot. For example, dmrs-TypeA-Position=ENUMERATED {pos2, pos3}, which may indicate the position of the first DMRS.

For example, dmrs-TypeB-Position may be a parameter related to DMRS mapping type B. For example, in DMRS mapping type B, the first DM-RS may be located in the first symbol of a data allocation area.

For example, like Msg 3 of the 4-step RACH procedure, dmrs-TypeA-Position may be applied to a PUSCH included in MsgA. In this case, for example, whether both sets of frequency resources (e.g., (a set of) even-numbered REs and (a set of) odd-numbered REs) are available as DMRS physical layer resources for the PUSCH included in MsgA may need to be discussed.

For example, the use of both sets for the DMRS of the PUSCH included in MsgA may have various advantages.

For example, when the use of both sets is allowed, a relatively large number of UEs may be multiplexed in the PUSCH resources.

Further, for example, in the case where the use of both sets is allowed, when two PUSCH resources having different lengths of frequency resources are multiplexed, different frequency resource sets may be allocated as DMRS physical resources for each PUSCH resource. Accordingly, better channel estimation performance may be provided.

Various embodiments of the present disclosure may relate to a method of generating/obtaining a DMRS sequence. Further, various embodiments of the present disclosure may relate to a method of utilizing DMRS resources.

For example, when CDM is allowed for PUSCHs included in MsgA, it may be related to the utilization of DMRS resources and sequences.

For example, it may be related to whether an OCC may be applied to the DMRS sequence of a PUSCH included in MsgA.

For example, it may be related to a method of selecting an initialization seed value for a base sequence (e.g., a gold sequence for CP-OFDM, a low-PAPR sequence for transform precoding, or the like).

For example, it may be related to whether two sets of frequency resources (e.g., (a set of) even-numbered REs and (a set of) odd-numbered REs) may be used as physical resources for the DMRS in a PUSCH included in MsgA.

According to various embodiments of the present disclosure, a method of generating/obtaining a DMRS sequence based on the waveform of a PUSCH included in MsgA may be provided.

For example, when CP-OFDM is set as the waveform of the PUSCH included in MsgA, the seed value of the DMRS sequence may be selected from a set of parameters for MsgA.

For example, where the number of corresponding seed values is 2 or larger, a seed value may be selected according to an RAPID.

For example, when DFT-s-OFDM is set as the waveform of MsgA, a low-PAPR sequence may be used as the DMRS sequence. For example, one designated or indicated base sequence may be used.

For example, when CP-OFDM is set as the waveform of the PUSCH in MsgA (e.g., when transform precoding is disabled), one or more DMRS sequences may be used. For example, because the maximum number of DMRS sequences may be {1, 2}, for example, referring to Parameters for MsgA PUSCH described in subclause 3.2.2., when CP-OFDM is set as the waveform of the MsgA PUSCH, the maximum number of DMRS sequences may be 1 or 2. Further, for example, when CP-OFDM is set as the waveform of the MsgA PUSCH, the number of seed values for the DMRS sequence may be 2 or larger.

For example, when DFT-s-OFDM is set as the waveform of the MsgA PUSCH (e.g., transform precoding is enabled), one DMRS sequence may be used.

In the above-described various embodiments of the present disclosure, the seed value of a DMRS sequence may be used as a parameter for initialization of a scrambling sequence generator used when transform precoding is disabled/enabled.

3.2.2.3. DM-RS Antenna Port

For example, when reception synchronization does not match between received signals in a situation in which a plurality of UEs (users) are multiplexed, channel estimation performance obtained using the DMRS may be degraded. However, the degree of degradation may vary depending on (antenna) port selection, and the channel estimation performance may also vary depending on the (antenna) port selection.

For example, PUSCH DMRS frequency resources are configured in a 2-comb form, and the resources of each comb may include phase components that create time-domain CSs of 0 and FFT/2. For example, when the difference in reception time between OFDM symbols transmitted by UEs (users) using different frequency resources is out of a CP range (e.g., 4 us), inter-carrier interference may occur. On the other hand, even when the difference in reception time between OFDM symbols transmitted by users using different CS values in the same frequency resources is out of FFT/8 (66.667/8 us 8.8 us), the influence of inter-OFDM symbol interference may not be significant.

According to various embodiments of the present disclosure, when a Type A DMRS is for one OFDM symbol (e.g., a Type A DMRS is mapped to and transmitted/received in one OFDM symbol), a total of 4 antenna ports may be used:

For example, when the number of antenna ports is set to 4, all available antenna ports may be used, and/or For example, when the number of antenna ports is set to 2, antenna ports (e.g., 0 and 1 or 2 and 3) having different CSs in a specific frequency resource may be used, and/or For example, when the number of antenna ports is set to 1, an antenna port (e.g., 0 or 1, or 2 or 3) having a specific frequency resource and a specific CS may be used.

In this case, according to various embodiments of the present disclosure, when the number of DMRS sequences is 2 or larger, the number of available DMRS sequences per antenna port may be 2 or larger.

According to various embodiments of the present disclosure, the maximum number of multiplexable RAPIDs may be determined in consideration of the number of DMRS ports and the number DMRS sequences.

According to various embodiments of the present disclosure, each RAPID (and/or PRACH preamble) may be mapped to a PUSCH occasion (a DMRS resource in the PUSCH occasion). Herein, a DMRS port index may be considered first in ascending order and then, a DM-RS sequence index may be considered in ascending order.

For example, given DMRS ports {0, 1, 2, 3} and a DMRS sequence {a, b}, each RAPID is mapped in the order of DMRS sequence a, b in DMRS port 0→DMRS sequence a, b in DMRS port 1→DMRS sequence a, b in DMRS port 2→DMRS sequence a, b in DMRS port 3. Since an RAPID is related to the index of a PRACH preamble included in MsgA, this example may also be understood as an example of resource mapping of each PRACH preamble.

For example, when one or more PRACH preambles are mapped to a (valid) PUSCH occasion, the PRACH preambles may be mapped in ascending order of DMRS indexes in the PUSCH occasion. Herein, the DMRS indexes may be determined by first considering the DMRS port indexes in ascending order and then the DMRS sequences in ascending order.

According to various embodiments of the present disclosure, when selecting a PRACH preamble for the 2-step RACH procedure, a UE may randomly select one of ROs in a specific duration and randomly select a preamble.

Additionally, according to various embodiments of the present disclosure, the UE may randomly select a specific RO and then select a preamble in the selected RO in multiple steps.

For example, the UE may select one of configured RAPID groups according to the number of DMRS sequences and then select a specific RAPID from the selected RAPID group. According to these various embodiments of the present disclosure, for example, the RAPID may be selected in the order of better channel estimation obtained from the DMRS.

3.3. MCS Level

According to various embodiments of the present disclosure, a very limited number of MCS levels are available for a PUSCH included in MsgA.

According to various embodiments of the present disclosure, when multiple sets of DMRS frequency resources are allowed, each DMRS frequency resource may be associated with an MCS level.

3.3.1. MCS Level Related to MsgA PUSCH

For example, in the 4-step RACH procedure, an MCS for Msg3 may be obtained based on a UL grant included in an RAR message. Accordingly, for example, the BS may set an MCS in a low index to high index order according to the channel state of the UE. Further, for example, time/frequency resources may be allocated to a PUSCH (included in Msg3) based on the selected MCS level and/or required coverage.

In contrast, for example, in the 2-step RACH procedure, it may be difficult to select an MCS flexibly. For example, when the UE selects an MCS level for a UL transmission according to a DL measurement result, the UE may have difficulty in applying the MCS level to the UL transmission because a DL channel and a UL channel differ greatly in terms of interference levels as well as channel states.

Moreover, for example, the amount of PUSCH resources required for MsgA may be changed according to an MCS level. Therefore, for example, when several MCS levels are allowed, may types of PUSCH resources should be defined and/or preconfigured, which may not be preferable in terms of resource utilization.

In this context, for example, it may be preferable to use a very limited number of MCS levels for a PUSCH included in MsgA. For example, one and/or two MCS levels may be available for the PUSCH included in MsgA. For example, only QPSK for CP-OFDM may be applied to the PUSCH included in MsgA, and two types of coding rates may be available for the PUSCH included in MsgA.

According to various embodiments of the present disclosure, when multiple MCS levels are allowed for transmission of the PUSCH (included MsgA), a plurality of types of PUSCH resources may be defined according to the MCS levels. For example, an RAPID may be associated with an MCS level.

The above will be described below in greater detail.

As described above, for example, when multiple MCS levels are allowed for transmission of the PUSCH (included MsgA), a plurality of types of PUSCH resources may be defined according to the MCS levels.

Therefore, for example, when a PUSCH resource corresponds to an RAPID, the RAPID may correspond to an MCS level. Therefore, for example, once the UE determines an MCS level suitable for a PUSCH transmission, the UE may select an RAPID associated with the MCS level.

3.3.2. MCS Level Related to DM-RS for MsgA PUSCH

According to various embodiments of the present disclosure, when multiple sets of DMRS frequency resources are allowed, it may be defined that each DMRS frequency resource is associated with an MCS level.

For example, given two different PUSCH resources (PUSCH resource sets) (e.g., a first larger frequency resource (set) for a lower MCS level and a second smaller frequency resource (set) for a higher MCS level), the two different frequency resource sets may be designated for each PUSCH resource.

EMBODIMENT

Figure 24:
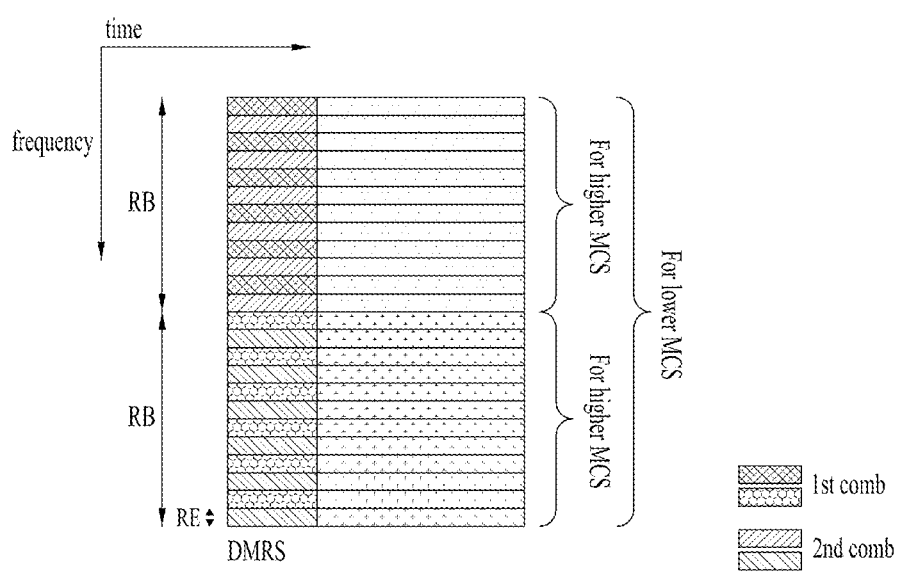
FIG. 24 is a diagram illustrating an exemplary resource configuration for MsgA according to various embodiments of the present disclosure.

FIG. 24 is a diagram illustrating a resource configuration for MsgA according to various embodiments of the present disclosure.

More specifically, FIG. 24 illustrates an example of a PUSCH resource configuration for a PUSCH included in MsgA and a DMRS resource configuration for the PUSCH.

Referring to FIG. 24, for example, when a relatively high MCS level is used for a PUSCH included in MsgA, a relatively small frequency resource including one RB may be used for the PUSCH included in MsgA. That is, for example, when a relatively high MCS level is used for the PUSCH included in MsgA, the PUSCH included in MsgA may be allocated to a relatively small frequency resource including one RB.

For example, when a relatively low MCS level is used for the PUSCH included in MsgA, a relatively large frequency resource including two RBs may be used for the PUSCH included in MsgA. That is, for example, when a relatively low MCS level is used for the PUSCH included in the MsgA, the PUSCH included in MsgA may be allocated to a relatively large frequency resource including two RBs.

For example, a $1^{st}$ comb including a set of even-numbered REs and a $2^{nd}$ comb including a set of odd-numbered REs may be configured.

For example, when a relatively high MCS level is used for the PUSCH included in MsgA, the DMRS may be allocated to the $1^{st}$ comb.

For example, when a relatively low MCS level is used for the PUSCH included in MsgA, the DMRS may be allocated to the $2^{nd}$ comb.

That is, for example, a DMRS resource (e.g., DMRS port) may be determined for the PUSCH included in MsgA according to an MCS level.

Alternatively, in the case of multiple PUSCH configurations with overlapped DMRS symbols, the BS (and/or the network) may allocate a different CDM group to each MsgA PUSCH configuration.

3.3.3. MCS and Payload Size

According to various embodiments of the present disclosure, a different PUSCH resource may be available according to an MCS and/or a payload size.

For example, to achieve the same decoding performance regardless of payload, more time resources may be required for a transmission of relatively many bits (particularly, when there is a limitation on the transmission power of the UE as in UL). For example, if a payload size is 56 bits or 72 bits, more time resources may be required for transmission of 72 bits than for transmission of 56 bits.

For example, the corresponding resources may be allocated in time division.

For example, the corresponding resources may be mapped according to an RO and/or an SSB-to-RO mapping period and/or a specific period.

For example, when the UE selects a specific MCS and/or specific payload and/or a specific PUSCH resource, the UE may select an RO in consideration of mapping in time division and use an MsgA PUSCH resource corresponding to the RO.

3.4. RO Mapping for 2-Step RACH

In the 2-step RACH procedure, when MsgA (PARCH preamble+PUSCH) is configured, there is a need for determining an RACH transmission/reception time and/or a PUSCH transmission/reception time. Accordingly, the PRACH preamble and the PUSCH need to be multiplexed.

Various embodiments of the present disclosure may relate to an RO (or PRACH occasion) to PUSCH (or PUSCH occasion) mapping method to support the 2-step RACH procedure.

According to various embodiments of the present disclosure, an RO may be configured and mapped based on whether the RO is allowed to be shared between the 2-step RACH and the 4-step RACH (hereinafter, referred to as RO sharing).

For example, when RO sharing is allowed, PRACH preambles may be separately configured/designated for the 4-step RACH procedure and the 2-step RACH procedure. For example, when there are 64 PRACH preambles, the former 32 PRACH preambles may be configured/designated as PRACH preambles for the 4-step RACH procedure, and the latter 32 PRACH preambles may be configured/designated as PRACH preambles for the 2-step RACH procedure. For example, the configuration/designation may be based on an RACH configuration included in SIB1 and/or UE-specific RRC signaling.

For example, the PRACH preambles may be understood as code-domain resources and identified by CPs. For example, upon receipt of a PRACH preamble, the BS may determine whether the PRACH preamble is for the 4-step RACH and/or the 2-step RACH and thus identify whether the UE transmitting the PRACH preamble has initiated the 2-step RACH procedure and/or the 4-step RACH procedure.

On the contrary, for example, when RO sharing is not allowed (RO separation), ROs are distinguished for the 4-step RACH procedure and the 2-step RACH procedure, and thus the BS may identify whether the UE transmitting the PRACH preamble has initiated the 2-step RACH procedure and/or the 4-step RACH procedure, based on a corresponding RO.

For example, when RO sharing is allowed between the 2-step RACH and the 4-step RACH, one of the remaining PRACH preambles other than a PRACH preamble for the 4-step RACH may be configured as a (contention-based) PRACH preamble for the 2-step RACH in an RO for the (contention-based) 4-step RACH. For example, the purpose of transmitting a corresponding PRACH preamble (e.g., the 2-step RACH or the 4-step RACH) may be identified by the BS. That is, in the above-described example, since one of the remaining PRACH preambles other than the PRACH preamble for the 4-step RACH is configured as the PRACH preamble for the 2-step RACH, the BS may identify whether the PRACH preamble transmitted by the UE is for the 2-step RACH or for the 4-step RACH based on the corresponding PRACH preamble.

For example, when RO sharing is allowed between the 2-step RACH and the 4-step RACH, a PUSCH (or PUSCH occasion) of MsgA may be allocated in a PUSCH slot following an RACH slot.

For example, when RO sharing is not allowed between the 2-step RACH and the 4-step RACH, an RO may be configured for the (contention-based) 2-step RACH.

For example, one or more of the following two schemes, methods, or alternatives may be applied to an RO configuration for the 2-step RACH:

(1) First Method-Slot Level TDM

For example, an RO for MsgA and a PUSCH (or PUSCH occasion) for MsgA may be multiplexed at the slot level.

For example, an RACH configuration table configured for the 4-step RACH may be reused.

For example, the RACH configuration table may be given as Table 12 to Table 16. Table 16 to Table 20 may illustrate examples of an RACH configuration table for an NR frequency band FR1 and an unpaired spectrum.

TABLE 16

| PRACH Configuration Index | Preamble format | $\eta_{SFN}$ mod x = y  | | Subframe number | Starting symbol | Number of PRACH slots within a subframe | $N_t^{RA, slot}$, number of time-domain PRACH occasions within a PRACH slot | $N_{dot}^{RA}$, PRACH duration |
|---|---|---|---|---|---|---|---|---|
| | | x | y | | | | | |
| 0 | 0 | 16 | 1 | 9 | 0 | — | — | 0 |
| 1 | 0 | 8 | 1 | 9 | 0 | — | — | 0 |
| 2 | 0 | 4 | 1 | 9 | 0 | — | — | 0 |
| 3 | 0 | 2 | 0 | 9 | 0 | — | — | 0 |
| 4 | 0 | 2 | 1 | 9 | 0 | — | — | 0 |
| 5 | 0 | 2 | 0 | 4 | 0 | — | — | 0 |
| 6 | 0 | 2 | 1 | 4 | 0 | — | — | 0 |
| 7 | 0 | 1 | 0 | 9 | 0 | — | — | 0 |
| 8 | 0 | 1 | 0 | 8 | 0 | — | — | 0 |
| 9 | 0 | 1 | 0 | 7 | 0 | — | — | 0 |
| 10 | 0 | 1 | 0 | 6 | 0 | — | — | 0 |
| 11 | 0 | 1 | 0 | 5 | 0 | — | — | 0 |
| 12 | 0 | 1 | 0 | 4 | 0 | — | — | 0 |
| 13 | 0 | 1 | 0 | 3 | 0 | — | — | 0 |
| 14 | 0 | 1 | 0 | 2 | 0 | — | — | 0 |
| 15 | 0 | 1 | 0 | 1, 6 | 0 | — | — | 0 |
| 16 | 0 | 1 | 0 | 1, 6 | 7 | — | — | 0 |
| 17 | 0 | 1 | 0 | 4, 9 | 0 | — | — | 0 |
| 18 | 0 | 1 | 0 | 3, 6 | 0 | — | — | 0 |
| 19 | 0 | 1 | 0 | 2, 7 | 0 | — | — | 0 |
| 20 | 0 | 1 | 0 | 8, 9 | 0 | — | — | 0 |
| 21 | 0 | 1 | 0 | 4, 8, 9 | 0 | — | — | 0 |
| 22 | 0 | 1 | 0 | 3, 4, 9 | 0 | — | — | 0 |
| 23 | 0 | 1 | 0 | 7, 8, 9 | 0 | — | — | 0 |
| 24 | 0 | 1 | 0 | 3, 4, 8, 9 | 0 | — | — | 0 |
| 25 | 0 | 1 | 0 | 6, 7, 8, 9 | 0 | — | — | 0 |
| 26 | 0 | 1 | 0 | 1, 4, 6, 9 | 0 | — | — | 0 |
| 27 | 0 | 1 | 0 | 1, 3, 5, 7, 9 | 0 | — | — | 0 |
| 28 | 1 | 16 | 1 | 7 | 0 | — | — | 0 |
| 29 | 1 | 8 | 1 | 7 | 0 | — | — | 0 |
| 30 | 1 | 4 | 1 | 7 | 0 | — | — | 0 |
| 31 | 1 | 2 | 0 | 7 | 0 | — | — | 0 |
| 32 | 1 | 2 | 1 | 7 | 0 | — | — | 0 |
| 33 | 1 | 1 | 0 | 7 | 0 | — | — | 0 |
| 34 | 2 | 16 | 1 | 6 | 0 | — | — | 0 |
| 35 | 2 | 8 | 1 | 6 | 0 | — | — | 0 |
| 36 | 2 | 4 | 1 | 6 | 0 | — | — | 0 |
| 37 | 2 | 2 | 0 | 6 | 7 | — | — | 0 |
| 38 | 2 | 2 | 1 | 6 | 7 | — | — | 0 |
| 39 | 2 | 1 | 0 | 6 | 7 | — | — | 0 |
| 40 | 3 | 16 | 1 | 9 | 0 | — | — | 0 |
| 41 | 3 | 8 | 1 | 9 | 0 | — | — | 0 |
| 42 | 3 | 4 | 1 | 9 | 0 | — | — | 0 |
| 43 | 3 | 2 | 0 | 9 | 0 | — | — | 0 |
| 44 | 3 | 2 | 1 | 9 | 0 | — | — | 0 |
| 45 | 3 | 2 | 0 | 4 | 0 | — | — | 0 |
| 46 | 3 | 2 | 1 | 4 | 0 | — | — | 0 |
| 47 | 3 | 1 | 0 | 9 | 0 | — | — | 0 |
| 48 | 3 | 1 | 0 | 8 | 0 | — | — | 0 |
| 49 | 3 | 1 | 0 | 7 | 0 | — | — | 0 |
| 50 | 3 | 1 | 0 | 6 | 0 | — | — | 0 |
| 51 | 3 | 1 | 0 | 5 | 0 | — | — | 0 |
| 52 | 3 | 1 | 0 | 4 | 0 | — | — | 0 |
| 53 | 3 | 1 | 0 | 3 | 0 | — | — | 0 |
| 54 | 3 | 1 | 0 | 2 | 0 | — | — | 0 |
| 55 | 3 | 1 | 0 | 1, 6 | 0 | — | — | 0 |

TABLE 17

| 56 | 3 | 1 | 0 | 1, 6 | 7 | — | — | 0 |
|---|---|---|---|---|---|---|---|---|
| 57 | 3 | 1 | 0 | 4, 9 | 0 | — | — | 0 |
| 58 | 3 | 1 | 0 | 3, 8 | 0 | — | — | 0 |
| 59 | 3 | 1 | 0 | 2, 7 | 0 | — | — | 0 |
| 60 | 3 | 1 | 0 | 8, 9 | 0 | — | — | 0 |
| 61 | 3 | 1 | 0 | 4, 8, 9 | 0 | — | — | 0 |
| 62 | 3 | 1 | 0 | 3, 4, 9 | 0 | — | — | 0 |
| 63 | 3 | 1 | 0 | 7, 8, 9 | 0 | — | — | 0 |
| 64 | 3 | 1 | 0 | 3, 4, 8, 9 | 0 | — | — | 0 |
| 65 | 3 | 1 | 0 | 1, 4, 6, 9 | 0 | — | — | 0 |
| 66 | 3 | 1 | 0 | 1, 3, 5, 7, 9 | 0 | — | — | 0 |
| 67 | A1 | 16 | 1 | 9 | 0 | 2 | 6 | 2 |
| 68 | A1 | 8 | 1 | 9 | 0 | 2 | 6 | 2 |
| 69 | A1 | 4 | 1 | 9 | 0 | 1 | 6 | 2 |

TABLE 17-continued

| | | | | | | | | |
|---|---|---|---|---|---|---|---|---|
| 70 | A1 | 2 | 1 | 9 | 0 | 1 | 6 | 2 |
| 71 | A1 | 2 | 1 | 4, 9 | 7 | 1 | 3 | 2 |
| 72 | A1 | 2 | 1 | 7, 9 | 7 | 1 | 3 | 2 |
| 73 | A1 | 2 | 1 | 7, 9 | 0 | 1 | 6 | 2 |
| 74 | A1 | 2 | 1 | 8, 9 | 0 | 2 | 6 | 2 |
| 75 | A1 | 2 | 1 | 4, 9 | 0 | 2 | 6 | 2 |
| 76 | A1 | 2 | 1 | 2, 3, 4, 7, 8, 9 | 0 | 1 | 6 | 2 |
| 77 | A1 | 1 | 0 | 9 | 0 | 2 | 6 | 2 |
| 78 | A1 | 1 | 0 | 9 | 7 | 1 | 3 | 2 |
| 79 | A1 | 1 | 0 | 9 | 0 | 1 | 6 | 2 |
| 80 | A1 | 1 | 0 | 8, 9 | 0 | 2 | 6 | 2 |
| 81 | A1 | 1 | 0 | 4, 9 | 0 | 1 | 6 | 2 |
| 82 | A1 | 1 | 0 | 7, 9 | 7 | 1 | 3 | 2 |
| 83 | A1 | 1 | 0 | 3, 4, 8, 9 | 0 | 1 | 6 | 2 |
| 84 | A1 | 1 | 0 | 3, 4, 8, 9 | 0 | 2 | 6 | 2 |
| 85 | A1 | 1 | 0 | 1, 3, 5, 7, 9 | 0 | 1 | 6 | 2 |
| 86 | A1 | 1 | 0 | 0, 1, 2, 3, 4, 5, 6, 7, 8, 9 | 7 | 1 | 3 | 2 |
| 87 | A2 | 16 | 1 | 9 | 0 | 2 | 3 | 4 |
| 88 | A2 | 8 | 1 | 9 | 0 | 2 | 3 | 4 |
| 89 | A2 | 4 | 1 | 9 | 0 | 1 | 3 | 4 |
| 90 | A2 | 2 | 1 | 7, 9 | 0 | 1 | 3 | 4 |
| 91 | A2 | 2 | 1 | 8, 9 | 0 | 2 | 3 | 4 |
| 92 | A2 | 2 | 1 | 7, 9 | 9 | 1 | 1 | 4 |
| 93 | A2 | 2 | 1 | 4, 9 | 9 | 1 | 1 | 4 |
| 94 | A2 | 2 | 1 | 4, 9 | 0 | 2 | 3 | 4 |
| 95 | A2 | 2 | 1 | 2, 3, 4, 7, 8, 9 | 0 | 1 | 3 | 4 |
| 96 | A2 | 1 | 0 | 2 | 0 | 1 | 3 | 4 |
| 97 | A2 | 1 | 0 | 7 | 0 | 1 | 3 | 4 |
| 98 | A2 | 2 | 1 | 9 | 9 | 1 | 3 | 4 |
| 99 | A2 | 1 | 0 | 9 | 0 | 2 | 3 | 4 |
| 100 | A2 | 1 | 0 | 9 | 9 | 1 | 1 | 4 |
| 101 | A2 | 1 | 0 | 9 | 0 | 1 | 3 | 4 |
| 102 | A2 | 1 | 0 | 2, 7 | 0 | 1 | 3 | 4 |
| 103 | A2 | 1 | 0 | 8, 9 | 0 | 2 | 3 | 4 |
| 104 | A2 | 1 | 0 | 4, 9 | 0 | 1 | 3 | 4 |
| 105 | A2 | 1 | 0 | 7, 9 | 9 | 1 | 1 | 4 |
| 106 | A2 | 1 | 0 | 3, 4, 8, 9 | 0 | 1 | 3 | 4 |
| 107 | A2 | 1 | 0 | 3, 4, 8, 9 | 0 | 2 | 3 | 4 |
| 108 | A2 | 1 | 0 | 1, 3, 5, 7, 9 | 0 | 1 | 3 | 4 |
| 109 | A2 | 1 | 0 | 0, 1, 2, 3, 4, 5, 6, 7, 8, 9 | 9 | 1 | 1 | 4 |
| 110 | A3 | 16 | 1 | 9 | 0 | 2 | 2 | 6 |
| 111 | A3 | 8 | 1 | 9 | 0 | 2 | 2 | 6 |
| 112 | A3 | 4 | 1 | 9 | 0 | 1 | 2 | 6 |
| 113 | A3 | 2 | 1 | 4, 9 | 7 | 1 | 1 | 6 |
| 114 | A3 | 2 | 1 | 7, 9 | 7 | 1 | 1 | 6 |
| 115 | A3 | 2 | 1 | 7, 9 | 0 | 1 | 2 | 6 |
| 116 | A3 | 2 | 1 | 4, 9 | 0 | 2 | 2 | 6 |
| 117 | A3 | 2 | 1 | 8, 9 | 0 | 2 | 2 | 6 |
| 118 | A3 | 2 | 1 | 2, 3, 4, 7, 8, 9 | 0 | 1 | 2 | 6 |
| 119 | A3 | 1 | 0 | 2 | 0 | 1 | 2 | 6 |
| 120 | A3 | 1 | 0 | 7 | 0 | 1 | 2 | 6 |

TABLE 18

| | | | | | | | | |
|---|---|---|---|---|---|---|---|---|
| 121 | A3 | 2 | 1 | 9 | 0 | 1 | 2 | 6 |
| 122 | A3 | 1 | 0 | 9 | 0 | 2 | 2 | 6 |
| 123 | A3 | 1 | 0 | 9 | 7 | 1 | 1 | 6 |
| 124 | A3 | 1 | 0 | 9 | 0 | 1 | 2 | 6 |
| 125 | A3 | 1 | 0 | 2, 7 | 0 | 1 | 2 | 6 |
| 126 | A3 | 1 | 0 | 8, 9 | 0 | 2 | 2 | 6 |
| 127 | A3 | 1 | 0 | 4, 9 | 0 | 1 | 2 | 6 |
| 128 | A3 | 1 | 0 | 7, 9 | 7 | 1 | 1 | 6 |
| 129 | A3 | 1 | 0 | 3, 4, 8, 9 | 0 | 1 | 2 | 6 |
| 130 | A3 | 1 | 8 | 3, 4, 8, 9 | 0 | 2 | 2 | 6 |
| 131 | A3 | 1 | 8 | 1, 3, 5, 7, 9 | 0 | 1 | 2 | 6 |
| 132 | A3 | 1 | 0 | 0, 1, 2, 3, 4, 5, 6, 7, 8, 9 | 7 | 1 | 1 | 6 |
| 133 | B1 | 4 | 1 | 9 | 2 | 1 | 6 | 2 |
| 134 | B1 | 2 | 1 | 9 | 2 | 1 | 6 | 2 |
| 135 | B1 | 2 | 1 | 7, 9 | 2 | 1 | 6 | 2 |
| 136 | B1 | 2 | 1 | 4, 9 | 8 | 1 | 3 | 2 |
| 137 | B1 | 2 | 1 | 4, 9 | 2 | 2 | 6 | 2 |
| 138 | B1 | 1 | 0 | 9 | 2 | 2 | 6 | 2 |
| 139 | B1 | 1 | 0 | 9 | 8 | 1 | 3 | 2 |
| 140 | B1 | 1 | 0 | 9 | 2 | 1 | 6 | 2 |
| 141 | B1 | 1 | 0 | 8, 9 | 2 | 2 | 6 | 2 |
| 142 | B1 | 1 | 0 | 4, 9 | 2 | 1 | 6 | 2 |
| 143 | B1 | 1 | 0 | 7, 9 | 8 | 1 | 3 | 2 |

TABLE 18-continued

| | | | | | | | | |
|---|---|---|---|---|---|---|---|---|
| 144 | B1 | 1 | 0 | 1, 3, 5, 7, 9 | 2 | 1 | 6 | 2 |
| 145 | B4 | 16 | 1 | 9 | 0 | 2 | 1 | 12 |
| 146 | B4 | 8 | 1 | 9 | 0 | 2 | 1 | 12 |
| 147 | B4 | 4 | 1 | 9 | 2 | 1 | 1 | 12 |
| 148 | B4 | 2 | 1 | 9 | 0 | 1 | 1 | 12 |
| 149 | B4 | 2 | 1 | 9 | 2 | 1 | 1 | 12 |
| 150 | B4 | 2 | 1 | 7, 9 | 2 | 1 | 1 | 12 |
| 151 | B4 | 2 | 1 | 4, 9 | 2 | 1 | 1 | 12 |
| 152 | B4 | 2 | 1 | 4, 9 | 0 | 2 | 1 | 12 |
| 153 | B4 | 2 | 1 | 8, 9 | 0 | 2 | 1 | 12 |
| 154 | B4 | 2 | 1 | 2, 3, 4, 7, 8, 9 | 0 | 1 | 1 | 12 |
| 155 | B4 | 1 | 0 | 1 | 0 | 1 | 1 | 12 |
| 156 | B4 | 1 | 0 | 2 | 0 | 1 | 1 | 12 |
| 157 | B4 | 1 | 0 | 4 | 0 | 1 | 1 | 12 |
| 158 | B4 | 1 | 0 | 7 | 0 | 1 | 1 | 12 |
| 159 | B4 | 1 | 0 | 9 | 0 | 1 | 1 | 12 |
| 160 | B4 | 1 | 0 | 9 | 2 | 1 | 1 | 12 |
| 161 | B4 | 1 | 0 | 9 | 0 | 2 | 1 | 12 |
| 162 | B4 | 1 | 0 | 4, 9 | 2 | 1 | 1 | 12 |
| 163 | B4 | 1 | 0 | 7, 9 | 2 | 1 | 1 | 12 |
| 164 | B4 | 1 | 0 | 8, 9 | 0 | 2 | 1 | 12 |
| 165 | B4 | 1 | 0 | 3, 4, 8, 9 | 2 | 1 | 1 | 12 |
| 166 | B4 | 1 | 0 | 1, 3, 5, 7, 9 | 2 | 1 | 1 | 12 |
| 167 | B4 | 1 | 0 | 0, 1, 2, 3, 4, 5, 6, 7, 8, 9 | 0 | 2 | 1 | 12 |
| 168 | B4 | 1 | 0 | 0, 1, 2, 3, 4, 5, 6, 7, 8, 9 | 2 | 1 | 1 | 12 |
| 169 | C0 | 16 | 1 | 9 | 2 | 2 | 6 | 2 |
| 170 | C0 | 8 | 1 | 9 | 2 | 2 | 6 | 2 |
| 171 | C0 | 4 | 1 | 9 | 2 | 1 | 6 | 2 |
| 172 | C0 | 2 | 1 | 9 | 2 | 1 | 6 | 2 |
| 173 | C0 | 2 | 1 | 8, 9 | 2 | 2 | 6 | 2 |
| 174 | C0 | 2 | 1 | 7, 9 | 2 | 1 | 6 | 2 |
| 175 | C0 | 2 | 1 | 7, 9 | 8 | 1 | 3 | 2 |
| 176 | C0 | 2 | 1 | 4, 9 | 8 | 1 | 3 | 2 |
| 177 | C0 | 2 | 1 | 4, 9 | 2 | 2 | 6 | 2 |
| 178 | C0 | 2 | 1 | 2, 3, 4, 7, 8, 9 | 2 | 1 | 6 | 2 |
| 179 | C0 | 1 | 0 | 9 | 2 | 2 | 6 | 2 |
| 180 | C0 | 1 | 0 | 9 | 8 | 1 | 3 | 2 |
| 181 | C0 | 1 | 0 | 9 | 2 | 1 | 6 | 2 |
| 182 | C0 | 1 | 0 | 8, 9 | 2 | 2 | 6 | 2 |
| 183 | C0 | 1 | 0 | 4, 9 | 2 | 1 | 6 | 2 |
| 184 | C0 | 1 | 0 | 7, 9 | 8 | 1 | 3 | 2 |
| 185 | C0 | 1 | 0 | 3, 4, 8, 9 | 2 | 1 | 6 | 2 |

TABLE 19

| | | | | | | | | |
|---|---|---|---|---|---|---|---|---|
| 186 | C0 | 1 | 0 | 3, 4, 8, 9 | 2 | 2 | 6 | 2 |
| 187 | C0 | 1 | 0 | 1, 3, 5, 7, 9 | 2 | 1 | 6 | 2 |
| 188 | C0 | 1 | 0 | 0, 1, 2, 3, 4, 5, 6, 7, 8, 9 | 8 | 1 | 3 | 2 |
| 189 | C2 | 16 | 1 | 9 | 2 | 2 | 2 | 6 |
| 190 | C2 | 8 | 1 | 9 | 2 | 2 | 2 | 6 |
| 191 | C2 | 4 | 1 | 9 | 2 | 1 | 2 | 6 |
| 192 | C2 | 2 | 1 | 9 | 2 | 1 | 2 | 6 |
| 193 | C2 | 2 | 1 | 8, 9 | 2 | 2 | 2 | 6 |
| 194 | C2 | 2 | 1 | 7, 9 | 2 | 1 | 2 | 6 |
| 195 | C2 | 2 | 1 | 7, 9 | 8 | 1 | 1 | 6 |
| 196 | C2 | 2 | 1 | 4, 9 | 8 | 1 | 1 | 6 |
| 197 | C2 | 2 | 1 | 4, 9 | 2 | 2 | 2 | 6 |
| 198 | C2 | 2 | 1 | 2, 3, 4, 7, 8, 9 | 2 | 1 | 2 | 6 |
| 199 | C2 | 8 | 1 | 9 | 8 | 2 | 1 | 6 |
| 200 | C2 | 4 | 1 | 9 | 8 | 1 | 1 | 6 |
| 201 | C2 | 1 | 0 | 9 | 2 | 2 | 2 | 6 |
| 202 | C2 | 1 | 0 | 9 | 8 | 1 | 1 | 6 |
| 203 | C2 | 1 | 0 | 9 | 2 | 1 | 2 | 6 |
| 204 | C2 | 1 | 0 | 8, 9 | 2 | 2 | 2 | 6 |
| 205 | C2 | 1 | 0 | 4, 9 | 2 | 1 | 2 | 6 |
| 206 | C2 | 1 | 0 | 7, 9 | 8 | 1 | 1 | 6 |
| 207 | C2 | 1 | 0 | 3, 4, 8, 9 | 2 | 1 | 2 | 6 |
| 208 | C2 | 1 | 0 | 3, 4, 8, 9 | 2 | 2 | 2 | 6 |
| 209 | C2 | 1 | 0 | 1, 3, 5, 7, 9 | 2 | 1 | 2 | 6 |
| 210 | C2 | 1 | 0 | 0, 1, 2, 3, 4, 5, 6, 7, 8, 9 | 8 | 1 | 1 | 6 |
| 211 | A1/B1 | 2 | 1 | 9 | 2 | 1 | 6 | 2 |
| 212 | A1/B1 | 2 | 1 | 4, 9 | 8 | 1 | 3 | 2 |
| 213 | A1/B1 | 2 | 1 | 7, 9 | 8 | 1 | 3 | 2 |
| 214 | A1/B1 | 2 | 1 | 7, 9 | 2 | 1 | 6 | 2 |
| 215 | A1/B1 | 2 | 1 | 4, 9 | 2 | 2 | 6 | 2 |
| 216 | A1/B1 | 2 | 1 | 8, 9 | 2 | 2 | 6 | 2 |
| 217 | A1/B1 | 1 | 0 | 9 | 2 | 2 | 6 | 2 |

TABLE 19-continued

| 218 | A1/B1 | 1 | 0 | 9 | 8 | 1 | 3 | 2 |
| 219 | A1/B1 | 1 | 0 | 9 | 2 | 1 | 6 | 2 |
| 220 | A1/B1 | 1 | 0 | 8, 9 | 2 | 2 | 6 | 2 |
| 221 | A1/B1 | 1 | 0 | 4, 9 | 2 | 1 | 6 | 2 |
| 222 | A1/B1 | 1 | 0 | 7, 9 | 8 | 1 | 3 | 2 |
| 223 | A1/B1 | 1 | 0 | 3, 4, 8, 9 | 2 | 2 | 6 | 2 |
| 224 | A1/B1 | 1 | 0 | 1, 3, 5, 7, 9 | 2 | 1 | 6 | 2 |
| 225 | A1/B1 | 1 | 0 | 0, 1, 2, 3, 4, 5, 6, 7, 8, 9 | 8 | 1 | 3 | 2 |
| 226 | A2/B2 | 2 | 1 | 9 | 0 | 1 | 3 | 4 |
| 227 | A2/B2 | 2 | 1 | 4, 9 | 6 | 1 | 2 | 4 |
| 228 | A2/B2 | 2 | 1 | 7, 9 | 6 | 1 | 2 | 4 |
| 229 | A2/B2 | 2 | 1 | 4, 9 | 0 | 2 | 3 | 4 |
| 230 | A2/B2 | 2 | 1 | 8, 9 | 0 | 2 | 3 | 4 |
| 231 | A2/B2 | 1 | 0 | 9 | 0 | 2 | 3 | 4 |
| 232 | A2/B2 | 1 | 0 | 9 | 6 | 1 | 2 | 4 |
| 233 | A2/B2 | 1 | 0 | 9 | 0 | 1 | 3 | 4 |
| 234 | A2/B2 | 1 | 0 | 8, 9 | 0 | 2 | 3 | 4 |
| 235 | A2/B2 | 1 | 0 | 4, 9 | 0 | 1 | 3 | 4 |
| 236 | A2/B2 | 1 | 0 | 7, 9 | 6 | 1 | 2 | 4 |
| 237 | A2/B2 | 1 | 0 | 3, 4, 8, 9 | 0 | 1 | 3 | 4 |
| 238 | A2/B2 | 1 | 0 | 3, 4, 8, 9 | 0 | 2 | 3 | 4 |
| 239 | A2/B2 | 1 | 0 | 1, 3, 5, 7, 9 | 0 | 1 | 3 | 4 |
| 240 | A2/B2 | 1 | 0 | 0, 1, 2, 3, 4, 5, 6, 7, 8, 9 | 6 | 1 | 2 | 4 |
| 241 | A3/63 | 2 | 1 | 9 | 0 | 1 | 2 | 6 |
| 242 | A3/63 | 2 | 1 | 4, 9 | 2 | 1 | 2 | 6 |
| 243 | A3/B3 | 2 | 1 | 7, 9 | 0 | 1 | 2 | 6 |
| 244 | A3/B3 | 2 | 1 | 7, 9 | 2 | 1 | 2 | 6 |
| 245 | A3/B3 | 2 | 1 | 4, 9 | 0 | 2 | 2 | 6 |
| 246 | A3/B3 | 2 | 1 | 8, 9 | 0 | 2 | 2 | 6 |
| 247 | A3/B3 | 1 | 0 | 9 | 0 | 2 | 2 | 6 |
| 248 | A3/B3 | 1 | 1 | 9 | 2 | 1 | 2 | 6 |
| 249 | A3/B3 | 1 | 1 | 9 | 0 | 1 | 2 | 6 |
| 250 | A3/B3 | 1 | 1 | 8, 9 | 0 | 2 | 2 | 6 |

TABLE 20

| 251 | A3/B3 | 1 | 0 | 4, 9 | 0 | 1 | 2 | 6 |
| 252 | A3/B3 | 1 | 0 | 7, 9 | 2 | 1 | 2 | 6 |
| 253 | A3/B3 | 1 | 0 | 3, 4, 8, 9 | 0 | 2 | 2 | 6 |
| 254 | A3/B3 | 1 | 0 | 1, 3, 5, 7, 9 | 0 | 1 | 2 | 6 |
| 255 | A3/B3 | 1 | 0 | 0, 1, 2, 3, 4, 5, 6, 7, 8, 9 | 2 | 1 | 2 | 6 |
| 256 | 0 | 18 | 1 | 7 | 0 | — | — | 0 |
| 257 | 0 | 8 | 1 | 7 | 0 | — | — | 0 |
| 258 | 0 | 4 | 1 | 7 | 0 | — | — | 0 |
| 259 | 0 | 2 | 0 | 7 | 0 | — | — | 0 |
| 260 | 0 | 2 | 1 | 7 | 0 | — | — | 0 |
| 261 | 0 | 2 | 0 | 2 | 0 | — | — | 0 |
| 262 | 0 | 2 | 1 | 2 | 0 | — | — | 0 |

For example, the RACH configuration table may be designed on the assumption that most of the OFDM symbols of an RACH slot or a $2^{nd}$ RACH half-slot are used for an RO.

Accordingly, in this case, for example, the RO and the PUSCH (or PUSCH occasion) may be multiplexed in different slots.

Figure 25:
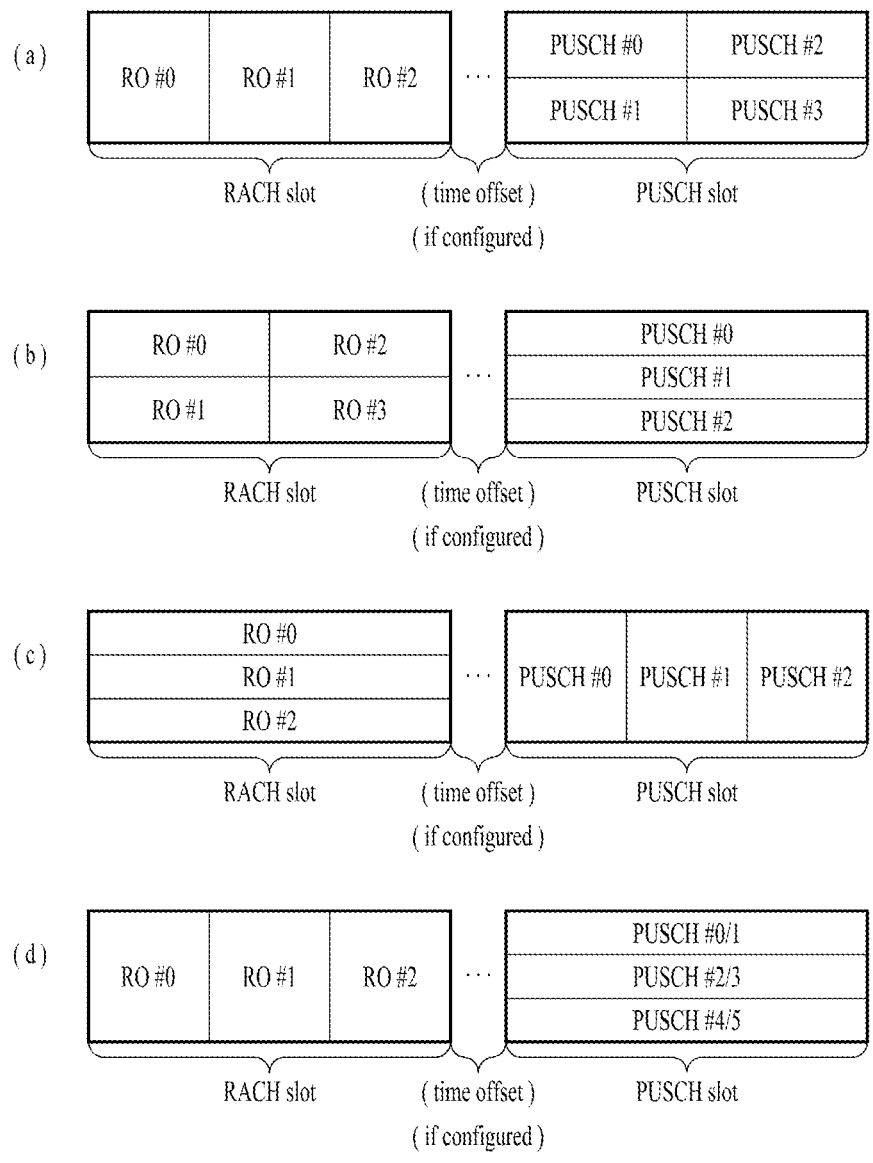
FIG. 25 is a diagram illustrating an exemplary configuration of MsgA according to various embodiments of the present disclosure.

FIG. 25 is a diagram illustrating exemplary MsgA configurations according to various embodiments of the present disclosure.

More specifically, FIG. 25 is a diagram illustrating examples of the first method of multiplexing an RO for MsgA and a PUSCH (or PUSCH occasion) for MsgA at the slot level.

Referring to FIG. 25, an RO for transmitting a PRACH preamble included in MsgA and a PUSCH occasion for transmitting a PUSCH included in Msg A may be multiplexed in TDM at the slot level.

For example, the RO may be included or mapped in an RACH slot located earlier than a PUSCH slot on the time domain. For example, the PUSCH occasion may be included or mapped in the PUSCH slot located after the RACH slot in the time domain.

For example, ROs and/or PUSCH occasions may be multiplexed in each slot in various manners.

For example, FIG. 25(a) illustrates an example in which ROs are multiplexed in TDM in an RACH slot and PUSCHs are multiplexed in FDM and TDM in a PUSCH slot.

For example, FIG. 25(b) illustrates an example in which ROs are multiplexed in FDM and TDM in an RACH slot and PUSCHs are multiplexed in FDM in a PUSCH slot.

For example, FIG. 25(c) illustrates an example in which ROs are multiplexed in FDM in an RACH slot and PUSCHs are multiplexed in TDM in a PUSCH slot.

For example, FIG. 25(d) illustrates an example in which ROs are multiplexed in TDM in an RACH slot and PUSCHs are multiplexed in TDM and CDM in a PUSCH slot.

For example, a certain time offset may be configured between the ROs and the PUSCH occasions in the time domain. That is, for example, a certain time offset may be configured between the RACH slot including the ROs and the PUSCH slot including the PUSCH occasions in the time domain.

For example, the time offset may include a predetermined number of slots.

On the contrary, when a time offset is not configured, the RACH slot and the PUSCH slot may be contiguous in the time domain.

(1) Second Method-Symbol Level TDM

For example, an RO for MsgA and a PUSCH (or PUSCH occasion) for MsgA may be multiplexed at the symbol level.

For example, a configuration of using OFDM symbols of a 1st RACH half-slot (in a slot for MsgA) as an RO may be considered.

For example, a PUSCH (or PUSCH occasion) for MsgA may be allocated in OFDM symbols after RO OFDM symbols (in the slot).

Figure 26:
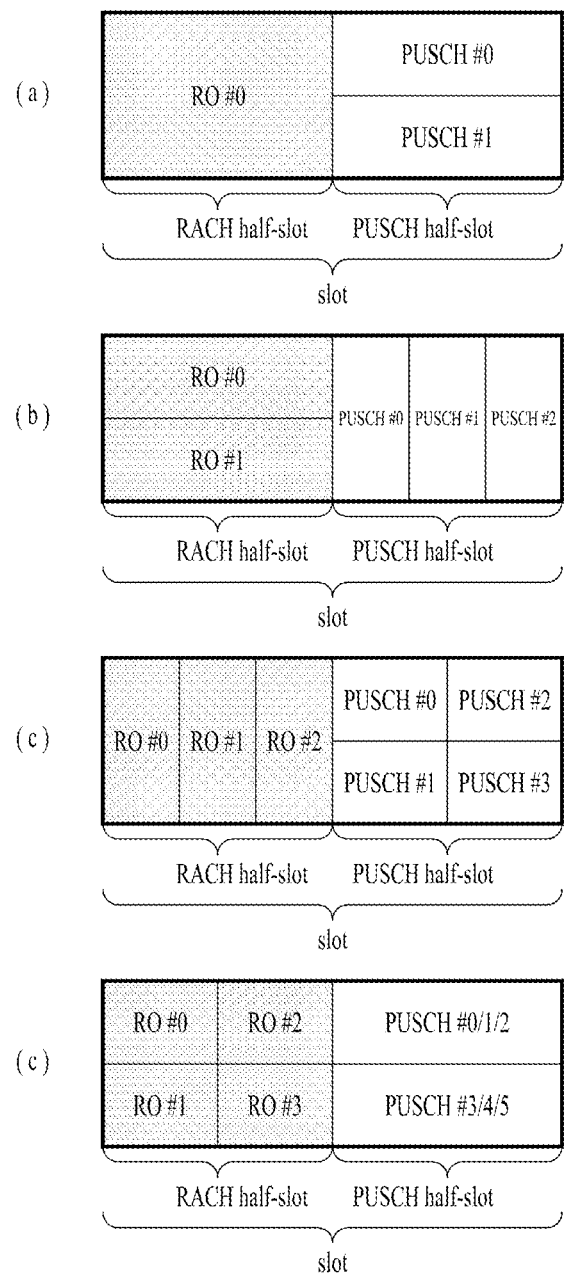
FIG. 26 is a diagram illustrating an exemplary configuration of MsgA according to various embodiments of the present disclosure.

FIG. 26 is a diagram illustrating exemplary MsgA configurations according to various embodiments of the present disclosure.

More specifically, FIG. 26 is a diagram illustrating examples of the second method of multiplexing an RO for MsgA and a PUSCH (or PUSCH occasion) for MsgA at the symbol level.

Referring to FIG. 26, an RO for transmitting a PRACH preamble included in MsgA and a PUSCH occasion for transmitting a PUSCH included in Msg A may be multiplexed in TDM at the symbol level.

For example, the RO and the PUSCH occasion may be included in one slot.

For example, the RO may be included or mapped in an RACH half-slot located earlier than a PUSCH half-slot in the time domain. For example, the PUSCH occasion may be included or mapped in the PUSCH half-slot located after the RACH half-slot in the time domain.

For example, the RO may be included or mapped in one or more OFDM symbols of the RACH half-slot. For example, the PUSCH occasion may be included or mapped in one or more OFDM symbols of the PUSCH half-slot.

For example, ROs and/or PUSCH occasions may be multiplexed in each half-slot in various manners.

For example, FIG. 26(a) illustrates an example in which one RO is configured in an RACH half-slot, and PUSCHs are multiplexed in FDM in a PUSCH half-slot.

For example, FIG. 26(b) illustrates an example in which ROs are multiplexed in FDM in an RACH half-slot and PUSCHs are multiplexed in TDM in a PUSCH half-slot.

For example, FIG. 26(c) illustrates an example in which ROs are multiplexed in TDM in an RACH half-slot and PUSCHs are multiplexed in FDM and TDM in a PUSCH half-slot.

For example, FIG. 26(d) illustrates an example in which ROs are multiplexed in FDM and TDM in an RACH half-slot and PUSCHs are multiplexed in TDM and CDM in a PUSCH half-slot.

In summary, according to various embodiments of the present disclosure, an RO may be configured or mapped based on whether RO sharing is allowed between the 2-step RACH and the 4-step RACH.

For example, when RO sharing is allowed, one of the remaining PRACH preambles other than a PRACH preamble for the 4-step RACH may be configured as a PRACH preamble for the 2-step RACH.

For example, when RO sharing is not allowed, one or more of the following two schemes or methods or alternatives may be applied:

(1) First Method—Slot Level TDM

For example, an RACH configuration table configured for the 4-step RACH may be reused. For example, an RO for MsgA and a PUSCH (or PUSCH occasion) for MsgA may be multiplexed at the slot level.

(1) Second Method—Symbol Level TDM

For example, a configuration of using OFDM symbols of a first RACH half-slot (of a slot for MsgA) as an RO may be considered. For example, an RO for MsgA and a PUSCH (or PUSCH occasion) for MsgA may be multiplexed at the symbol level.

Since examples of the above-described proposal method may also be included in one of implementation methods of the various embodiments of the present disclosure, it is obvious that the examples are regarded as a sort of proposed methods. Although the above-proposed methods may be independently implemented, the proposed methods may be implemented in a combined (aggregated) form of a part of the proposed methods. A rule may be defined such that the BS informs the UE of information as to whether the proposed methods are applied (or information about rules of the proposed methods) through a predefined signal (e.g., a physical layer signal or a higher-layer signal).

3.5. Initial Network Access and Communication Process

According to various embodiments of the present disclosure, a UE may perform a network access process to perform the above-described/proposed procedures and/or methods. For example, the UE may receive system information and configuration information required to perform the above-described/proposed procedures and/or methods and store the received information in a memory. The configuration information required for various embodiments of the present disclosure may be received by higher-layer signaling (e.g., RRC signaling or MAC signaling).

Figure 27:
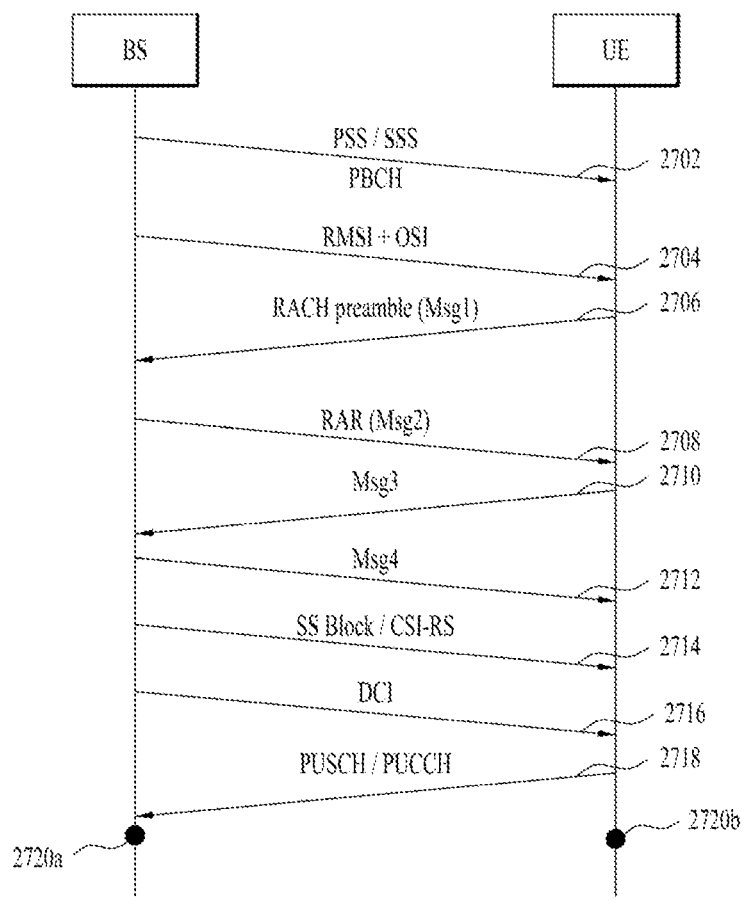
FIG. 27 is a diagram illustrating an initial network access and subsequent communication process.

FIG. 27 is a diagram illustrating an initial network access and subsequent communication process. In an NR system to which various embodiments of the present disclosure are applicable, a physical channel and an RS may be transmitted by beamforming. When beamforming-based signal transmission is supported, beam management may be performed for beam alignment between a BS and a UE. Further, a signal proposed in various embodiments of the present disclosure may be transmitted/received by beamforming. In RRC_IDLE mode, beam alignment may be performed based on a synchronization signal block (SSB or SS/PBCH block), whereas in RRC_CONNECTED mode, beam alignment may be performed based on a CSI-RS (in DL) and an SRS (in UL). On the contrary, when beamforming-based signal transmission is not supported, beam-related operations may be omitted in the following description.

Referring to FIG. 27, a BS (e.g., eNB) may periodically transmit an SSB (S2702). The SSB includes a PSS/SSS/PBCH. The SSB may be transmitted by beam sweeping. The BS may then transmit remaining minimum system information (RMSI) and other system information (OSI) (S2704). The RMSI may include information required for the UE to perform initial access to the BS (e.g., PRACH configuration information). After detecting SSBs, the UE identifies the best SSB. The UE may then transmit an RACH preamble (Message 1; Msg1) in PRACH resources linked/corresponding to the index (i.e., beam) of the best SSB (S2706). The beam direction of the RACH preamble is associated with the PRACH resources. Association between PRACH resources (and/or RACH preambles) and SSBs (SSB indexes) may be configured by system information (e.g., RMSI). Subsequently, in an RACH procedure, the BS may transmit a random access response (RAR) (Msg2) in response to the RACH preamble (S2708), the UE may transmit Msg3 (e.g., RRC Connection Request) based on a UL grant included in the RAR (S2710), and the BS may transmit a contention resolution message (Msg4) (S2712). Msg4 may include RRC Connection Setup.

When an RRC connection is established between the BS and the UE in the RACH procedure, beam alignment may subsequently be performed based on an SSB/CSI-RS (in DL) and an SRS (in UL). For example, the UE may receive an SSB/CSI-RS (S2714). The SSB/CSI-RS may be used for the UE to generate a beam/CSI report. The BS may request the UE to transmit a beam/CSI report, by DCI (S2716). In this case, the UE may generate a beam/CSI report based on the SSB/CSI-RS and transmit the generated beam/CSI report to the BS on a PUSCH/PUCCH (S2718). The beam/CSI report may include a beam measurement result, information about a preferred beam, and so on. The BS and the UE may switch beams based on the beam/CSI report (S2720a and S2720b).

Subsequently, the UE and the BS may perform the above-described/proposed procedures and/or methods. For example, the UE and the BS may transmit a wireless signal by processing information stored in a memory or may process received wireless signal and store the processed signal in the memory according to various embodiments of the present disclosure, based on configuration information obtained in the network access process (e.g., the system information acquisition process, the RRC connection process through an RACH, and so on). The wireless signal may include at least one of a PDCCH, a PDSCH, or an RS on DL and at least one of a PUCCH, a PUSCH, or an SRS on UL.

3.6. DRX (Discontinuous Reception)

Figure 28:
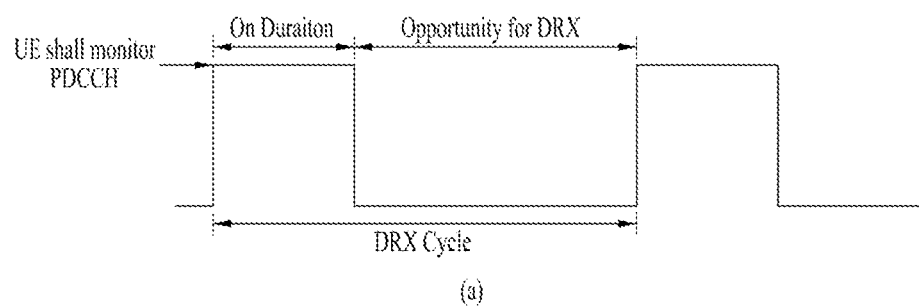
FIG. 28 is an exemplary DRX operation according to various embodiments of the present disclosure.
Figure 28:
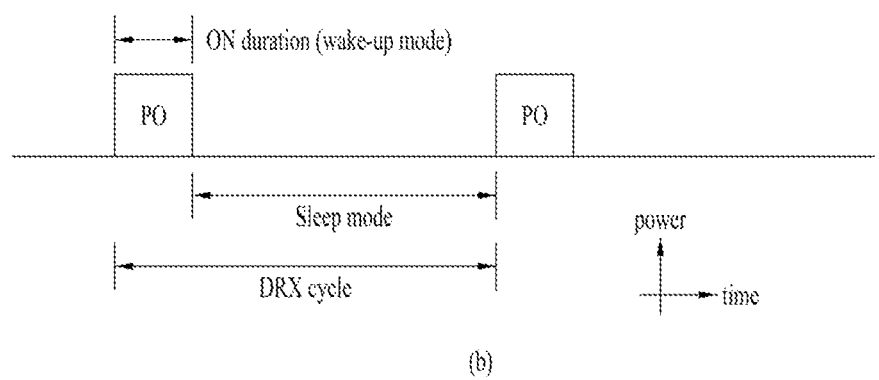

FIG. 28 is an exemplary DRX operation according to various embodiments of the present disclosure.

According to various embodiments of the present disclosure, the UE may perform a DRX operation in the aforedescribed/proposed procedures and/or methods. When the UE is configured with DRX, the UE may reduce power consumption by receiving a DL signal discontinuously. DRX may be performed in an RRC_IDLE state, an RRC_INACTIVE state, and an RRC_CONNECTED state. In the RRC_IDLE state and the RRC_INACTIVE state, DRX is used to receive a paging signal discontinuously.

3.6.1. RRC_CONNECTED DRX

In the RRC_CONNECTED state, DRX is used to receive a PDCCH discontinuously. DRX in the RRC_CONNECTED state is referred to as RRC_CONNECTED DRX).

Referring to FIG. 28(a), a DRX cycle includes an On Duration and an Opportunity for DRX. The DRX cycle defines a time interval between periodic repetitions of the On Duration. The On Duration is a time period during which the UE monitors a PDCCH. When the UE is configured with DRX, the UE performs PDCCH monitoring during the On Duration. When the UE successfully detects a PDCCH during the PDCCH monitoring, the UE starts an inactivity timer and is kept awake. On the contrary, when the UE fails in detecting any PDCCH during the PDCCH monitoring, the UE transitions to a sleep state after the On Duration. Accordingly, when DRX is configured, the UE may perform PDCCH monitoring/reception discontinuously in the time domain in the afore-described procedures and/or methods. For example, when DRX is configured, PDCCH reception occasions (e.g., slots with PDCCH search spaces) may be configured discontinuously according to a DRX configuration in the present disclosure. On the contrary, when DRX is not configured, the UE may perform PDCCH monitoring/reception continuously in the time domain in the afore-described procedures and/or methods according to implementation(s). For example, when DRX is not configured, PDCCH reception occasions (e.g., slots with PDCCH search spaces) may be configured continuously in the present disclosure. Irrespective of whether DRX is configured, PDCCH monitoring may be restricted during a time period configured as a measurement gap.

Table 21 describes a DRX operation of a UE (in the RRC_CONNECTED state). Referring to Table 21, DRX configuration information is received by higher-layer signaling (e.g., RRC signaling), and DRX ON/OFF is controlled by a DRX command from the MAC layer. Once DRX is configured, the UE may perform PDCCH monitoring discontinuously the afore-described procedures and/or methods according to various embodiments of the present disclosure.

TABLE 21

| | Type of signals | UE procedure |
|---|---|---|
| 1$^{st}$ step | RRC signalling (MAC-CellGroupConfig) | Receive DRX configuration information |
| 2$^{nd}$ step | MAC CE ((Long) DRX command MAC CE) | Receive DRX command |
| 3$^{rd}$ Step | — | Monitor a PDCCH during an on-duration of a DRX cycle |

MAC-CellGroupConfig includes configuration information required to configure MAC parameters for a cell group. MAC-CellGroupConfig may also include DRX configuration information. For example, MAC-CellGroupConfig may include the following information in defining DRX.

Value of drx-OnDurationTimer: defines the duration of the starting period of the DRX cycle.

Value of drx-InactivityTimer: defines the duration of a time period during which the UE is awake after a PDCCH occasion in which a PDCCH indicating initial UL or DL data has been detected.

Value of drx-HARQ-RTT-TimerDL: defines the duration of a maximum time period until a DL retransmission is received after reception of a DL initial transmission.

Value of drx-HARQ-RTT-TimerDL: defines the duration of a maximum time period until a grant for a UL retransmission is received after reception of a grant for a UL initial transmission.

drx-LongCycleStartOffset: defines the duration and starting time of a DRX cycle.

drx-ShortCycle (optional): defines the duration of a short DRX cycle.

When any of drx-OnDurationTimer, drx-InactivityTimer, drx-HARQ-RTT-TimerDL, and drx-HARQ-RTT-TimerDL is running, the UE performs PDCCH monitoring in each PDCCH occasion, staying in the awake state.

3.6.2. RRC_IDLE DRX

In the RRC_IDLE state and the RRC_INACTIVE state, DRX is used to receive a paging signal discontinuously. For convenience, DRX performed in the RRC_IDLE (or RRC_INACTIVE) state is referred to as RRC_IDLE DRX.

Therefore, when DRX is configured, PDCCH monitoring/reception may be performed discontinuously in the time domain in the afore-described/proposed procedures and/or methods.

Referring to FIG. 28(b), DRX may be configured for discontinuous reception of a paging signal. The UE may receive DRX configuration information from the BS by higher-layer (e.g., RRC) signaling. The DRX configuration information may include a DRX cycle, a DRX offset, configuration information for a DRX timer, and the like. The UE repeats an On Duration and a Sleep duration according to a DRX cycle. The UE may operate in a wakeup mode during the On duration and in a sleep mode during the Sleep duration. In the wakeup mode, the UE may monitor a paging occasion (PO) to receive a paging message. A PO means a time resource/interval (e.g., subframe or slot) in which the UE expects to receive a paging message. PO monitoring includes monitoring a PDCCH (MPDCCH or NPDCCH) scrambled with a P-RNTI (hereinafter, referred to as a paging PDCCH) in a PO. The paging message may be included in the paging PDCCH or in a PDSCH scheduled by the paging PDCCH. One or more POs may be included in a paging frame (PF), and the PF may be periodically configured based on a UE ID. A PF may correspond to one radio frame, and the UE ID may be determined based on the International Mobile Subscriber Identity (IMSI) of the UE. When DRX is configured, the UE monitors only one PO per DRX cycle. When the UE receives a paging message indicating a change of its ID and/or system information in a PO, the UE may perform an RACH procedure to initialize (or reconfigure) a connection with the BS, or receive (or obtain) new system information from the BS. Therefore, PO monitoring may be performed discontinuously in the time domain to perform an RACH procedure for connection to the BS or to receive (or obtain) new system information from the BS in the afore-described procedures and/or methods.

Those skilled in the art will understand clearly that above-described initial access process and/or DRX operation may be combined with the contents of clause 1 to clause 3 described before to constitute other various embodiments of the present disclosure.

Figure 29:
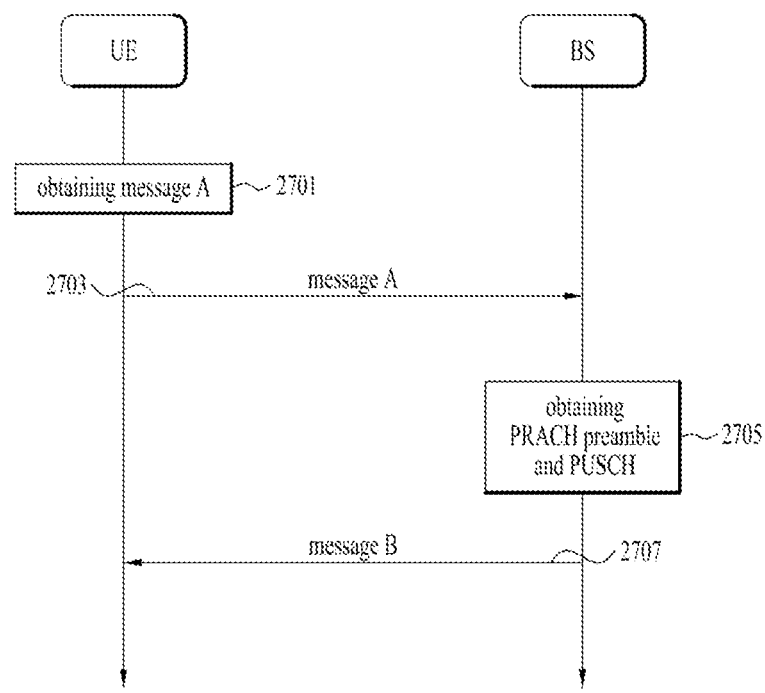
FIG. 29 is a simplified diagram illustrating a method of operating a UE and a BS according to various embodiments of the present disclosure.

FIG. 29 is a simplified diagram illustrating a method of operating a UE and a BS according to various embodiments of the present disclosure.

Figure 30:
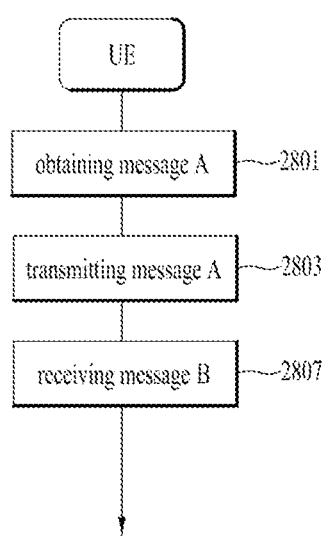
FIG. 30 is a flowchart illustrating a method of operating a UE according to various embodiments of the present disclosure.

FIG. 30 is a flowchart illustrating a method of operating a UE according to various embodiments of the present disclosure.

Figure 31:
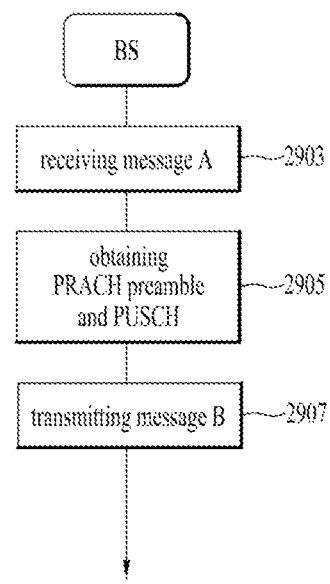
FIG. 31 is a flowchart illustrating a method of operating a BS according to various embodiments of the present disclosure.

FIG. 31 is a flowchart illustrating a method of operating a BS according to various embodiments of the present disclosure.

Referring to FIGS. 29 to 31, the UE may obtain/generate MsgA including a PRACH preamble and a PUSCH in operations 2701 and 2801 according to an exemplary embodiment.

In an exemplary embodiment, MsgA may be related to a random access procedure.

In operations 2703, 2803, and 2903 according to an exemplary embodiment, the UE may transmit MsgA, and the BS may receive MsgA.

In operations 2705 and 2905 according to an exemplary embodiment, the BS may obtain the PRACH preamble and the PUSCH included in MsgA.

In operations 2707, 2807, and 2907 according to an exemplary embodiment, the BS may transmit MsgB, and the UE may receive MsgB. In an exemplary embodiment, MsgB may be related to the random access procedure.

In an exemplary embodiment, the PUSCH may be transmitted and received in at least one of consecutive PUSCH occasions in the frequency domain and the time domain.

In an exemplary embodiment, the PRACH preamble may be obtained from among at least one preconfigured PRACH preamble.

In an exemplary embodiment, the PUSCH may include a DMRS.

In an exemplary embodiment, the DMRS may be related to (i) at least one DMRS port and (ii) at least one DMRS sequence.

In an exemplary embodiment, the at least one preconfigured PRACH preamble may be mapped to (i) the at least one DMRS port and (ii) the at least one DMRS sequence based on (i) an index of each of the at least one DMRS port and (ii) an index of each of the at least one DMRS sequence.

A more specific operation of the BS and/or the UE according to the above-described various embodiments of the present disclosure may be described and performed based on the afore-described clause 1 to clause 3.

Since examples of the above-described proposal method may also be included in one of implementation methods of the various embodiments of the present disclosure, it is obvious that the examples are regarded as a sort of proposed methods. Although the above-proposed methods may be independently implemented, the proposed methods may be implemented in a combined (aggregated) form of a part of the proposed methods. A rule may be defined such that the BS informs the UE of information as to whether the proposed methods are applied (or information about rules of the proposed methods) through a predefined signal (e.g., a physical layer signal or a higher-layer signal).

4. Exemplary Configurations of Devices Implementing Various Embodiments of the Present Disclosure 4.1. Exemplary Configurations of Devices to which Various Embodiments of the Present Disclosure are Applied FIG. 32 is a diagram illustrating devices that implement various embodiments of the present disclosure.

Figure 32:
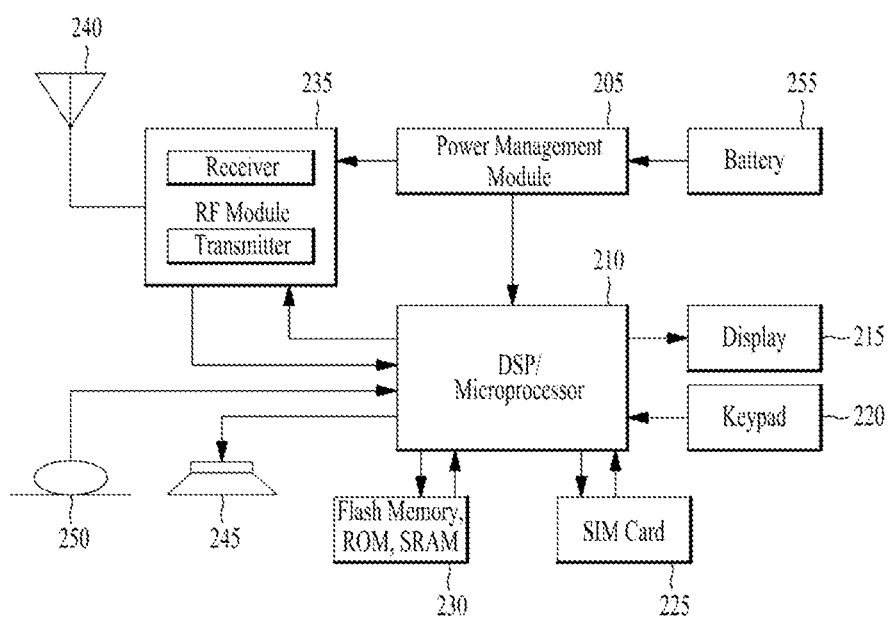
FIG. 32 is a block diagram illustrating an apparatus for implementing various embodiments of the present disclosure.

The devices illustrated in FIG. 32 may be a UE and/or a BS (e.g., eNB or gNB) adapted to perform the afore-described mechanisms, or any devices performing the same operation.

Referring to FIG. 32, the device may include a digital signal processor (DSP)/microprocessor 210 and a radio frequency (RF) module (transceiver) 235. The DSP/microprocessor 210 is electrically coupled to the transceiver 235 and controls the transceiver 235. The device may further include a power management module 205, a battery 255, a display 215, a keypad 220, a SIM card 225, a memory device 230, an antenna 240, a speaker 245, and an input device 250, depending on a designer's selection.

Particularly, FIG. 32 may illustrate a UE including a receiver 235 configured to receive a request message from a network and a transmitter 235 configured to transmit timing transmission/reception timing information to the network. These receiver and transmitter may form the transceiver 235. The UE may further include a processor 210 coupled to the transceiver 235.

Further, FIG. 32 may illustrate a network device including a transmitter 235 configured to transmit a request message to a UE and a receiver 235 configured to receive timing transmission/reception timing information from the UE. These transmitter and receiver may form the transceiver 235. The network may further include the processor 210 coupled to the transceiver 235. The processor 210 may calculate latency based on the transmission/reception timing information.

A processor included in a UE (or a communication device included in the UE) and a BE (or a communication device included in the BS) according to various embodiments of the present disclosure may operate as follows, while controlling a memory.

According to various embodiments of the present disclosure, a UE or a BS may include at least one transceiver, at least one memory, and at least one processor coupled to the at least one transceiver and the at least one memory. The at least one memory may store instructions causing the at least one processor to perform the following operations.

A communication device included in the UE or the BS may be configured to include the at least one processor and the at least one memory. The communication device may be configured to include the at least one transceiver, or may be configured not to include the at least one transceiver but to be connected to the at least one transceiver.

According to various embodiments of the present disclosure, at least one processor included in a UE (or at least one processor of a communication device included in the UE) may obtain MsgA including a PRACH preamble and a PUSCH.

According to various embodiments of the present disclosure, the at least one processor included in the UE may transmit MsgA.

In an exemplary embodiment, MsgA may be related to a random access procedure.

According to various embodiments of the present disclosure, the at least one processor included in the UE may receive MsgB.

In an exemplary embodiment, MsgB may be related to the random access procedure.

In an exemplary embodiment, the PUSCH may be transmitted in at least one of consecutive PUSCH occasions in the frequency domain and the time domain.

In an exemplary embodiment, the PRACH preamble may be obtained from among at least one preconfigured PRACH preamble.

In an exemplary embodiment, the PUSCH may include a DMRS.

In an exemplary embodiment, the DMRS may be related to (i) at least one DMRS port and (ii) at least one DMRS sequence.

In an exemplary embodiment, the at least one preconfigured PRACH preamble may be mapped to (i) the at least one DMRS port and (ii) the at least one DMRS sequence based on (i) an index of each of the at least one DMRS port and (ii) an index of each of the at least one DMRS sequence.

According to various embodiments of the present disclosure, at least one processor included in a BS (or at least one processor of a communication device included in the BS) may receive MsgA including a PRACH preamble and a PUSCH.

According to various embodiments of the present disclosure, the at least one processor included in the BS may obtain the PRACH preamble and the PUSCH included in MsgA.

In an exemplary embodiment, MsgA may be related to a random access procedure.

According to various embodiments of the present disclosure, the at least one processor included in the BS may transmit MsgB.

In an exemplary embodiment, MsgB may be related to the random access procedure.

In an exemplary embodiment, the PUSCH may be received in at least one of consecutive PUSCH occasions in the frequency domain and the time domain.

In an exemplary embodiment, the PRACH preamble may be obtained from among at least one preconfigured PRACH preamble.

In an exemplary embodiment, the PUSCH may include a DMRS.

In an exemplary embodiment, the DMRS may be related to (i) at least one DMRS port and (ii) at least one DMRS sequence.

In an exemplary embodiment, the at least one preconfigured PRACH preamble may be mapped to (i) the at least one DMRS port and (ii) the at least one DMRS sequence based on (i) an index of each of the at least one DMRS port and (ii) an index of each of the at least one DMRS sequence.

A more specific operation of a processor included in a BS and/or a UE according to various embodiments of the present disclosure may be described and performed based on the afore-described clause 1 to clause 3.

Unless contradicting with each other, various embodiments of the present disclosure may be implemented in combination. For example, the BS and/or the UE according to various embodiments of the present disclosure may perform operations in combination of the embodiments of the afore-described clause 1 to clause 3, unless contradicting with each other.

4.2. Example of Communication System to which Various Embodiments of the Present Disclosure are Applied In the present specification, various embodiments of the present disclosure have been mainly described in relation to data transmission and reception between a BS and a UE in a wireless communication system. However, various embodiments of the present disclosure are not limited thereto. For example, various embodiments of the present disclosure may also relate to the following technical configurations.

The various descriptions, functions, procedures, proposals, methods, and/or operational flowcharts of the various embodiments of the present disclosure described in this document may be applied to, without being limited to, a variety of fields requiring wireless communication/connection (e.g., 5G) between devices.

Hereinafter, a description will be given in more detail with reference to the drawings. In the following drawings/description, the same reference symbols may denote the same or corresponding hardware blocks, software blocks, or functional blocks unless described otherwise.

Figure 33:
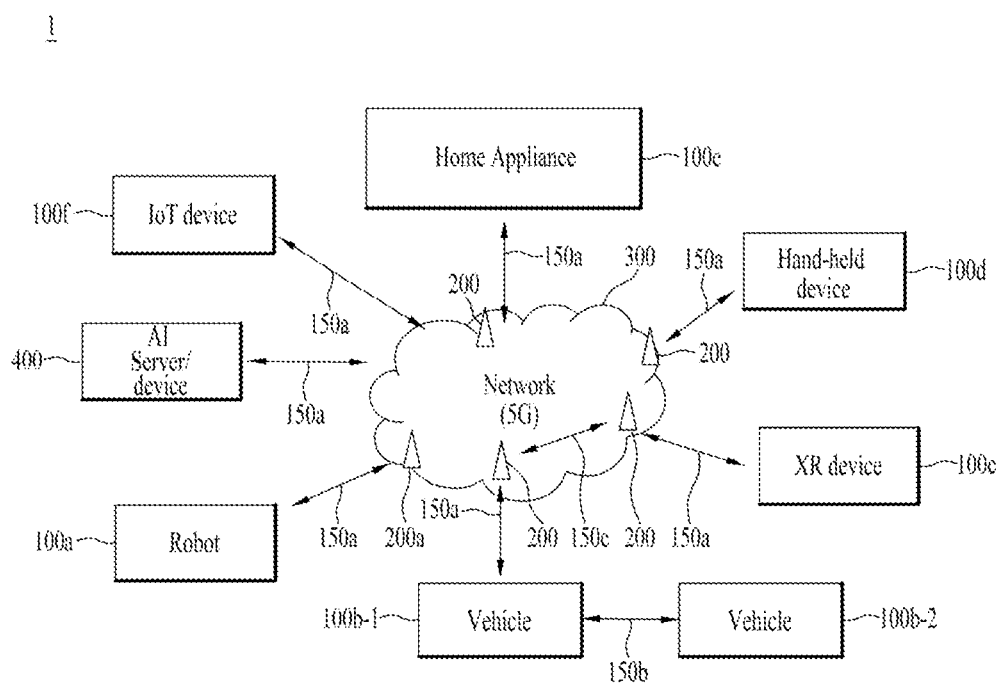
FIG. 33 is a diagram illustrating a communication system to which various embodiments of the present disclosure are applicable.

FIG. 33 illustrates an exemplary communication system to which various embodiments of the present disclosure are applied.

Referring to FIG. 33, a communication system 1 applied to the various embodiments of the present disclosure includes wireless devices, Base Stations (BSs), and a network. Herein, the wireless devices represent devices performing communication using Radio Access Technology (RAT) (e.g., 5G New RAT (NR)) or Long-Term Evolution (LTE)) and may be referred to as communication/radio/5G devices. The wireless devices may include, without being limited to, a robot 100a, vehicles 100b-1 and 100b-2, an eXtended Reality (XR) device 100c, a hand-held device 100d, a home appliance 100e, an Internet of Things (IoT) device 100f, and an Artificial Intelligence (AI) device/server 400. For example, the vehicles may include a vehicle having a wireless communication function, an autonomous driving vehicle, and a vehicle capable of performing communication between vehicles. Herein, the vehicles may include an Unmanned Aerial Vehicle (UAV) (e.g., a drone). The XR device may include an Augmented Reality (AR)/Virtual Reality (VR)/Mixed Reality (MR) device and may be implemented in the form of a Head-Mounted Device (HMD), a Head-Up Display (HUD) mounted in a vehicle, a television, a smartphone, a computer, a wearable device, a home appliance device, a digital signage, a vehicle, a robot, etc. The hand-held device may include a smartphone, a smartpad, a wearable device (e.g., a smartwatch or a smartglasses), and a computer (e.g., a notebook). The home appliance may include a TV, a refrigerator, and a washing machine. The IoT device may include a sensor and a smartmeter. For example, the BSs and the network may be implemented as wireless devices and a specific wireless device 200a may operate as a BS/network node with respect to other wireless devices.

The wireless devices 100a to 100f may be connected to the network 300 via the BSs 200. An AI technology may be applied to the wireless devices 100a to 100f and the wireless devices 100a to 100f may be connected to the AI server 400 via the network 300. The network 300 may be configured using a 3G network, a 4G (e.g., LTE) network, or a 5G (e.g., NR) network. Although the wireless devices 100a to 100f may communicate with each other through the BSs 200/network 300, the wireless devices 100a to 100f may perform direct communication (e.g., sidelink communication) with each other without passing through the BSs/network. For example, the vehicles 100b-1 and 100b-2 may perform direct communication (e.g. Vehicle-to-Vehicle (V2V)/Vehicle-to-everything (V2X) communication). The IoT device (e.g., a sensor) may perform direct communication with other IoT devices (e.g., sensors) or other wireless devices 100a to 100f.

Wireless communication/connections 150a, 150b, or 150c may be established between the wireless devices 100a to 100f/BS 200, or BS 200/BS 200. Herein, the wireless communication/connections may be established through various RATs (e.g., 5G NR) such as UL/DL communication 150a, sidelink communication 150b (or, D2D communication), or inter BS communication (e.g. relay, Integrated Access Backhaul (IAB)). The wireless devices and the BSs/the wireless devices may transmit/receive radio signals to/from each other through the wireless communication/connections 150a and 150b. For example, the wireless communication/connections 150a and 150b may transmit/receive signals through various physical channels. To this end, at least a part of various configuration information configuring processes, various signal processing processes (e.g., channel encoding/decoding, modulation/demodulation, and resource mapping/demapping), and resource allocating processes, for transmitting/receiving radio signals, may be performed based on the various proposals of the various embodiments of the present disclosure.

Figure 34:
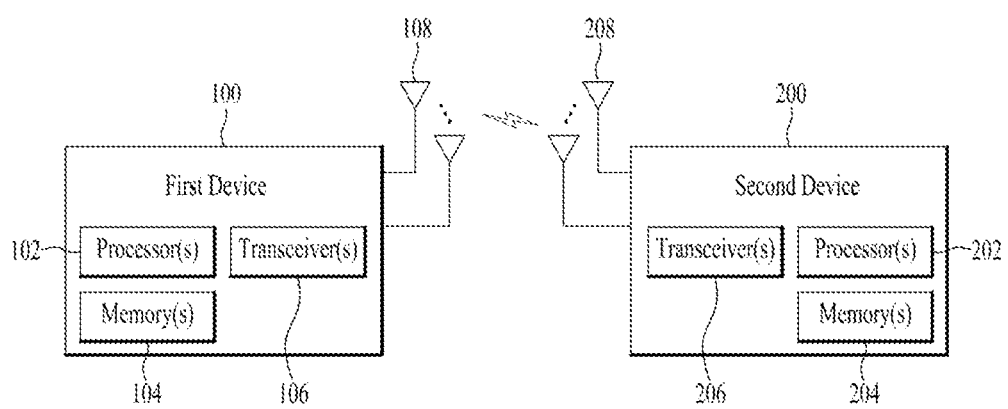
FIG. 34 is a block diagram illustrating wireless devices to which various embodiments of the present disclosure are applicable.

4.2.1 Example of Wireless Devices to which Various Embodiments of the Present Disclosure are Applied FIG. 34 illustrates exemplary wireless devices to which various embodiments of the present disclosure are applicable.

Referring to FIG. 34, a first wireless device 100 and a second wireless device 200 may transmit radio signals through a variety of RATs (e.g., LTE and NR). Herein, {the first wireless device 100 and the second wireless device 200} may correspond to {the wireless device 100x and the BS 200} and/or {the wireless device 100x and the wireless device 100x} of FIG. W1.

The first wireless device 100 may include one or more processors 102 and one or more memories 104 and additionally further include one or more transceivers 106 and/or one or more antennas 108. The processor(s) 102 may control the memory(s) 104 and/or the transceiver(s) 106 and may be configured to implement the descriptions, functions, procedures, proposals, methods, and/or operational flowcharts disclosed in this document. For example, the processor(s) 102 may process information within the memory(s) 104 to generate first information/signals and then transmit radio signals including the first information/signals through the transceiver(s) 106. The processor(s) 102 may receive radio signals including second information/signals through the transceiver 106 and then store information obtained by processing the second information/signals in the memory(s) 104. The memory(s) 104 may be connected to the processor(s) 102 and may store a variety of information related to operations of the processor(s) 102. For example, the memory(s) 104 may store software code including commands for performing a part or the entirety of processes controlled by the processor(s) 102 or for performing the descriptions, functions, procedures, proposals, methods, and/or operational flowcharts disclosed in this document. Herein, the processor(s) 102 and the memory(s) 104 may be a part of a communication modem/circuit/chip designed to implement RAT (e.g., LTE or NR). The transceiver(s) 106 may be connected to the processor(s) 102 and transmit and/or receive radio signals through one or more antennas 108. Each of the transceiver(s) 106 may include a transmitter and/or a receiver. The transceiver(s) 106 may be interchangeably used with Radio Frequency (RF) unit(s). In the various embodiments of the present disclosure, the wireless device may represent a communication modem/circuit/chip.

The second wireless device 200 may include one or more processors 202 and one or more memories 204 and additionally further include one or more transceivers 206 and/or one or more antennas 208. The processor(s) 202 may control the memory(s) 204 and/or the transceiver(s) 206 and may be configured to implement the descriptions, functions, procedures, proposals, methods, and/or operational flowcharts disclosed in this document. For example, the processor(s) 202 may process information within the memory(s) 204 to generate third information/signals and then transmit radio signals including the third information/signals through the transceiver(s) 206. The processor(s) 202 may receive radio signals including fourth information/signals through the transceiver(s) 106 and then store information obtained by processing the fourth information/signals in the memory(s) 204. The memory(s) 204 may be connected to the processor(s) 202 and may store a variety of information related to operations of the processor(s) 202. For example, the memory(s) 204 may store software code including commands for performing a part or the entirety of processes controlled by the processor(s) 202 or for performing the descriptions, functions, procedures, proposals, methods, and/or operational flowcharts disclosed in this document. Herein, the processor(s) 202 and the memory(s) 204 may be a part of a communication modem/circuit/chip designed to implement RAT (e.g., LTE or NR). The transceiver(s) 206 may be connected to the processor(s) 202 and transmit and/or receive radio signals through one or more antennas 208. Each of the transceiver(s) 206 may include a transmitter and/or a receiver. The transceiver(s) 206 may be interchangeably used with RF unit(s). In the various embodiments of the present disclosure, the wireless device may represent a communication modem/circuit/chip.

Hereinafter, hardware elements of the wireless devices 100 and 200 will be described more specifically. One or more protocol layers may be implemented by, without being limited to, one or more processors 102 and 202. For example, the one or more processors 102 and 202 may implement one or more layers (e.g., functional layers such as PHY, MAC, RLC, PDCP, RRC, and SDAP). The one or more processors 102 and 202 may generate one or more Protocol Data Units (PDUs) and/or one or more Service Data Unit (SDUs) according to the descriptions, functions, procedures, proposals, methods, and/or operational flowcharts disclosed in this document. The one or more processors 102 and 202 may generate messages, control information, data, or information according to the descriptions, functions, procedures, proposals, methods, and/or operational flowcharts disclosed in this document. The one or more processors 102 and 202 may generate signals (e.g., baseband signals) including PDUs, SDUs, messages, control information, data, or information according to the descriptions, functions, procedures, proposals, methods, and/or operational flowcharts disclosed in this document and provide the generated signals to the one or more transceivers 106 and 206. The one or more processors 102 and 202 may receive the signals (e.g., baseband signals) from the one or more transceivers 106 and 206 and acquire the PDUs, SDUs, messages, control information, data, or information according to the descriptions, functions, procedures, proposals, methods, and/or operational flowcharts disclosed in this document.

The one or more processors 102 and 202 may be referred to as controllers, microcontrollers, microprocessors, or microcomputers. The one or more processors 102 and 202 may be implemented by hardware, firmware, software, or a combination thereof. As an example, one or more Application Specific Integrated Circuits (ASICs), one or more Digital Signal Processors (DSPs), one or more Digital Signal Processing Devices (DSPDs), one or more Programmable Logic Devices (PLDs), or one or more Field Programmable Gate Arrays (FPGAs) may be included in the one or more processors 102 and 202. The descriptions, functions, procedures, proposals, methods, and/or operational flowcharts disclosed in this document may be implemented using firmware or software and the firmware or software may be configured to include the modules, procedures, or functions. Firmware or software configured to perform the descriptions, functions, procedures, proposals, methods, and/or operational flowcharts disclosed in this document may be included in the one or more processors 102 and 202 or stored in the one or more memories 104 and 204 so as to be driven by the one or more processors 102 and 202. The descriptions, functions, procedures, proposals, methods, and/or operational flowcharts disclosed in this document may be implemented using firmware or software in the form of code, commands, and/or a set of commands.

The one or more memories 104 and 204 may be connected to the one or more processors 102 and 202 and store various types of data, signals, messages, information, programs, code, instructions, and/or commands. The one or more memories 104 and 204 may be configured by Read-Only Memories (ROMs), Random Access Memories (RAMs), Electrically Erasable Programmable Read-Only Memories (EPROMs), flash memories, hard drives, registers, cash memories, computer-readable storage media, and/or combinations thereof. The one or more memories 104 and 204 may be located at the interior and/or exterior of the one or more processors 102 and 202. The one or more memories 104 and 204 may be connected to the one or more processors 102 and 202 through various technologies such as wired or wireless connection.

The one or more transceivers 106 and 206 may transmit user data, control information, and/or radio signals/channels, mentioned in the methods and/or operational flowcharts of this document, to one or more other devices. The one or more transceivers 106 and 206 may receive user data, control information, and/or radio signals/channels, mentioned in the descriptions, functions, procedures, proposals, methods, and/or operational flowcharts disclosed in this document, from one or more other devices. For example, the one or more transceivers 106 and 206 may be connected to the one or more processors 102 and 202 and transmit and receive radio signals. For example, the one or more processors 102 and 202 may perform control so that the one or more transceivers 106 and 206 may transmit user data, control information, or radio signals to one or more other devices. The one or more processors 102 and 202 may perform control so that the one or more transceivers 106 and 206 may receive user data, control information, or radio signals from one or more other devices. The one or more transceivers 106 and 206 may be connected to the one or more antennas 108 and 208 and the one or more transceivers 106 and 206 may be configured to transmit and receive user data, control information, and/or radio signals/channels, mentioned in the descriptions, functions, procedures, proposals, methods, and/or operational flowcharts disclosed in this document, through the one or more antennas 108 and 208. In this document, the one or more antennas may be a plurality of physical antennas or a plurality of logical antennas (e.g., antenna ports). The one or more transceivers 106 and 206 may convert received radio signals/channels etc. from RF band signals into baseband signals in order to process received user data, control information, radio signals/channels, etc. using the one or more processors 102 and 202. The one or more transceivers 106 and 206 may convert the user data, control information, radio signals/channels, etc. processed using the one or more processors 102 and 202 from the base band signals into the RF band signals. To this end, the one or more transceivers 106 and 206 may include (analog) oscillators and/or filters.

According to various embodiments of the present disclosure, one or more memories (e.g., 104 or 204) may store instructions or programs which, when executed, cause one or more processors operably coupled to the one or more memories to perform operations according to various embodiments or implementations of the present disclosure.

According to various embodiments of the present disclosure, a computer-readable storage medium may store one or more instructions or computer programs which, when executed by one or more processors, cause the one or more processors to perform operations according to various embodiments or implementations of the present disclosure.

According to various embodiments of the present disclosure, a processing device or apparatus may include one or more processors and one or more computer memories connected to the one or more processors. The one or more computer memories may store instructions or programs which, when executed, cause the one or more processors operably coupled to the one or more memories to perform operations according to various embodiments or implementations of the present disclosure.

Figure 35:
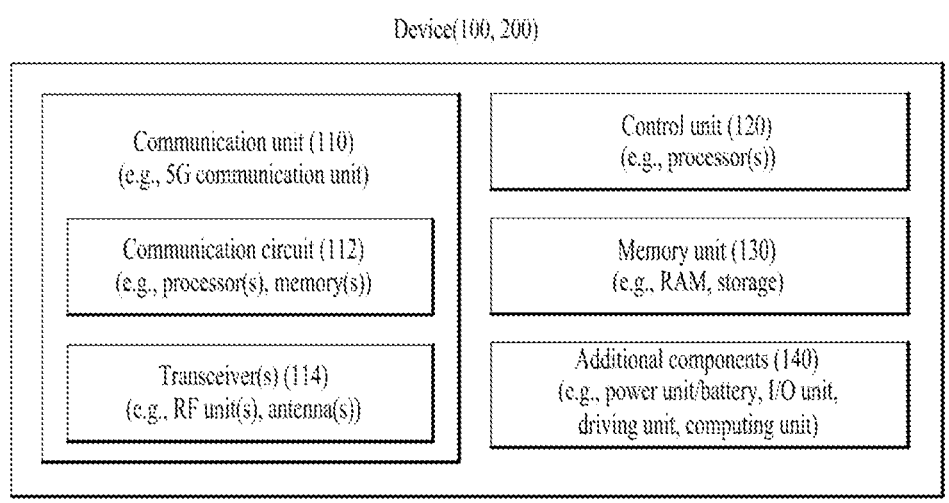
FIG. 35 is a block diagram illustrating another example of wireless devices to which various embodiments of the present disclosure are applicable.

4.2.2. Example of Using Wireless Devices to which Various Embodiments of the Present Disclosure are Applied FIG. 35 illustrates other exemplary wireless devices to which various embodiments of the present disclosure are applied. The wireless devices may be implemented in various forms according to a use case/service (see FIG. 33).

Referring to FIG. 35, wireless devices 100 and 200 may correspond to the wireless devices 100 and 200 of FIG. 33 and may be configured by various elements, components, units/portions, and/or modules. For example, each of the wireless devices 100 and 200 may include a communication unit 110, a control unit 120, a memory unit 130, and additional components 140. The communication unit may include a communication circuit 112 and transceiver(s) 114. For example, the communication circuit 112 may include the one or more processors 102 and 202 and/or the one or more memories 104 and 204 of FIG. 33. For example, the transceiver(s) 114 may include the one or more transceivers 106 and 206 and/or the one or more antennas 108 and 208 of FIG. 33. The control unit 120 is electrically connected to the communication unit 110, the memory 130, and the additional components 140 and controls overall operation of the wireless devices. For example, the control unit 120 may control an electric/mechanical operation of the wireless device based on programs/code/commands/information stored in the memory unit 130. The control unit 120 may transmit the information stored in the memory unit 130 to the exterior (e.g., other communication devices) via the communication unit 110 through a wireless/wired interface or store, in the memory unit 130, information received through the wireless/wired interface from the exterior (e.g., other communication devices) via the communication unit 110.

The additional components 140 may be variously configured according to types of wireless devices. For example, the additional components 140 may include at least one of a power unit/battery, input/output (I/O) unit, a driving unit, and a computing unit. The wireless device may be implemented in the form of, without being limited to, the robot (100a of FIG. W1), the vehicles (100b-1 and 100b-2 of FIG. W1), the XR device (100c of FIG. W1), the hand-held device (100d of FIG. W1), the home appliance (100e of FIG. W1), the IoT device (100f of FIG. W1), a digital broadcast terminal, a hologram device, a public safety device, an MTC device, a medicine device, a fintech device (or a finance device), a security device, a climate/environment device, the AI server/device (400 of FIG. W1), the BSs (200 of FIG. W1), a network node, etc. The wireless device may be used in a mobile or fixed place according to a use-example/service.

In FIG. 35, the entirety of the various elements, components, units/portions, and/or modules in the wireless devices 100 and 200 may be connected to each other through a wired interface or at least a part thereof may be wirelessly connected through the communication unit 110. For example, in each of the wireless devices 100 and 200, the control unit 120 and the communication unit 110 may be connected by wire and the control unit 120 and first units (e.g., 130 and 140) may be wirelessly connected through the communication unit 110. Each element, component, unit/portion, and/or module within the wireless devices 100 and 200 may further include one or more elements. For example, the control unit 120 may be configured by a set of one or more processors. As an example, the control unit 120 may be configured by a set of a communication control processor, an application processor, an Electronic Control Unit (ECU), a graphical processing unit, and a memory control processor. As another example, the memory 130 may be configured by a Random Access Memory (RAM), a Dynamic RAM (DRAM), a Read Only Memory (ROM)), a flash memory, a volatile memory, a non-volatile memory, and/or a combination thereof.

Hereinafter, an example of implementing FIG. 35 will be described in detail with reference to the drawings.

Figure 36:
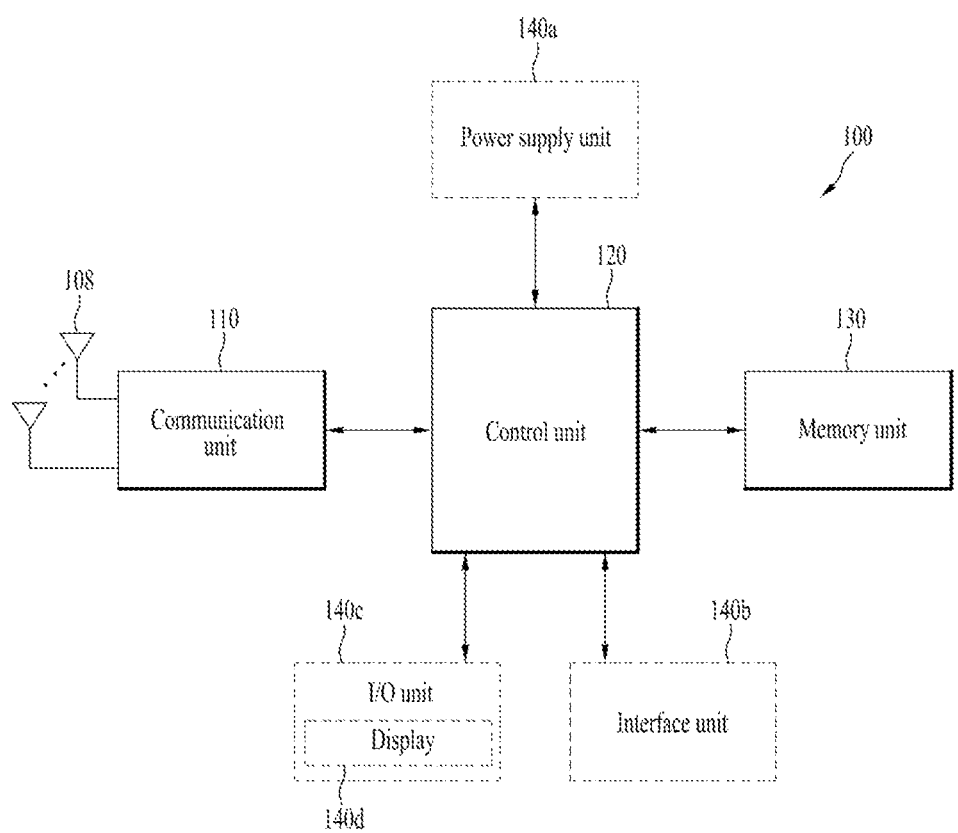
FIG. 36 is a block diagram illustrating a portable device applied to various embodiments of the present disclosure.

4.2.3. Example of Portable Device to which Various Embodiments of the Present Disclosure are Applied FIG. 36 illustrates an exemplary portable device to which various embodiments of the present disclosure are applied. The portable device may be any of a smartphone, a smartpad, a wearable device (e.g., a smartwatch or smart glasses), and a portable computer (e.g., a laptop). A portable device may also be referred to as mobile station (MS), user terminal (UT), mobile subscriber station (MSS), subscriber station (SS), advanced mobile station (AMS), or wireless terminal (WT).

Referring to FIG. 36, a hand-held device 100 may include an antenna unit 108, a communication unit 110, a control unit 120, a memory unit 130, a power supply unit 140a, an interface unit 140b, and an I/O unit 140c. The antenna unit 108 may be configured as a part of the communication unit 110. Blocks 110 to 130/140a to 140c correspond to the blocks 110 to 130/140 of FIG. X3, respectively.

The communication unit 110 may transmit and receive signals (e.g., data and control signals) to and from other wireless devices or BSs. The control unit 120 may perform various operations by controlling constituent elements of the hand-held device 100. The control unit 120 may include an Application Processor (AP). The memory unit 130 may store data/parameters/programs/code/commands needed to drive the hand-held device 100. The memory unit 130 may store input/output data/information. The power supply unit 140a may supply power to the hand-held device 100 and include a wired/wireless charging circuit, a battery, etc. The interface unit 140b may support connection of the hand-held device 100 to other external devices. The interface unit 140b may include various ports (e.g., an audio I/O port and a video I/O port) for connection with external devices. The I/O unit 140c may input or output video information/signals, audio information/signals, data, and/or information input by a user. The I/O unit 140c may include a camera, a microphone, a user input unit, a display unit 140d, a speaker, and/or a haptic module.

As an example, in the case of data communication, the I/O unit 140c may acquire information/signals (e.g., touch, text, voice, images, or video) input by a user and the acquired information/signals may be stored in the memory unit 130. The communication unit 110 may convert the information/signals stored in the memory into radio signals and transmit the converted radio signals to other wireless devices directly or to a BS. The communication unit 110 may receive radio signals from other wireless devices or the BS and then restore the received radio signals into original information/signals. The restored information/signals may be stored in the memory unit 130 and may be output as various types (e.g., text, voice, images, video, or haptic) through the I/O unit 140c.

4.2.4. Example of Vehicle or Autonomous Driving Vehicle to which Various Embodiments of the Present Disclosure.

Figure 37:
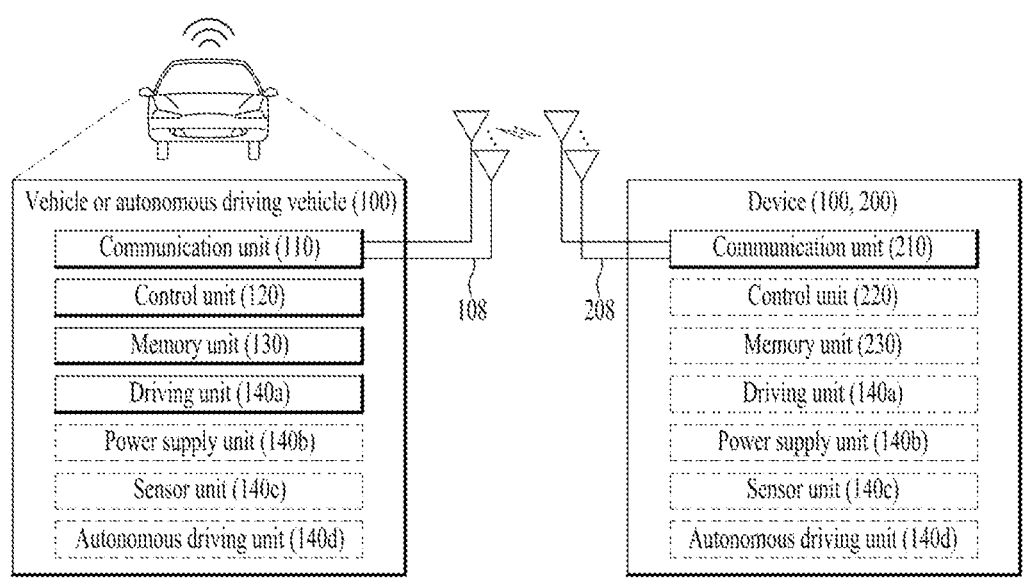
FIG. 37 is a block diagram illustrating a vehicle or an autonomous driving vehicle, which is applied to various embodiments of the present disclosure.

FIG. 37 illustrates an exemplary vehicle or autonomous driving vehicle to which various embodiments of the present disclosure. The vehicle or autonomous driving vehicle may be implemented as a mobile robot, a car, a train, a manned/unmanned aerial vehicle (AV), a ship, or the like.

Referring to FIG. 37, a vehicle or autonomous driving vehicle 100 may include an antenna unit 108, a communication unit 110, a control unit 120, a driving unit 140a, a power supply unit 140b, a sensor unit 140c, and an autonomous driving unit 140d. The antenna unit 108 may be configured as a part of the communication unit 110. The blocks 110/130/140a to 140d correspond to the blocks 110/130/140 of FIG. X3, respectively.

The communication unit 110 may transmit and receive signals (e.g., data and control signals) to and from external devices such as other vehicles, BSs (e.g., gNBs and road side units), and servers. The control unit 120 may perform various operations by controlling elements of the vehicle or the autonomous driving vehicle 100. The control unit 120 may include an Electronic Control Unit (ECU). The driving unit 140a may cause the vehicle or the autonomous driving vehicle 100 to drive on a road. The driving unit 140a may include an engine, a motor, a powertrain, a wheel, a brake, a steering device, etc. The power supply unit 140b may supply power to the vehicle or the autonomous driving vehicle 100 and include a wired/wireless charging circuit, a battery, etc. The sensor unit 140c may acquire a vehicle state, ambient environment information, user information, etc. The sensor unit 140c may include an Inertial Measurement Unit (IMU) sensor, a collision sensor, a wheel sensor, a speed sensor, a slope sensor, a weight sensor, a heading sensor, a position module, a vehicle forward/backward sensor, a battery sensor, a fuel sensor, a tire sensor, a steering sensor, a temperature sensor, a humidity sensor, an ultrasonic sensor, an illumination sensor, a pedal position sensor, etc. The autonomous driving unit 140d may implement technology for maintaining a lane on which a vehicle is driving, technology for automatically adjusting speed, such as adaptive cruise control, technology for autonomously driving along a determined path, technology for driving by automatically setting a path if a destination is set, and the like.

For example, the communication unit 110 may receive map data, traffic information data, etc. from an external server. The autonomous driving unit 140d may generate an autonomous driving path and a driving plan from the obtained data. The control unit 120 may control the driving unit 140a such that the vehicle or the autonomous driving vehicle 100 may move along the autonomous driving path according to the driving plan (e.g., speed/direction control). In the middle of autonomous driving, the communication unit 110 may aperiodically/periodically acquire recent traffic information data from the external server and acquire surrounding traffic information data from neighboring vehicles. In the middle of autonomous driving, the sensor unit 140c may obtain a vehicle state and/or surrounding environment information. The autonomous driving unit 140d may update the autonomous driving path and the driving plan based on the newly obtained data/information. The communication unit 110 may transfer information about a vehicle position, the autonomous driving path, and/or the driving plan to the external server. The external server may predict traffic information data using AI technology, etc., based on the information collected from vehicles or autonomous driving vehicles and provide the predicted traffic information data to the vehicles or the autonomous driving vehicles.

Figure 38:
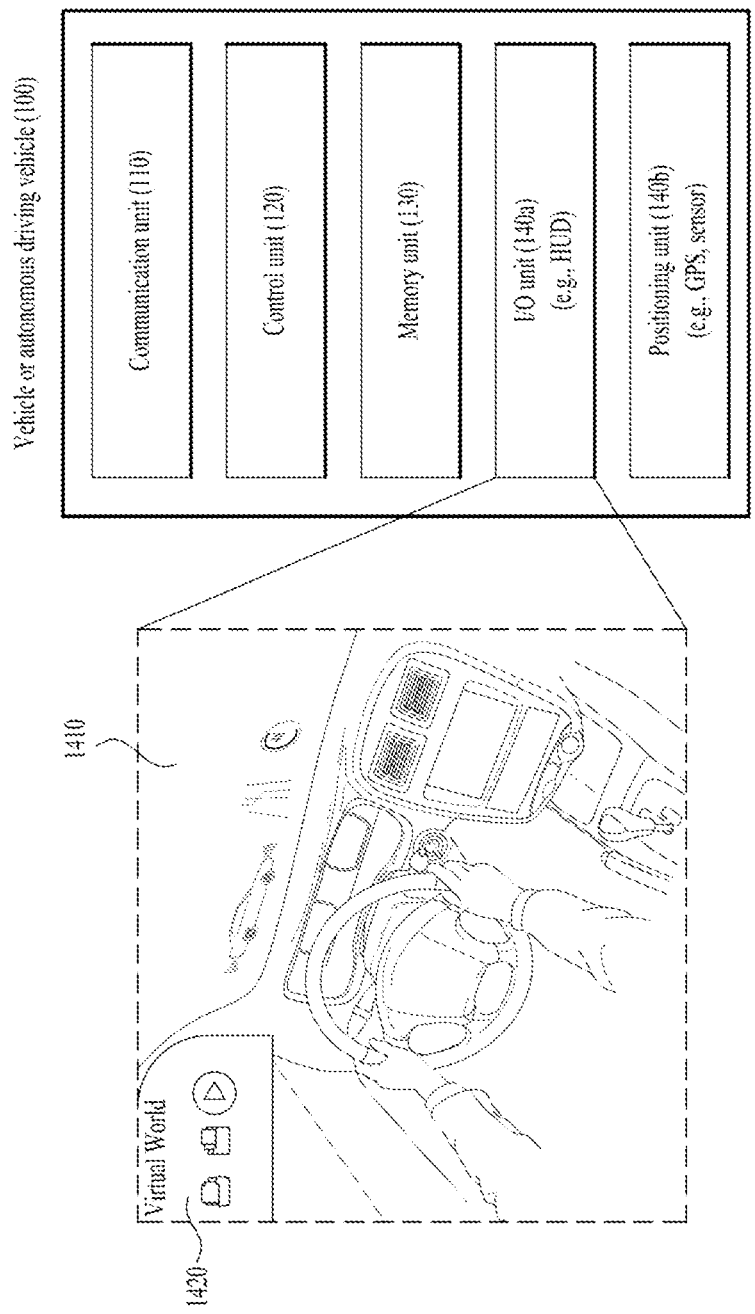
FIG. 38 is a block diagram illustrating a vehicle applied to various embodiments of the present disclosure.

4.2.5. Example of AR/VR and Vehicle to which Various Embodiments of the Present Disclosure FIG. 38 illustrates an exemplary vehicle to which various embodiments of the present disclosure are applied. The vehicle may be implemented as a transportation means, a train, an aircraft, a ship, or the like.

Referring to FIG. 38, a vehicle 100 may include a communication unit 110, a control unit 120, a memory unit 130, an I/O unit 140a, and a positioning unit 140b. Herein, the blocks 110 to 130/140a and 140b correspond to blocks 110 to 130/140 of FIG. 35.

The communication unit 110 may transmit and receive signals (e.g., data and control signals) to and from external devices such as other vehicles or BSs. The control unit 120 may perform various operations by controlling constituent elements of the vehicle 100. The memory unit 130 may store data/parameters/programs/code/commands for supporting various functions of the vehicle 100. The I/O unit 140a may output an AR/VR object based on information within the memory unit 130. The I/O unit 140a may include an HUD. The positioning unit 140b may acquire information about the position of the vehicle 100. The position information may include information about an absolute position of the vehicle 100, information about the position of the vehicle 100 within a traveling lane, acceleration information, and information about the position of the vehicle 100 from a neighboring vehicle. The positioning unit 140b may include a GPS and various sensors.

As an example, the communication unit 110 of the vehicle 100 may receive map information and traffic information from an external server and store the received information in the memory unit 130. The positioning unit 140b may obtain the vehicle position information through the GPS and various sensors and store the obtained information in the memory unit 130. The control unit 120 may generate a virtual object based on the map information, traffic information, and vehicle position information and the I/O unit 140a may display the generated virtual object in a window in the vehicle (1410 and 1420). The control unit 120 may determine whether the vehicle 100 normally drives within a traveling lane, based on the vehicle position information. If the vehicle 100 abnormally exits from the traveling lane, the control unit 120 may display a warning on the window in the vehicle through the I/O unit 140a. In addition, the control unit 120 may broadcast a warning message regarding driving abnormity to neighboring vehicles through the communication unit 110. According to situation, the control unit 120 may transmit the vehicle position information and the information about driving/vehicle abnormality to related organizations.

In summary, various embodiments of the present disclosure may be implemented through a certain device and/or UE.

For example, the certain device may be any of a BS, a network node, a transmitting UE, a receiving UE, a wireless device, a wireless communication device, a vehicle, a vehicle equipped with an autonomous driving function, an unmanned aerial vehicle (UAV), an artificial intelligence (AI) module, a robot, an augmented reality (AR) device, a virtual reality (VR) device, and other devices.

For example, a UE may be any of a personal digital assistant (PDA), a cellular phone, a personal communication service (PCS) phone, a global system for mobile (GSM) phone, a wideband CDMA (WCDMA) phone, a mobile broadband system (MBS) phone, a smartphone, and a multi mode-multi band (MINI-MB) terminal.

A smartphone refers to a terminal taking the advantages of both a mobile communication terminal and a PDA, which is achieved by integrating a data communication function being the function of a PDA, such as scheduling, fax transmission and reception, and Internet connection in a mobile communication terminal. Further, an MINI-MB terminal refers to a terminal which has a built-in multi-modem chip and thus is operable in all of a portable Internet system and other mobile communication system (e.g., CDMA 2000, WCDMA, and so on).

Alternatively, the UE may be any of a laptop PC, a hand-held PC, a tablet PC, an ultrabook, a slate PC, a digital broadcasting terminal, a portable multimedia player (PMP), a navigator, and a wearable device such as a smartwatch, smart glasses, and a head mounted display (HMD). For example, a UAV may be an unmanned aerial vehicle that flies under the control of a wireless control signal. For example, an HMD may be a display device worn around the head. For example, the HMD may be used to implement AR or VR.

Various embodiments of the present disclosure may be implemented in various means. For example, various embodiments of the present disclosure may be implemented in hardware, firmware, software, or a combination thereof.

In a hardware configuration, the methods according to exemplary embodiments of the present disclosure may be achieved by one or more Application Specific Integrated Circuits (ASICs), Digital Signal Processors (DSPs), Digital Signal Processing Devices (DSPDs), Programmable Logic Devices (PLDs), Field Programmable Gate Arrays (FPGAs), processors, controllers, microcontrollers, microprocessors, etc.

In a firmware or software configuration, the methods according to the various embodiments of the present disclosure may be implemented in the form of a module, a procedure, a function, etc. performing the above-described functions or operations. A software code may be stored in the memory 50 or 150 and executed by the processor 40 or 140. The memory is located at the interior or exterior of the processor and may transmit and receive data to and from the processor via various known means.

Those skilled in the art will appreciate that the various embodiments of the present disclosure may be carried out in other specific ways than those set forth herein without departing from the spirit and essential characteristics of the various embodiments of the present disclosure. The above embodiments are therefore to be construed in all aspects as illustrative and not restrictive. The scope of the disclosure should be determined by the appended claims and their legal equivalents, not by the above description, and all changes coming within the meaning and equivalency range of the appended claims are intended to be embraced therein. It is obvious to those skilled in the art that claims that are not explicitly cited in each other in the appended claims may be presented in combination as an embodiment of the present disclosure or included as a new claim by a subsequent amendment after the application is filed.

The various embodiments of present disclosure are applicable to various wireless access systems including a 3GPP system, and/or a 3GPP2 system. Besides these wireless access systems, the various embodiments of the present disclosure are applicable to all technical fields in which the wireless access systems find their applications. Moreover, the proposed method can also be applied to mmWave communication using an ultra-high frequency band.

The invention claimed is:

1. A method performed by a user equipment (UE) in a wireless communication system, the method comprising:
   receiving configuration information related to a message A related to a random access procedure, wherein the message A comprises a physical random access channel (PRACH) preamble and a physical uplink shared channel (PUSCH);
   transmitting the message A; and
   receiving a message B related to the random access procedure in response to the message A,
   wherein the PRACH preamble is obtained among at least one preconfigured PRACH preamble,
   wherein a demodulation reference signal (DMRS) for the PUSCH is related to (i) at least one DMRS port and (ii) at least one DMRS sequence, and
   wherein the at least one preconfigured PRACH preamble is mapped to (i) the at least one DMRS port and then (ii) the at least one DMRS sequence based on (i) an index of each of the at least one DMRS port being considered in ascending order and then (ii) an index of each of the at least one DMRS sequence being considered in ascending order.

2. The method of claim 1, wherein a maximum number of DMRS ports is 4 based on the DMRS being configured in one orthogonal frequency division multiplexing (OFDM) symbol.

3. The method of claim 1, wherein the PUSCH is transmitted based on a modulation and coding scheme (MCS) level associated with a random access preamble identifier (RAPID) of the PRACH preamble.

4. The method of claim 3, wherein based on a plurality of frequency resource sets being configured for the DMRS: the DMRS is transmitted based on a frequency resource set associated with the RAPID among the plurality of frequency resource sets.

5. An apparatus configured to operate in a wireless communication system, the apparatus comprising
   a transceiver; and
   at least one processor coupled to the transceiver,
   wherein the at least one processor is configured to execute instruction to perform operations comprising:
   receiving configuration information related to a message A related to a random access procedure, wherein the message A comprises a physical random access channel (PRACH) preamble and a physical uplink shared channel (PUSCH);
   transmitting the message A; and
   receiving a message B related to the random access procedure in response to the message A,
   wherein the PRACH preamble is obtained among at least one preconfigured PRACH preamble,
   wherein a demodulation reference signal (DMRS) for the PUSCH is related to (i) at least one DMRS port and (ii) at least one DMRS sequence, and
   wherein the at least one preconfigured PRACH preamble is mapped to (i) the at least one DMRS port and then (ii) the at least one DMRS sequence based on (i) an index of each of the at least one DMRS port being considered in ascending order and then (ii) an index of each of the at least one DMRS sequence being considered in ascending order.

6. The apparatus of claim 5, wherein the PUSCH is transmitted based on a modulation and coding scheme (MCS) level associated with a random access preamble identifier (RAPID) of the PRACH preamble.

7. The apparatus of claim 5, wherein the at least one processor is configured to communicate with at least one of a user equipment (UE), a network, or an autonomous driving vehicle other than a vehicle comprising the apparatus.

8. A method performed by a base station (BS) in a wireless communication system, the method comprising:
   transmitting configuration information related to a message A related to a random access procedure;
   receiving the message A;
   obtaining a physical random access channel (PRACH) preamble and a physical uplink shared channel (PUSCH) included in the message A; and
   transmitting a message B related to the random access procedure in response to the message A,
   wherein the PRACH preamble is obtained among at least one preconfigured PRACH preamble,
   wherein a demodulation reference signal (DMRS) for the PUSCH is related to (i) at least one DMRS port and (ii) at least one DMRS sequence, and
   wherein the at least one preconfigured PRACH preamble is mapped to (i) the at least one DMRS port and then (ii) the at least one DMRS sequence based on (i) an index of each of the at least one DMRS port being considered in ascending order and then (ii) an index of each of the at least one DMRS sequence being considered in ascending order.

9. An apparatus configured to operate in a wireless communication system, the apparatus comprising:
   a transceiver; and
   at least one processor coupled to the transceiver,
   wherein the at least one processor is configured to execute instructions to perform operations comprising:
   transmitting configuration information related to a message A related to a random access procedure;
   receiving the message A related to a random access procedure;
   obtaining a physical random access channel (PRACH) preamble and a physical uplink shared channel (PUSCH) included in the message A; and
   transmitting a message B related to the random access procedure in response to the message A,
   wherein the PRACH preamble is obtained among at least one preconfigured PRACH preamble,
   wherein a demodulation reference signal (DMRS) for the PUSCH is related to (i) at least one DMRS port and (ii) at least one DMRS sequence, and
   wherein the at least one preconfigured PRACH preamble is mapped to (i) the at least one DMRS port and then (ii) the at least one DMRS sequence based on (i) an index of each of the at least one DMRS port being considered in ascending order and then (ii) an index of each of the at least one DMRS sequence being considered in ascending order.

\* \* \* \* \*